US012451050B2

(12) United States Patent
Cong et al.

(10) Patent No.: US 12,451,050 B2
(45) Date of Patent: Oct. 21, 2025

(54) PIXEL CIRCUIT AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Ning Cong, Beijing (CN); Minghua Xuan, Beijing (CN); Can Zhang, Beijing (CN); Can Wang, Beijing (CN); Jinfei Niu, Beijing (CN); Jingjing Zhang, Beijing (CN)

(73) Assignees: BEIJING BOE DISPLAY TECHNOLOGY CO., LTD., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/262,893

(22) PCT Filed: Jul. 29, 2022

(86) PCT No.: PCT/CN2022/108878

§ 371 (c)(1),
(2) Date: Jul. 25, 2023

(87) PCT Pub. No.: WO2024/020997

PCT Pub. Date: Feb. 1, 2024

(65) Prior Publication Data

US 2025/0014502 A1 Jan. 9, 2025

(51) Int. Cl.
*G09G 3/32* (2016.01)

(52) U.S. Cl.
CPC ....... *G09G 3/32* (2013.01); *G09G 2300/0842* (2013.01); *G09G 2310/061* (2013.01); *G09G 2310/08* (2013.01); *G09G 2320/0233* (2013.01)

(58) Field of Classification Search
CPC ............ G09G 2310/08; G09G 3/3233; G09G 2300/0842; G09G 3/32; G09G 2320/0233; G09G 2310/061
See application file for complete search history.

(56) References Cited

U.S. PATENT DOCUMENTS

2002/0030670 A1* 3/2002 Matsueda ............ G09G 3/2014 345/204
2007/0002082 A1 1/2007 Sakurai
(Continued)

FOREIGN PATENT DOCUMENTS

CN 102971783 A 3/2013
CN 103295546 A 9/2013
(Continued)

*Primary Examiner* — Muhammad N Edun
(74) *Attorney, Agent, or Firm* — McCoy Russell LLP

(57) ABSTRACT

A pixel circuit includes a light emitting circuit, a light emitting control circuit, a first control circuit and a switch control circuit; the light emitting control circuit controls to connect the control voltage input terminal and the light emitting circuit under the control of a light emitting control signal provided by the light emitting control terminal; the light emitting circuit emits light according to a control voltage provided by the control voltage input terminal; the first control circuit controls a switch control signal under the control of a scanning signal according to a data voltage; N is an integer greater than 1; the switch control circuit includes N switch control terminals, N light emitting control voltage terminals and N switch control sub-circuits; n is a positive integer less than or equal to N.

20 Claims, 14 Drawing Sheets

(56) References Cited

U.S. PATENT DOCUMENTS

| | | | | |
|---|---|---|---|---|
| 2012/0019436 | A1 | 1/2012 | Yamashita | |
| 2013/0099700 | A1 | 4/2013 | Kreye et al. | |
| 2013/0229444 | A1 | 9/2013 | Teranishi et al. | |
| 2015/0035813 | A1 | 2/2015 | Lei | |
| 2017/0270881 | A1 | 9/2017 | Li | |
| 2018/0211615 | A1 | 7/2018 | Tan et al. | |
| 2018/0218706 | A1 | 8/2018 | Gong | |
| 2019/0228725 | A1 | 7/2019 | Bansho | |
| 2019/0347980 | A1* | 11/2019 | Kuo | G09G 3/32 |
| 2020/0020295 | A1 | 1/2020 | Han et al. | |
| 2021/0158757 | A1 | 5/2021 | Xuan | |
| 2021/0256929 | A1 | 8/2021 | Wang et al. | |
| 2021/0335212 | A1 | 10/2021 | Cong et al. | |
| 2022/0101776 | A1 | 3/2022 | Wu et al. | |

FOREIGN PATENT DOCUMENTS

| | | | |
|---|---|---|---|
| CN | 105390086 | A | 3/2016 |
| CN | 106169288 | A | 11/2016 |
| CN | 106297686 | A | 1/2017 |
| CN | 108922483 | A | 11/2018 |
| CN | 109473079 | A | 3/2019 |
| CN | 208834748 | U | 5/2019 |
| CN | 110021262 | A | 7/2019 |
| CN | 210378422 | U | 4/2020 |
| CN | 113781951 | A | 12/2021 |
| CN | 113870764 | A | 12/2021 |
| CN | 113936599 | A | 1/2022 |
| CN | 114360435 | A | 4/2022 |
| CN | 114446225 | A | 5/2022 |

* cited by examiner

PIXEL CIRCUIT AND DISPLAY DEVICE

CROSS REFERENCE TO RELATED APPLICATION

The present disclosure is the U.S. national phase of PCT Application No. PCT/CN2022/108878 filed on Jul. 29, 2022, which are incorporated herein by reference in their entireties.

TECHNICAL FIELD

The present disclosure relates to the field of display technology, in particular to a pixel circuit and a display device.

BACKGROUND

Micro light emitting diode (Micro LED) and submillimeter light emitting diode (Mini LED) have great application prospects in the display field due to their high brightness, long life, small size and many other advantages. In the related art, the size of Mini LEDs is about 100 μm-300 μm, and the size of micro LEDs is below 100 μm.

At present, Micro LED display panels and Mini LED display panels cannot achieve high Pixels Per Inch (PPI, pixel density) display, and low grayscale display has poor uniformity.

SUMMARY

In one aspect, the present disclosure provides in some embodiments a pixel circuit, including: a light emitting circuit, a light emitting control circuit, a first control circuit and a switch control circuit; the light emitting control circuit is electrically connected to a light emitting control terminal, a control voltage input terminal and the light emitting circuit respectively, and is configured to control to connect the control voltage input terminal and the light emitting circuit under the control of a light emitting control signal provided by the light emitting control terminal; the light emitting circuit is configured to emit light according to a control voltage provided by the control voltage input terminal; the first control circuit is electrically connected to at least two data voltage terminals, at least two scanning terminals, and N switch control terminals, and is configured to control a switch control signal provided to the switch control terminal under the control of a scanning signal provided by the scanning terminal according to a data voltage provided by the data voltage terminal; N is an integer greater than 1; the switch control circuit includes N switch control terminals, N light emitting control voltage terminals and N switch control sub-circuits; n is a positive integer less than or equal to N; an nth switch control sub-circuit is electrically connected to an nth switch control terminal, an nth light emitting control voltage terminal and the control voltage input terminal respectively, and is configured to control to connect the nth light emitting control voltage terminal and the control voltage input terminal under the control of an nth switch control signal provided by the nth switch control terminal.

Optionally, a light emitting control voltage provided by the light emitting control voltage terminal is a direct current voltage, and the light emitting control voltages provided by the N light emitting control voltage terminals are different from each other.

Optionally, a light emitting control voltage provided by the light emitting control voltage terminal is a square wave voltage signal, and duty ratios of light emitting control voltages provided by the N light emitting control voltage terminals are different from each other.

Optionally, N is equal to 2a, and a is a positive integer.

Optionally, the first control circuit includes a first data writing-in circuit, a second data writing-in circuit and a first control sub-circuit; the first data writing-in circuit is electrically connected to a first scanning terminal, a first data voltage terminal and a first data access terminal respectively, and is configured to write a first data voltage provided by the first data voltage terminal into the first data access terminal under the control of a first scanning signal provided by the first scanning terminal; the second data writing-in circuit is electrically connected to a second scanning terminal, a second data voltage terminal and a second data access terminal respectively, and is configured to write a second data voltage provided by the second data voltage terminal into a second data access terminal under the control of a second scanning signal provided by the second scanning terminal; the first control sub-circuit is electrically connected to the first data access terminal, the second data access terminal and the N switch control terminals respectively, and is configured to control to provide corresponding switch control signals to the N switch control terminals respectively according to a potential of the first data access terminal and a potential of the second data access terminal.

Optionally, the first control sub-circuit includes a first latch, a second latch, a third latch, a fourth latch, a first control switch, and a second control switch; N is equal to 4; an input terminal of the first latch is electrically connected to the first data access terminal, an output terminal of the first latch is electrically connected to a control terminal of the first control switch, and the first latch is configured to latch a voltage signal connected to the first data access terminal, and output a first output voltage, and the first output voltage is inverse in phase to the voltage signal connected to the first data access terminal; an input terminal of the second latch is electrically connected to the second data access terminal, an output terminal of the second latch is electrically connected to a control terminal of the second control switch, and the second latch is configured to latch a voltage signal connected to the second data access terminal, and output a second output voltage, and the second output voltage is inverse in phase to the voltage signal connected to the second data access terminal; an input terminal of the third latch is electrically connected to a first terminal of the first control switch, an output terminal of the third latch is electrically connected to the first switch control terminal, and the third latch is configured to latch a voltage signal connected to the input terminal of the third latch, and output a third output voltage, the third output voltage is inverse in phase the voltage signal connected to the input terminal of the third latch; an input terminal of the fourth latch is electrically connected to a first terminal of the second control switch, an output terminal of the fourth latch is electrically connected to a third switch control terminal, and the fourth latch is configured to latch a voltage signal connected to an input terminal of the fourth latch, and output a fourth output voltage, the fourth output voltage is inverse in phase to the voltage signal connected to the input terminal of the fourth latch; a control terminal of the first control switch is electrically connected to the output terminal of the first latch, a second terminal of the first control switch is electrically connected to the output terminal of the second latch, and the first control switch is configured to control to connect or disconnect the first terminal of the first control switch and the second terminal of the first control switch under the control of a potential of the control terminal of the first control switch; a control terminal of the second control switch is electrically connected to the input terminal of the first latch, a second terminal of the second control switch is electrically connected to the input terminal of the second latch, and the second control switch is configured to control to connect or disconnect the first terminal of the second control switch and the second terminal of the second control switch under the control of a potential of the control terminal of the second control switch; the first switch control terminal is electrically connected to the output terminal of the third latch, and the second switch control terminal is electrically connected to the input terminal of the third latch; the third switch control terminal is electrically connected to the output terminal of the fourth latch, and the fourth switch control terminal is electrically connected to the input terminal of the fourth latch.

Optionally, the first latch includes a first inverter and a second inverter; an input terminal of the first inverter is electrically connected to the input terminal of the first latch, and an output terminal of the first inverter is electrically connected to the output terminal of the first latch; an input terminal of the second inverter is electrically connected to the output terminal of the first inverter, and an output terminal of the second inverter is electrically connected to the input terminal of the first inverter; the second latch includes a third inverter and a fourth inverter; an input terminal of the third inverter is electrically connected to the input terminal of the second latch, and an output terminal of the third inverter is electrically connected to the output terminal of the second latch; an input terminal of the fourth inverter is electrically connected to the output terminal of the third inverter, and an output terminal of the fourth inverter is electrically connected to the input terminal of the third inverter; the third latch includes a fifth inverter and a sixth inverter; an input terminal of the fifth inverter is electrically connected to the input terminal of the third latch, and an output terminal of the fifth inverter is electrically connected to the output terminal of the third latch; an input terminal of the sixth inverter is electrically connected to the output terminal of the fifth inverter, and an output terminal of the sixth inverter is electrically connected to the input terminal of the fifth inverter; the fourth latch includes a seventh inverter and an eighth inverter; an input terminal of the seventh inverter is electrically connected to the input terminal of the fourth latch, and an output terminal of the seventh inverter is electrically connected to the output terminal of the fourth latch; an input terminal of the eighth inverter is electrically connected to the output terminal of the seventh inverter, and an output terminal of the eighth inverter is electrically connected to the input terminal of the seventh inverter.

Optionally, the first control switch is a first control transistor, and the second control switch is a second control transistor; a control electrode of the first control transistor is electrically connected to the output terminal of the first latch, a first electrode of the first control transistor is electrically connected to the input terminal of the third latch, and a second electrode of the first control transistor is electrically connected to the output terminal of the second latch; a control electrode of the second control transistor is electrically connected to the input terminal of the first latch, a first electrode of the second control transistor is electrically connected to the input terminal of the fourth latch, and a second electrode of the second control transistor is electrically connected to the input terminal of the second latch.

Optionally, the first data writing-in circuit includes a first writing-in transistor, and the second data writing-in circuit includes a second writing-in transistor; a control electrode of the first writing-in transistor is electrically connected to the first scanning terminal, a first electrode of the first writing-in transistor is electrically connected to the first data voltage terminal, and a second electrode of the first writing-in transistor is electrically connected to the first data access terminal; a control electrode of the second writing-in transistor is electrically connected to the second scanning terminal, a first electrode of the second writing-in transistor is electrically connected to the second data voltage terminal, and a second electrode of the second writing-in transistor is electrically connected to the second data access terminal.

Optionally, the first control circuit includes a first data writing-in circuit, a second data writing-in circuit, a third data writing-in circuit, a fourth data writing-in circuit and a second control sub-circuit; the first data writing-in circuit is electrically connected to the first scanning terminal, the first data voltage terminal and the first data access terminal respectively, and is configured to write a first data voltage provided by the first data voltage terminal into the first data access terminal under the control of the first scanning signal provided by the first scanning terminal; the second data writing-in circuit is electrically connected to the second scanning terminal, the second data voltage terminal and the second data access terminal respectively, and is configured to write a second data voltage provided by the second data voltage terminal into the second data access terminal under the control of the second scanning signal provided by the first second terminal; the third data writing-in circuit is electrically connected to the third scanning terminal, the third data voltage terminal and the third data access terminal respectively, and is configured to write a third data voltage provided by the third data voltage terminal into the third data access terminal under the control of the third scanning signal provided by the third second terminal; the fourth data writing-in circuit is electrically connected to the fourth scanning terminal, the fourth data voltage terminal and the fourth data access terminal respectively, and is configured to write a fourth data voltage provided by the fourth data voltage terminal into the fourth data access terminal under the control of the fourth scanning signal provided by the first fourth terminal; the second control sub-circuit is respectively connected to the first data access terminal, the second data access terminal, the third data access terminal, the fourth data access terminal and the N switch control terminals, is configured to provide corresponding switch control signals to the N switch control terminals respectively according a potential of the first data access terminal, a potential of the second data access terminal, a potential of the third data access terminal and a potential of the fourth data access terminal.

Optionally, the second control sub-circuit includes a first latch, a second latch, a third latch, a fourth latch, a fifth latch, a sixth latch, a seventh latch, an eighth latch, a ninth latch, a tenth latch, a first control switch, a second control switch, a third control switch, a fourth control switch, a fifth control switch, and a sixth control switch; N is equal to 8; an input terminal of the first latch is electrically connected to the first data access terminal, an output terminal of the first latch is electrically connected to a control terminal of the first control switch, and the first latch is configured to latch the voltage signal connected to the first data access terminal, and output a first output voltage, and the first output voltage is inverse in phase to the voltage signal connected to the first data access terminal; an input terminal of the second latch is electrically connected to the second data access terminal, an output terminal of the second latch is electrically connected to a control terminal of the second control switch, and the second latch is configured to latch a voltage signal connected to the second data access terminal, and output a second output voltage, and the second output voltage is inverse in phase to the voltage signal connected to the second data access terminal; an input terminal of the third latch is electrically connected to the first terminal of the first control switch, an output terminal of the third latch is electrically connected to a control terminal of the third control switch, and the third latch is configured to latch the voltage signal connected to the input terminal of the third latch, and output a third output voltage, and the third output voltage is inverse in phase to the voltage signal connected to the input terminal of the third latch; an input terminal of the fourth latch is electrically connected to the first terminal of the second control switch, an output terminal of the fourth latch is electrically connected to the control terminal of the fifth control switch, and the fourth latch is configured to latch a voltage signal connected to the input terminal of the fourth latch, and output a fourth output voltage, the fourth output voltage is inverse in phase to the voltage signal connected to the input terminal of the fourth latch; an input terminal of the fifth latch is electrically connected to the first terminal of the third control switch, an output terminal of the fifth latch is electrically connected to the second switch control terminal, and the fifth latch is configured to latch a voltage signal connected to the input terminal of the fifth latch, and output a fifth output voltage, the fifth output voltage is inverse in phase to the voltage signal connected to the input terminal of the fifth latch; an input terminal of the sixth latch is electrically connected to the third data access terminal, an output terminal of the sixth latch is electrically connected to the second terminal of the third control switch, and the sixth latch is configured to latch a voltage signal connected to the input terminal of the sixth latch, and output a sixth output voltage, the sixth output voltage is inverse in phase to the voltage signal connected to the input terminal of the sixth latch; an input terminal of the seventh latch is electrically connected to the first terminal of the fourth control switch, an output terminal of the seventh latch is electrically connected to the fourth switch control terminal, and the seventh latch is configured to latch a voltage signal connected to the input terminal of the seventh latch, and output a seventh output voltage, the seventh output voltage is inverse in phase to the voltage signal connected to the input terminal of the seventh latch; an input terminal of the eighth latch is electrically connected to the first terminal of the fifth control switch, an output terminal of the eighth latch is electrically connected to the sixth switch control terminal, and the eighth latch is configured to latch a voltage signal connected to the input terminal of the eighth latch, and output an eighth output voltage, the eighth output voltage is inverse in phase to the voltage signal connected to the input terminal of the eighth latch; an input terminal of the ninth latch is electrically connected to the fourth data access terminal, an output terminal of the ninth latch is electrically connected to the second terminal of the fifth control switch, and the ninth latch is electrically connected to the second terminal of the fifth control switch, the ninth latch is configured to latch the voltage signal connected to the input terminal of the ninth latch, and output a ninth output voltage, the ninth output voltage is inverse in phase to the voltage signal connected to the input terminal of the ninth latch; an input terminal of the tenth latch is electrically connected to the first terminal of the sixth control switch, an output terminal of the tenth latch is electrically connected to the eighth switch control terminal, and the tenth latch is configured to latch a voltage signal connected to the input terminal of the tenth latch, and output a tenth output voltage, the tenth output voltage is inverse in phase to the voltage signal connected to the input terminal of the tenth latch; a control terminal of the first control switch is electrically connected to the output terminal of the first latch, a second terminal of the first control switch is electrically connected to the output terminal of the second latch, and the first control switch is configured to control to connect or disconnect a first terminal of the first control switch and the second terminal of the first control switch under the control of a potential of the control terminal of the first control switch; a control terminal of the second control switch is electrically connected to the input terminal of the first latch, a second terminal of the second control switch is electrically connected to the input terminal of the second latch, and the second control switch is configured to control to connect or disconnect a first terminal of the second control switch and the second terminal of the second control switch under the control of a potential of the control terminal of the second control switch; a control terminal of the third control switch is electrically connected to the output terminal of the third latch, and the third control switch is configured to control to connect or disconnect the input terminal of the fifth latch and the output terminal of the sixth latch under the control of a potential of the control terminal of the third control switch; a control terminal of the fourth control switch is electrically connected to the input terminal of the third latch, and the fourth control switch is configured to control to connect or disconnect the input terminal of the seventh latch and the input terminal of the sixth latch under the control of a potential of the control terminal of the fourth control switch; a control terminal of the fifth control switch is electrically connected to the output terminal of the fourth latch, and the fifth control switch is configured to control to connect the input terminal of the eighth latch and the output terminal of the ninth latch under the control of a potential of the control terminal of the fifth control switch; a control terminal of the sixth control switch is electrically connected to the input terminal of the fourth latch, and the sixth control switch is configured to control to connect the input terminal of the tenth latch and the input terminal of the ninth latch under the control of a potential of the control terminal of the sixth control switch; the first switch control terminal is electrically connected to the input terminal of the fifth latch, and the seventh switch control terminal is electrically connected to the input terminal of the tenth latch.

Optionally, the first latch includes a first inverter and a second inverter; an input terminal of the first inverter is electrically connected to the input terminal of the first latch, and an output terminal of the first inverter is electrically connected to the output terminal of the first latch; an input terminal of the second inverter is electrically connected to the output terminal of the first inverter, and an output terminal of the second inverter is electrically connected to the input terminal of the first inverter; the second latch includes a third inverter and a fourth inverter; an input terminal of the third inverter is electrically connected to the input terminal of the second latch, and an output terminal of the third inverter is electrically connected to the output terminal of the second latch; an input terminal of the fourth inverter is electrically connected to the output terminal of the third inverter, and an output terminal of the fourth inverter is electrically connected to the input terminal of the third inverter; the third latch includes a fifth inverter and a sixth inverter; an input terminal of the fifth inverter is electrically connected to the input terminal of the third latch, and an output terminal of the fifth inverter is electrically connected to the output terminal of the third latch; an input terminal of the sixth inverter is electrically connected to the output terminal of the fifth inverter, and an output terminal of the sixth inverter is electrically connected to the input terminal of the fifth inverter; the fourth latch includes a seventh inverter and an eighth inverter; an input terminal of the seventh inverter is electrically connected to the input terminal of the fourth latch, and an output terminal of the seventh inverter is electrically connected to the output terminal of the fourth latch; an input terminal of the eighth inverter is electrically connected to the output terminal of the seventh inverter, and an output terminal of the eighth inverter is electrically connected to the input terminal of the seventh inverter; the fifth latch includes a ninth inverter and a tenth inverter; an input terminal of the ninth inverter is electrically connected to the input terminal of the fifth latch, and an output terminal of the ninth inverter is electrically connected to the output terminal of the fifth latch; an input terminal of the tenth inverter is electrically connected to the output terminal of the ninth inverter, and an output terminal of the tenth inverter is electrically connected to the input terminal of the ninth inverter; the sixth latch includes an eleventh inverter and a twelfth inverter; an input terminal of the eleventh inverter is electrically connected to the input terminal of the sixth latch, and an output terminal of the eleventh inverter is electrically connected to the output terminal of the sixth latch; an input terminal of the twelfth inverter is electrically connected to the output terminal of the eleventh inverter, and an output terminal of the twelfth inverter is electrically connected to the input terminal of the eleventh inverter; the seventh latch includes a thirteenth inverter and a fourteenth inverter; an input terminal of the thirteenth inverter is electrically connected to the input terminal of the seventh latch, and an output terminal of the thirteenth inverter is electrically connected to the output terminal of the seventh latch; an input terminal of the fourteenth inverter is electrically connected to the output terminal of the thirteenth inverter, and an output terminal of the fourteenth inverter is electrically connected to the input terminal of the thirteenth inverter; the eighth latch includes a fifteenth inverter and a sixteenth inverter; an input terminal of the fifteenth inverter is electrically connected to the input terminal of the eighth latch, and an output terminal of the fifteenth inverter is electrically connected to the output terminal of the eighth latch; an input terminal of the sixteenth inverter is electrically connected to the output terminal of the fifteenth inverter, and an output terminal of the sixteenth inverter is electrically connected to the input terminal of the fifteenth inverter; the ninth latch includes a seventeenth inverter and an eighteenth inverter; an input terminal of the seventeenth inverter is electrically connected to the input terminal of the ninth latch, and an output terminal of the seventeenth inverter is electrically connected to the output terminal of the ninth latch; an input terminal of the eighteenth inverter is electrically connected to the output terminal of the seventeenth inverter, and an output terminal of the eighteenth inverter is electrically connected to the input terminal of the seventeenth inverter; the tenth latch includes a nineteenth inverter and a twentieth inverter; an input terminal of the nineteenth inverter is electrically connected to the input terminal of the tenth latch, and an output terminal of the nineteenth inverter is electrically connected to the output terminal of the tenth latch; an input terminal of the twentieth inverter is electrically connected to the output terminal of the nineteenth inverter, and an output terminal of the twentieth inverter is electrically connected to the input terminal of the nineteenth inverter.

Optionally, the first control switch is a first control transistor, the second control switch is a second control transistor; the third control switch is a third control transistor, and the fourth control switch is a fourth control transistor; the fifth control switch is a fifth control transistor, and the sixth control switch is a sixth control transistor; a control electrode of the first control transistor is electrically connected to the output terminal of the first latch, a first electrode of the first control transistor is electrically connected to the input terminal of the third latch, and a second electrode of the first control transistor is electrically connected to the output terminal of the second latch; a control electrode of the second control transistor is electrically connected to the input terminal of the first latch, a first electrode of the second control transistor is electrically connected to the input terminal of the fourth latch, and a second electrode of the second control transistor is electrically connected to the input terminal of the second latch; a control electrode of the third control transistor is electrically connected to the output terminal of the third latch, a first electrode of the third control transistor is electrically connected to the input terminal of the fifth latch, and a second electrode of the third control transistor is electrically connected to the output terminal of the sixth latch; a control electrode of the fourth control transistor is electrically connected to the input terminal of the third latch, a first electrode of the fourth control transistor is electrically connected to the input terminal of the seventh latch, and a second electrode of the fourth transistor is electrically connected to the input terminal of the sixth latch; a control electrode of the fifth control transistor is electrically connected to the output terminal of the fourth latch, a first electrode of the fifth control transistor is electrically connected to the input terminal of the eighth latch, and a second electrode of the fifth control transistor is electrically connected to the output terminal of the ninth latch; a control electrode of the sixth control transistor is electrically connected to the input terminal of the fourth latch, a first electrode of the sixth control transistor is electrically connected to the input terminal of the tenth latch, and a second electrode of the sixth control transistor is electrically connected to the input terminal of the ninth latch.

Optionally, the first data writing-in circuit includes a first writing-in transistor, the second data writing-in circuit includes a second writing-in transistor, and the third data writing-in circuit includes a third writing-in transistor, the fourth data writing-in circuit includes a fourth writing-in transistor; a control electrode of the first writing-in transistor is electrically connected to the first scanning terminal, a first electrode of the first writing-in transistor is electrically connected to the first data voltage terminal, and a second electrode of the first writing-in transistor is electrically connected to the first data access terminal; a control electrode of the second writing-in transistor is electrically connected to the second scanning terminal, a first electrode of the second writing-in transistor is electrically connected to the second data voltage terminal, and a second electrode of the second writing-in transistor is electrically connected to the second data access terminal; a control electrode of the third writing-in transistor is electrically connected to the third scanning terminal, a first electrode of the third writing-in transistor is electrically connected to the third data voltage terminal, and a second electrode of the third writing-in transistor is electrically connected to the third data access terminal; a control electrode of the fourth writing-in transistor is electrically connected to the fourth scanning terminal, a first electrode of the fourth writing-in transistor is electrically connected to the fourth data voltage terminal, and a second electrode of the fourth writing-in transistor is electrically connected to the fourth data access terminal.

Optionally, the light emitting circuit comprises a light emitting element; the light emitting control circuit is electrically connected to a first electrode of the light emitting element, and is configured to control to connect the control voltage input terminal and the first electrode of the light emitting element under the control of the light emitting control signal; a second electrode of the light emitting element is electrically connected to the first voltage terminal.

Optionally, the light emitting circuit includes an amplitude control sub-circuit, a driving sub-circuit, a first on-off control sub-circuit and a light emitting element; a first terminal of the driving sub-circuit is electrically connected to the second voltage terminal; the amplitude control sub-circuit is configured to control a driving current generated by the driving sub-circuit according to a display data voltage; the light emitting control circuit is configured to control to connect the control voltage input terminal and a control terminal of the first on-off control sub-circuit under the control of the light emitting control signal; the control terminal of the first on-off control sub-circuit is electrically connected to the light emitting control circuit, a first terminal of the first on-off control sub-circuit is electrically connected to the second terminal of the driving sub-circuit, and a second terminal of the first on-off control sub-circuit is electrically connected to the light emitting element; the first on-off control sub-circuit is configured to control to connect the driving sub-circuit and the light emitting element under the control of a potential of the control terminal of the first on-off control sub-circuit.

Optionally, the amplitude control sub-circuit includes a data writing-in sub-circuit, an energy storage sub-circuit and a reset sub-circuit; the data writing-in sub-circuit is electrically connected to the first scanning line, the data line and the control terminal of the driving sub-circuit respectively, and is configured to write the data voltage provided by the data line into the control terminal of the driving sub-circuit under the control of the first scanning signal provided by the first scanning line; the reset sub-circuit is electrically connected to the first scanning line, the reset voltage terminal and the second terminal of the driving sub-circuit respectively, and is configured to control to write the reset voltage provided by the reset voltage terminal into the second terminal of the driving sub-circuit under the control of the first scanning signal; the energy storage sub-circuit is electrically connected to the control terminal of the driving sub-circuit and the second terminal of the driving sub-circuit respectively, and is configured to store electric energy; the driving sub-circuit is configured to generate driving current under the control of a potential of the control terminal of the driving sub-circuit.

Optionally, the amplitude control sub-circuit includes a data writing-in sub-circuit and an energy storage sub-circuit; the data writing-in sub-circuit is electrically connected to the scanning line, the data line and the control terminal of the driving sub-circuit respectively, and the data writing-in sub-circuit is configured to write the data voltage provided by the data line into the control terminal of the driving sub-circuit under the control of a scanning signal provided by the scanning line; the energy storage sub-circuit is electrically connected to the control terminal the driving sub-circuit and a first common electrode terminal, respectively, is configured to store electric energy; the driving sub-circuit is configured to generate driving current under the control of a potential of the control terminal of the driving sub-circuit.

Optionally, the scanning lines include a second scanning line and a third scanning line; the data writing-in sub-circuit includes a first data writing-in transistor and a second data writing-in transistor; a control electrode of the first data writing-in transistor is electrically connected to the second scanning line, a first electrode of the first data writing-in transistor is electrically connected to the data line, and a second electrode of the first data writing-in transistor is electrically connected to the control terminal of the driving sub-circuit; a control electrode of the second data writing-in transistor is electrically connected to the third scanning line, a first electrode of the second data writing-in transistor is electrically connected to the data line, and a second electrode of the second data writing-in transistor is electrically connected to the control terminal of the driving sub-circuit; the first data writing-in transistor is an n-type transistor, and the second data writing-in transistor is a p-type transistor.

Optionally, the nth switch control sub-circuit comprises an nth switch control transistor; a control electrode of the nth switch control transistor is electrically connected to the nth switch control terminal, a first electrode of the nth switch control transistor is electrically connected to the nth light emitting control voltage terminal, and a second electrode of the nth switch control transistor is electrically connected to the control voltage input terminal.

Optionally, the light emitting control circuit comprises a light emitting control transistor; a control electrode of the light emitting control transistor is electrically connected to the light emitting control terminal, a first electrode of the light emitting control transistor is electrically connected to the control voltage input terminal, and a second electrode of the light emitting control transistor is connected to the light emitting circuit.

Optionally, the light emitting element included in the light emitting circuit is a micro light emitting diode or a submillimeter light emitting diode; a first electrode of the light emitting element is an anode, a second electrode of the light emitting element is a cathode.

In a second aspect, a display device includes a display panel; a display area of the display panel has a plurality of sub-pixels, and the pixel circuit is arranged in each sub-pixel.

Optionally, the display panel comprises a silicon substrate; the pixel circuit is arranged on the silicon substrate.

DETAILED DESCRIPTION

Figure 1:
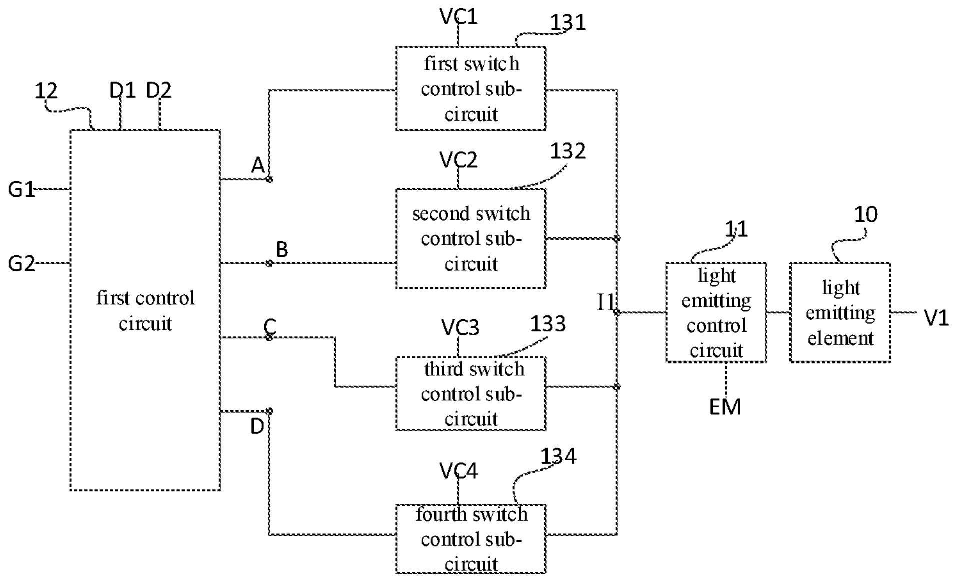
FIG. 1 is a structural diagram of a pixel circuit according to at least one embodiment of the present disclosure.

The following will clearly and completely describe the technical solutions in the embodiments of the present disclosure with reference to the accompanying drawings in the embodiments of the present disclosure. Apparently, the described embodiments are only some of the embodiments of the present disclosure, not all of them. Based on the embodiments in the present disclosure, all other embodiments obtained by persons of ordinary skill in the art without making creative work belong to the protection scope of the present disclosure.

The transistors used in all the embodiments of the present disclosure may be triodes, thin film transistors or field effect transistors or other devices with the same characteristics. In the embodiments of the present disclosure, in order to distinguish the two electrodes of the transistor except the control electrode, one electrode is called the first electrode, and the other electrode is called the second electrode.

In actual operation, when the transistor is a triode, the control electrode can be a base, the first electrode can be a collector, and the second electrode can be an emitter; or, the control electrode can be a base, the first electrode may be an emitter, and the second electrode may be a collector.

In actual operation, when the transistor is a thin film transistor or a field effect transistor, the control electrode may be a gate electrode, the first electrode may be a drain electrode, and the second electrode may be a source; or, the control electrode may be a gate electrode, the first electrode may be a source electrode, and the second electrode may be a drain electrode.

The pixel circuit described in the embodiment of the present disclosure includes a light emitting circuit, a light emitting control circuit, a first control circuit and a switch control circuit;

The light emitting control circuit is electrically connected to a light emitting control terminal, a control voltage input terminal and the light emitting circuit respectively, and is configured to control to connect the control voltage input terminal and the light emitting circuit under the control of a light emitting control signal provided by the light emitting control terminal;

The light emitting circuit is configured to emit light according to a control voltage provided by the control voltage input terminal;

The first control circuit is electrically connected to at least two data voltage terminals, at least two scanning terminals, and N switch control terminals, and is configured to control the switch control signal provided to the switch control terminal under the control of the scanning signal provided by the scanning terminal according to the data voltage provided by the data voltage terminal; N is an integer greater than 1;

The switch control circuit includes N switch control terminals, N light emitting control voltage terminals and N switch control sub-circuits; n is a positive integer less than or equal to N;

An nth switch control sub-circuit is electrically connected to an nth switch control terminal, an nth light emitting control voltage terminal and the control voltage input terminal respectively, and is configured to control to connect the nth light emitting control voltage terminal and the control voltage input terminal under the control of the nth switch control signal provided by the nth switch control terminal.

When the pixel circuit described in the embodiments of the present disclosure is working, the first control circuit controls the switch control signal according to the data voltage under the control of the scanning signal, and each switch control sub-circuit controls to connect a corresponding light emitting control voltage terminal and the control voltage input terminal under the control of the corresponding switch control signal, to control the light emitting brightness of the light emitting circuit.

In specific implementation, the light emitting circuit may include a light emitting element, and the light emitting control circuit is electrically connected to the first electrode of the light emitting element, and is configured to control to connect the control voltage input terminal and the first electrode of the light emitting element and control to connect the second electrode of the light emitting element and the first voltage terminal under the control of the light emitting control signal; at this time, the pixel circuit described in the embodiment of the present disclosure can save the storage capacitor, thereby realizing the control of the light emitting brightness, reducing multiple masks and reducing the cost. Moreover, the pixel circuit described in the embodiment of the present disclosure does not have a capacitor charging and discharging function when it is working, which greatly reduces power consumption.

Optionally, the light emitting element included in the light emitting circuit may be a micro light emitting diode or a submillimeter light emitting diode, the first electrode of the light emitting element is an anode, and the second electrode of the light emitting element is a cathode, but not limited thereto.

When the light emitting circuit only includes light emitting elements, at least one embodiment of the present disclosure provides a Memory In Pixel (MIP) Micro LED pixel circuit, which can be applied to an application scenario such as watches with a small number of gray scales.

In at least one embodiment of the present disclosure, the light emitting circuit may include an amplitude control sub-circuit, a driving sub-circuit, a first on-off control sub-circuit and a light emitting element;

The amplitude control sub-circuit is configured to control a driving current generated by the driving sub-circuit according to the display data voltage;

The light emitting control circuit is configured to control to connect the control voltage input terminal and the control terminal of the first on-off control sub-circuit under the control of the light emitting control signal;

The control terminal of the first on-off control sub-circuit is electrically connected to the light emitting control circuit, the first terminal of the first on-off control sub-circuit is electrically connected to the second terminal of the driving sub-circuit, and the second terminal of the first on-off control sub-circuit is electrically connected to the light emitting element; the first on-off control sub-circuit is configured to control to connect the driving sub-circuit and the light emitting element under the control of a potential of the control terminal of the first on-off control sub-circuit, so as to control the light emitting brightness of the light emitting element by controlling the light emitting duration of the light emitting element (the control voltage can be a square wave voltage signal) and controlling the control voltage applied to the control terminal of the first on-off control sub-circuit, so that the uniformity of low grayscale display can be improved.

In at least one embodiment of the present disclosure, when the light emitting circuit includes an amplitude control sub-circuit, a driving sub-circuit, a first on-off control sub-circuit and a light emitting element, the on-off time of the first on-off control sub-circuit is controlled by the light emitting control circuit, the first control circuit and the switch control circuit to control the light emitting duration of the light emitting element, and the driving circuit generates a driving current according to the display data voltage to realize multi-grayscale display, which can be applied to various multi-grayscale display scenarios.

In at least one embodiment of the present disclosure, the nth switch control sub-circuit includes an nth switch control transistor;

A control electrode of the nth switch control transistor is electrically connected to the nth switch control terminal, a first electrode of the nth switch control transistor is electrically connected to the nth light emitting control voltage terminal, and a second electrode of the nth switch control transistor is electrically connected to the control voltage input terminal.

Optionally, the light emitting control circuit includes a light emitting control transistor;

A control electrode of the light emitting control transistor is electrically connected to the light emitting control terminal, a first electrode of the light emitting control transistor is electrically connected to the control voltage input terminal, and a second electrode of the light emitting control transistor is connected to the first electrode of the light emitting element.

In at least one embodiment of the present disclosure, N is equal to 4 or 8 as an example.

In at least one embodiment of the present disclosure, N may be equal to $2^a$, wherein a is a positive integer, but not limited thereto.

Optionally, a can be a positive integer greater than 1, so as to increase the number of control voltages that can be provided to the control voltage input terminal I1 and increase the number of displayed gray scales.

Optionally, the first voltage terminal may be a low voltage terminal, but not limited thereto.

As shown in FIG. 1, the pixel circuit described in at least one embodiment of the present disclosure includes a light emitting element 10, a light emitting control circuit 11, a first control circuit 12 and a switch control circuit;

The light emitting control circuit 11 is electrically connected to the light emitting control terminal EM, the control voltage input terminal I1 and the first electrode of the light emitting element 10 respectively, and is configured to control to connect the control voltage input terminal I1 and the first electrode of the light emitting element 10 under the control of the light emitting control signal provided by the light emitting control terminal EM; the second electrode of the light emitting element 10 is electrically connected to the first voltage terminal V1;

The first control circuit 12 is respectively connected to the first data voltage terminal D1, the second data voltage terminal D2, the first scanning terminal G1, the second scanning terminal G2, the first switch control terminal A, the second switch control terminal B, the third switch control terminal C and the fourth switch control terminal D, and is configured to control the first switch control signal provided to the first switch control terminal A, the second switch control signal provided to the second switch control terminal B, the third switch control signal provided to the third switch control terminal C, and the fourth switch control signal provided to the fourth switch control terminal D under the control of the first scanning signal provided by the first scanning terminal G1 and the second scanning signal provided by the second scanning terminal G2 according to the first data voltage Vdata1 provided by the first data voltage terminal D1 and the second data voltage Vdata2 provided by the second data voltage terminal D2;

The switch control circuit includes a first switch control terminal A, a second switch control terminal B, a third switch control terminal C, a fourth switch control terminal D, a first light emitting control voltage terminal VC1, a second light emitting control voltage terminal VC2, a third light emitting control voltage terminal VC3, a fourth light emitting control voltage terminal VC4, the first switch control sub-circuit 131, the second switch control sub-circuit 132, the third switch control sub-circuit 133 and the fourth switch control sub-circuit 134;

The first switch control sub-circuit 131 is electrically connected to the first switch control terminal A, the first light emitting control voltage terminal VC1 and the control voltage input terminal I1 respectively, and is configured to control to connect the first light emitting control voltage terminal VC1 and the control voltage input terminal I1 under the control of the first switch control signal provided by the first switch control terminal A;

The second switch control sub-circuit 132 is electrically connected to the second switch control terminal B, the second light emitting control voltage terminal VC2 and the control voltage input terminal I1 respectively, is configured to control to connect the second light emitting control voltage terminal VC2 and the control voltage input terminal I1 under the control of the second switch control signal provided by the second switch control terminal B;

The third switch control sub-circuit 133 is respectively electrically connected to the third switch control terminal C, the third light emitting control voltage terminal VC3 and the control voltage input terminal I1, and is configured to control to connect the third light emitting control voltage terminal VC3 and the control voltage input terminal I1 under the control of the third switch control signal provided by the third switch control terminal C;

The fourth switch control sub-circuit 134 is electrically connected to the fourth switch control terminal D, the fourth light emitting control voltage terminal VC4 and the control voltage input terminal I1 respectively, is configured to control to connect the fourth light emitting control voltage terminal VC4 and the control voltage input terminal I1 under the control of the fourth switch control signal provided by the fourth switch control terminal D.

During operation of at least one embodiment of the pixel circuit shown in FIG. 1; the first control circuit 12 controls to provide the first switch control signal, the second switch control signal, the third switch control signal and the fourth switch control signal, the first switch control sub-circuit 131 controls the first light emitting control voltage terminal VC1 to provide the first light emitting control voltage to the control voltage input terminal I1 under the control of the first switch control signal; the second switch control sub-circuit 132 controls the second light emitting control voltage terminal VC2 to provide a second light emitting control voltage to the control voltage input terminal I1 under the control of the second switch control signal; the third switch control sub-circuit 133 controls the third light emitting control voltage terminal VC3 to provide a third light emitting control voltage to the control voltage input terminal I1 under the control of the third switch control signal; the fourth switch control sub-circuit 134 controls the fourth light emitting control voltage terminal VC4 to provide the fourth light emitting control voltage to the control voltage input terminal I1 under the control of the fourth switch control signal; the light emitting control circuit 11 controls to connect the control voltage input terminal I1 and the first electrode of the light emitting element 10 under the control of the light emitting control signal, to control the light emitting element 10 to emit light, and control the light emitting brightness of the light emitting element 10 according to the light emitting control voltage provided by the control voltage terminal.

Figure 2:
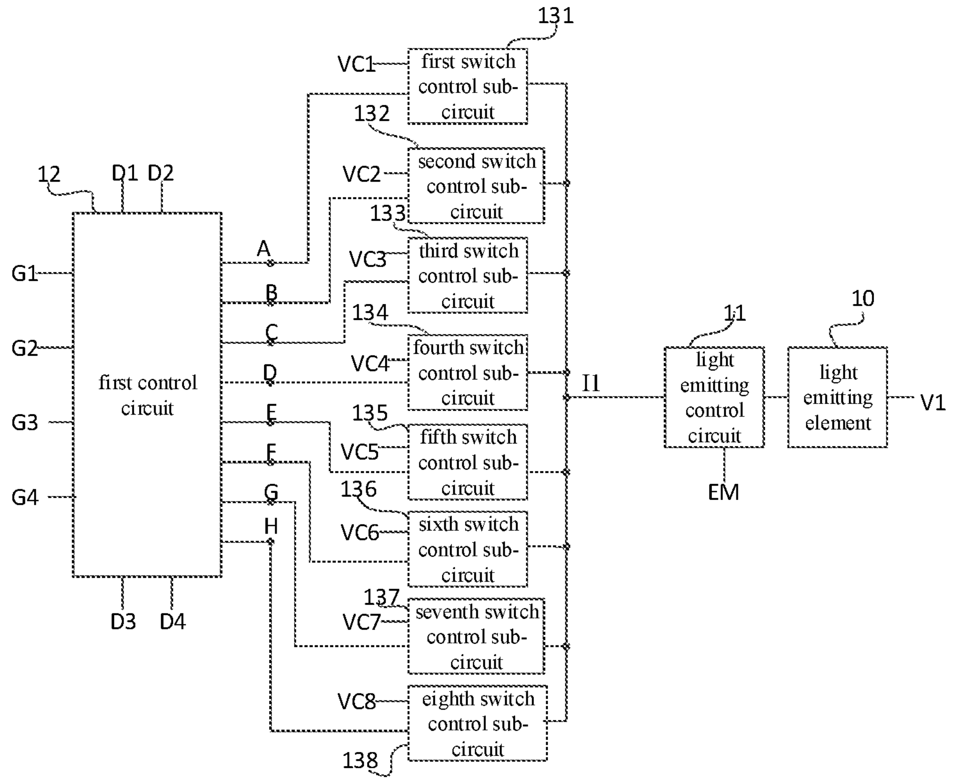
FIG. 2 is a structural diagram of a pixel circuit according to at least one embodiment of the present disclosure.

As shown in FIG. 2, the pixel circuit described in at least one embodiment of the present disclosure includes a light emitting element 10, a light emitting control circuit 11, a first control circuit 12 and a switch control circuit;

The light emitting control circuit 11 is electrically connected to the light emitting control terminal EM, the control voltage input terminal I1 and the first electrode of the light emitting element 10 respectively, and is configured to control to connect the control voltage input terminal I1 and the first electrode of the light emitting element 10 under the control of the light emitting control signal provided by the light emitting control terminal EM; the second electrode of the light emitting element 10 is electrically connected to the first voltage terminal V1;

The first control circuit 12 is respectively connected to the first data voltage terminal D1, the second data voltage terminal D2, the third data voltage terminal D3, the fourth data voltage terminal D4, the first scanning terminal G1, the second scanning terminal G2, the third scanning terminal G3, the fourth scanning terminal G4, the first switch control terminal A, the second switch control terminal B, the third switch control terminal C, the fourth switch control terminal D, the fifth switch control terminal E, the sixth switch control terminal F, the seventh switch control terminal G and the eighth switch control terminal H, controls the first switch control signal provided to the first switch control terminal A, the second switch control signal provided to the second switch control terminal B, the third switch control signal provided to the third switch control terminal C, and the fourth switch control signal provided to the fourth switch control terminal D, the fifth switch control signal provided to the fifth switch control terminal E, the sixth switch control signal provided to the sixth switch control terminal F, and the a seventh switch control signal provided to the seventh switch control terminal G and an eighth switch control signal provided to the eighth switch control terminal H under the control of the first scanning signal provided at the first scanning terminal G1, the second scanning signal provided at the second scanning terminal G2, the third scanning signal provided by the third scanning terminal G3 and the fourth scanning signal provided by the fourth scanning terminal G4, according to the first data voltage Vdata1 provided by the first data voltage terminal D1, the second data voltage Vdata2 provided by the second data voltage terminal D2, the third data voltage Vdata3 provided by the third data voltage terminal D3, and the fourth data voltage Vdata4 provided by the fourth data voltage terminal D4;

The switch control circuit includes a first switch control terminal A, a second switch control terminal B, a third switch control terminal C, a fourth switch control terminal D, a fifth switch control terminal E, a sixth switch control terminal F, a seventh switch control terminal G, an eighth switch control terminal H, a first light emitting control voltage terminal VC1, a second light emitting control voltage terminal VC2, a third light emitting control voltage terminal VC3, a fourth light emitting control voltage terminal VC4, a fifth light emitting control voltage terminal VC5, a sixth light emitting control voltage terminal VC6, a seventh light emitting control voltage terminal VC7, an eighth light emitting control voltage terminal VC8, the first switch control sub-circuit 131, the second switch control sub-circuit 132, the third switch control sub-circuit 133, the fourth switch control sub-circuit 134, the fifth switch control sub-circuit 135, the sixth switch control sub-circuit 136, the seventh switch control sub-circuit 137 and the eighth switch control sub-circuit 138;

The first switch control sub-circuit 131 is electrically connected to the first switch control terminal A, the first light emitting control voltage terminal VC1 and the control voltage input terminal I1 respectively, and is configured to control to connect the first light emitting control voltage terminal VC1 and the control voltage input terminal under the control of the first switch control signal provided by the first switch control terminal A;

The second switch control sub-circuit 132 is electrically connected to the second switch control terminal B, the second light emitting control voltage terminal VC2 and the control voltage input terminal I1 respectively, controls to connect the second light emitting control voltage terminal VC2 and the control voltage input terminal I1 under the control of the second switch control signal provided by the second switch control terminal B;

The third switch control sub-circuit 133 is respectively electrically connected to the third switch control terminal C, the third light emitting control voltage terminal VC3 and the control voltage input terminal I1, and is configured to control to connect the third light emitting control voltage terminal VC3 and the control voltage input terminal I1 under the control of the third switch control signal provided by the third switch control terminal C;

The fourth switch control sub-circuit 134 is electrically connected to the fourth switch control terminal D, the fourth light emitting control voltage terminal VC4 and the control voltage input terminal I1 respectively, controls to connect the fourth light emitting control voltage terminal VC4 and the control voltage input terminal I1 under the control of the fourth switch control signal provided by the fourth switch control terminal D;

The fifth switch control sub-circuit 135 is electrically connected to the fifth switch control terminal E, the second light emitting control voltage terminal VC2 and the control voltage input terminal I1 respectively, controls to connect the fifth light emitting control voltage terminal VC5 and the control voltage input terminal I1 under the control of the fifth switch control signal provided by the fifth switch control terminal E;

The sixth switch control sub-circuit 136 is electrically connected to the sixth switch control terminal F, the sixth light emitting control voltage terminal VC6 and the control voltage input terminal I1 respectively, controls to connect the sixth light emitting control voltage terminal VC6 and the control voltage input terminal I1 under the control of the sixth switch control signal provided by the sixth switch control terminal F;

The seventh switch control sub-circuit 137 is respectively electrically connected to the seventh switch control terminal G, the seventh light emitting control voltage terminal VC7 and the control voltage input terminal I1, and is configured to control to connect the seventh light emitting control voltage terminal VC7 and the control voltage input terminal I1 under the control of the seventh switch control signal provided by the seventh switch control terminal G;

The eighth switch control sub-circuit 138 is electrically connected to the eighth switch control terminal H, the eighth light emitting control voltage terminal VC8 and the control voltage input terminal I1 respectively, and is configured to control to connect the eighth light emitting control voltage terminal VC8 and the control voltage input terminal I1 under the control of the eighth switch control signal provided by the eighth switch control terminal H.

During operation of at least one embodiment of the pixel circuit shown in FIG. 2, the first control circuit 12 controls the first switch control signal, the second switch control signal, the third switch control signal, the fourth switch control signal, the fifth switch control signal, the sixth switch control signal, the seventh switch control signal and the eighth switch control signal; the first switch control sub-circuit 131 controls the first light emitting control voltage terminal VC1 to provide the first light emitting control voltage to the control voltage input terminal I1 under the control of the first switch control signal; the second switch control sub-circuit 132 controls the second light emitting control voltage terminal VC2 to provide the second light emitting control voltage to the control voltage input terminal I1 under the control of the second switch control signal; the third switch control sub-circuit 133 controls the third light emitting control voltage terminal VC3 to provide the third light emitting control voltage to the control voltage input terminal I1 under the control of the third switch control signal; the fourth switch control sub-circuit 134 controls the fourth light emitting control voltage terminal VC4 to provide the fourth light emitting control voltage to the control voltage input terminal I1 under the control of the fourth switch control signal; the fifth switch control sub-circuit 135 controls the fifth light emitting control voltage terminal VC5 to provide the fifth light emitting control voltage to the control voltage input terminal I1 under the control of the fifth switch control signal; the sixth switch control sub-circuit 136 controls the sixth light emitting control voltage terminal VC6 to provide the sixth light emitting control voltage to the control voltage input terminal I1 under the control of the sixth switch control signal; the seventh switch control sub-circuit 137 controls the seventh light emitting control voltage terminal VC7 to provide the seventh light emitting control voltage to the control voltage input terminal I1 under the control of the seventh switch control signal; the eighth switch control sub-circuit 138 controls the eighth light emitting control voltage terminal VC8 to provide the eighth light emitting control voltage to the control voltage input terminal I1 under the control of the eighth switch control signal; the light emitting control circuit 11 controls to connect the control voltage input terminal I1 and the first electrode of the light emitting element 10 under the control of the light emitting control signal, to control the light emitting element 10 to emit light, and can control the light emitting brightness of the light emitting element 10 according to the light emitting control voltage provided by the control voltage terminal.

Optionally, the light emitting control voltages provided by the light emitting control voltage terminals are direct current voltages, and the light emitting control voltages provided by the N light emitting control voltage terminals are different from each other.

In a specific implementation, the light emitting control voltage may be a direct current voltage, and the light emitting brightness of the light emitting element may be controlled by adjusting the voltage value of the light emitting control voltage.

Optionally, the light emitting control voltage provided by the light emitting control voltage terminals is a square wave voltage signal, and the duty ratios of the light emitting control voltages provided by the N light emitting control voltage terminals are different from each other.

In a specific implementation, the light emitting control voltage may be a square wave voltage signal, and duty ratios of the N light emitting control voltages are different from each other. When the light emitting control voltage is a square wave voltage signal, since the square wave voltage signal has better brightness uniformity at low gray levels, the display uniformity can be improved by high voltage and light emitting duration control.

Optionally, the first control circuit includes a first data writing-in circuit, a second data writing-in circuit and a first control sub-circuit;

The first data writing-in circuit is electrically connected to the first scanning terminal, the first data voltage terminal and the first data access terminal respectively, and is configured to write the first data voltage provided by the first data voltage terminal into the first data access terminal under the control of the first scanning signal provided by the first scanning terminal;

The second data writing-in circuit is electrically connected to the second scanning terminal, the second data voltage terminal and the second data access terminal respectively, and is configured to write the second data voltage provided by the second data voltage terminal into the second data access terminal under the control of the second scanning signal provided by the second scanning terminal;

The first control sub-circuit is electrically connected to the first data access terminal, the second data access terminal and the N switch control terminals respectively, and is configured to control to provide corresponding switch control signals to N switch control terminals respectively according to the potential of the first data access terminal and the potential of the second data access terminal.

In specific implementation, the first control circuit may include a first data writing-in circuit, a second data writing-in circuit and a first control sub-circuit, and the first data writing-in circuit writes the first data voltage into the first data access terminal under the control of the first scanning signal, and the second data writing-in circuit writes the second data voltage into the second data access terminal under the control of the second scanning signal; the first control sub-circuit controls to provide corresponding switch control signals to the N switch control terminals respectively according to the potential of the first data access terminal and the potential of the second data access terminal.

Figure 3:
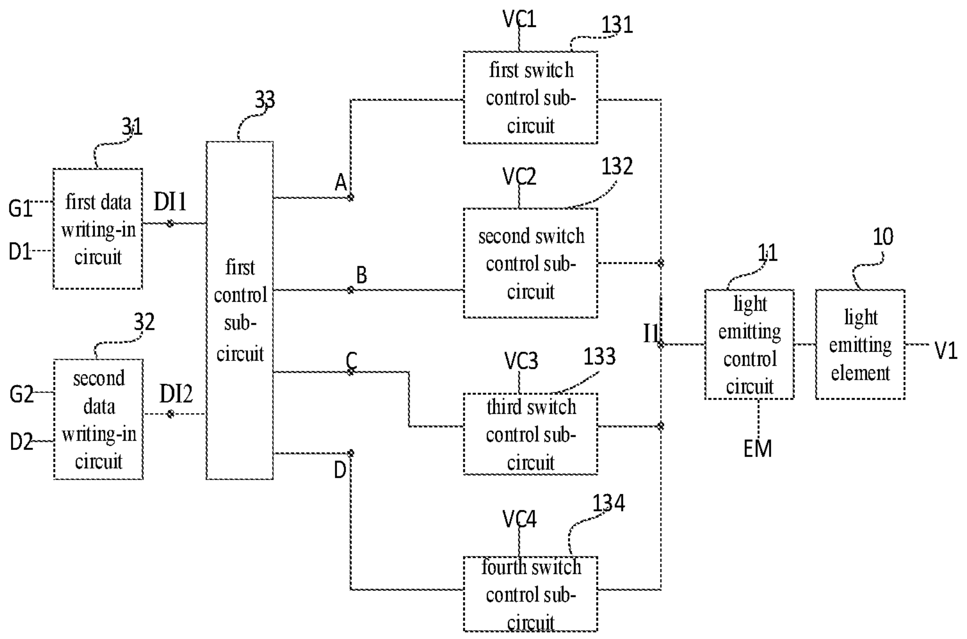
FIG. 3 is a structural diagram of a pixel circuit according to at least one embodiment of the present disclosure.

In at least one embodiment of the present disclosure, as shown in FIG. 3, on the basis of at least one embodiment of the pixel circuit shown in FIG. 1, the first control circuit includes a first data writing-in circuit 31, a second data writing-in circuit 32 and first control sub-circuit 33;

The first data writing-in circuit 31 is electrically connected to the first scanning terminal G1, the first data voltage terminal D1 and the first data access terminal DI1 respectively, and is configured to write the first data voltage Vdata1 provided by the first data voltage terminal D1 into the first data access terminal DI1 under the control of the first scanning signal provided at the first scanning terminal G1;

The second data writing-in circuit 32 is electrically connected to the second scanning terminal G2, the second data voltage terminal D2 and the second data access terminal DI2 respectively, and is configured to write the second data voltage Vdata2 provided by the second data voltage terminal D2 into the second data access terminal DI2 under the control of the second scanning signal provided at the second scanning terminal G2;

The first control sub-circuit 33 is connected to the first data access terminal DI1, the second data access terminal DI2, the first switch control terminal A, the second switch control terminal B, and the third switch control terminal C and the fourth switch control terminal D, and is configured to control to first switch control signal to the first switch control terminal A, control to provide the second switch control signal to the second switch control terminal B, control to provide the third switch control signal to the third switch control terminal C, and control to provide the fourth switch control signal to the fourth switch control terminal D according to the potential of the first data access terminal DI1 and the potential of the second data access terminal DI2.

Optionally, the first control sub-circuit includes a first latch, a second latch, a third latch, a fourth latch, a first control switch, and a second control switch; N is equal to 4;

An input terminal of the first latch is electrically connected to the first data access terminal, an output terminal of the first latch is electrically connected to a control terminal of the first control switch, and the first latch is configured to latch the voltage signal connected to the first data access terminal, and output a first output voltage, and the first output voltage is inverse in phase to the voltage signal connected to the first data access terminal;

An input terminal of the second latch is electrically connected to the second data access terminal, an output terminal of the second latch is electrically connected to a control terminal of the second control switch, and the second latch is configured to latch the voltage signal connected to the second data access terminal, and output a second output voltage, and the second output voltage is inverse in phase to the voltage signal connected to the second data access terminal;

An input terminal of the third latch is electrically connected to the first terminal of the first control switch, an output terminal of the third latch is electrically connected to the first switch control terminal, and the third latch is configured to latch the voltage signal connected to the input terminal thereof, and output a third output voltage, the third output voltage is inverse in phase the voltage signal connected to the input terminal of the third latch;

An input terminal of the fourth latch is electrically connected to the first terminal of the second control switch, an output terminal of the fourth latch is electrically connected to the third switch control terminal, and the fourth latch is configured to latch the voltage signal connected to the input terminal thereof, and output a fourth output voltage, the fourth output voltage is inverse in phase to the voltage signal connected to the input terminal of the fourth latch;

A control terminal of the first control switch is electrically connected to the output terminal of the first latch, a second terminal of the first control switch is electrically connected to the output terminal of the second latch, and the first control switch is configured to control to connect or disconnect the first terminal of the first control switch and the second terminal of the first control switch under the control of the potential of the control terminal thereof;

A control terminal of the second control switch is electrically connected to the input terminal of the first latch, the second terminal of the second control switch is electrically connected to the input terminal of the second latch, and the second control switch is configured to control to connect or disconnect the first terminal of the second control switch and the second terminal of the second control switch under the control of the potential of the control terminal thereof;

The first switch control terminal is electrically connected to the output terminal of the third latch, and the second switch control terminal is electrically connected to the input terminal of the third latch;

The third switch control terminal is electrically connected to the output terminal of the fourth latch, and the fourth switch control terminal is electrically connected to the input terminal of the fourth latch.

In specific implementation, the first control sub-circuit may include a first latch, a second latch, a third latch, a fourth latch, a first control switch and a second control switch, the first latch latches the voltage signal connected to the first data access terminal, and outputs a first output voltage, and the first output voltage is inverse in phase to the voltage signal connected to the first data access terminal; the second latch latches the voltage signal connected to the second data access terminal, and outputs a second output voltage, the second output voltage is inverse in phase to the voltage signal connected to the second data access terminal; the third latch latches the voltage signal connected to its input terminal, and outputs a third output voltage, and the third output voltage is inverse in phase to the voltage signal connected to the input terminal of the third latch; the fourth latch latches the voltage signal connected to its input terminal, and outputs a fourth output voltage, and the fourth output voltage is inverse in phase to the voltage signal connected to the input terminal of the fourth latch; the first control switch controls to connect or disconnect the first terminal of the first control switch and the second terminal of the first control switch under the control of the potential of the control terminal thereof; the second control switch controls to connect or disconnect the first terminal of the second control switch and the second terminal of the second control switch under the control of the potential of the control terminal thereof.

Figure 4:
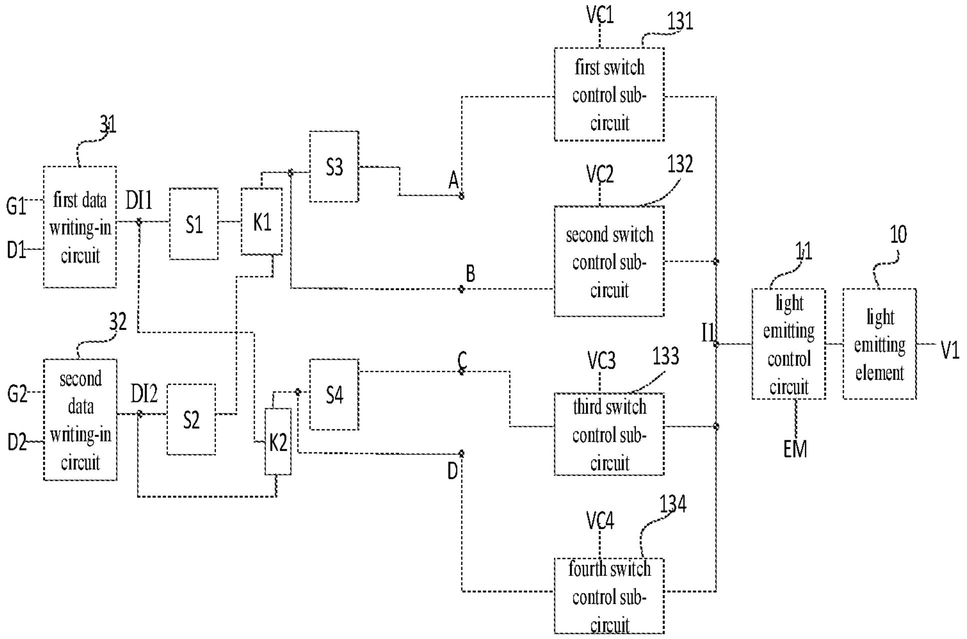
FIG. 4 is a structural diagram of a pixel circuit according to at least one embodiment of the present disclosure.

As shown in FIG. 4, on the basis of at least one embodiment of the pixel circuit shown in FIG. 3, the first control sub-circuit includes a first latch S1, a second latch S2, a third latch S3, a fourth latch S4, a first control switch K1 a the second control switch K2;

The input terminal of the first latch S1 is electrically connected to the first data access terminal DI1, and the output terminal of the first latch S1 is electrically connected to the control terminal of the first control switch K1, the first latch S1 is configured to latch the voltage signal connected to the first data access terminal DI1, and output the first output voltage Vo1 through the output terminal of the first latch S1, and the first output voltage Vo1 is inverse in phase to the voltage signal connected to the first data access terminal DI1;

The input terminal of the second latch S2 is electrically connected to the second data access terminal DI2, and the output terminal of the second latch S2 is electrically connected to the control terminal of the second control switch K2, the second latch S2 is configured to latch the voltage signal connected to the second data access terminal DI2, and output a second output voltage Vo2 through the output terminal of the second latch S2, and the second output voltage Vo2 is inverse in phase to the voltage signal connected to the second data access terminal DI2;

The input terminal of the third latch S3 is electrically connected to the first terminal of the first control switch K1, the output terminal of the third latch S3 is electrically connected to the first switch control terminal A, and the third latch S3 is configured to latch the voltage signal connected to its input terminal, and output a third output voltage Vo3 through the output terminal of the third latch S3, and the third output voltage Vo3 is inverse in phase to the voltage signal connected to the input terminal of the third latch S3;

The input terminal of the fourth latch S4 is electrically connected to the first terminal of the second control switch K2, the output terminal of the fourth latch S4 is electrically connected to the third switch control terminal C, and the fourth latch S4 is configured to latch the voltage signal connected to its input terminal, and output the fourth output voltage Vo4, and the fourth output voltage Vo4 is inverse in phase to the voltage signal connected to the input terminal of the fourth latch S4;

The control terminal of the first control switch K1 is electrically connected to the output terminal of the first latch S1, and the second terminal of the first control switch K1 is electrically connected to the output terminal of the second latch S2, the first control switch K1 is configured to control to connect or disconnect the first terminal of the first control switch K1 and the second terminal of the first control switch K1 under the control of the potential of its control terminal;

The control terminal of the second control switch K2 is electrically connected to the input terminal of the first latch S1, and the second terminal of the second control switch K2 is electrically connected to the input terminal of the second latch S2, the second control switch K2 is configured to control to connect or disconnect the first terminal of the second control switch K2 and the second terminal of the second control switch K2 under the control of the potential of the control terminal thereof;

The first switch control terminal A is electrically connected to the output terminal of the third latch S3, and the second switch control terminal B is electrically connected to the input terminal of the third latch S3;

The third switch control terminal C is electrically connected to the output terminal of the fourth latch S4, and the fourth switch control terminal D is electrically connected to the input terminal of the fourth latch S4.

In specific implementation, the first control sub-circuit may include a first latch, a second latch, a third latch, a fourth latch, a first control switch and a second control switch, the first latch latches the voltage signal connected to the first data access terminal, and outputs a first output voltage, and the first output voltage is inverse in phase to the voltage signal connected to the first data access terminal; the second latch latches the voltage signal connected to the second data access terminal, and outputs a second output voltage, the second output voltage is inverse in phase to the voltage signal connected to the second data access terminal; the third latch latches the voltage signal connected to its input terminal, and outputs a third output voltage, and the third output voltage is inverse in phase to the voltage signal connected to the input terminal of the third latch; the fourth latch latches the voltage signal connected to its input terminal, and outputs a fourth output voltage, and the fourth output voltage is inverse in phase to the voltage signal connected to the input terminal of the fourth latch; the first control switch controls to connect or disconnect the first terminal of the first control switch and the second terminal of the first control switch under the control of the potential of the control terminal thereof; the second control switch controls to connect or disconnect the first terminal of the second control switch and the second terminal of the second control switch under the control of the potential of the control terminal thereof.

In at least one embodiment of the present disclosure, the first latch includes a first inverter and a second inverter;

An input terminal of the first inverter is electrically connected to the input terminal of the first latch, and an output terminal of the first inverter is electrically connected to the output terminal of the first latch;

An input terminal of the second inverter is electrically connected to the output terminal of the first inverter, and an output terminal of the second inverter is electrically connected to the input terminal of the first inverter;

The second latch includes a third inverter and a fourth inverter;

An input terminal of the third inverter is electrically connected to the input terminal of the second latch, and an output terminal of the third inverter is electrically connected to the output terminal of the second latch;

An input terminal of the fourth inverter is electrically connected to the output terminal of the third inverter, and an output terminal of the fourth inverter is electrically connected to the input terminal of the third inverter;

The third latch includes a fifth inverter and a sixth inverter;

An input terminal of the fifth inverter is electrically connected to the input terminal of the third latch, and an output terminal of the fifth inverter is electrically connected to the output terminal of the third latch;

An input terminal of the sixth inverter is electrically connected to the output terminal of the fifth inverter, and an output terminal of the sixth inverter is electrically connected to the input terminal of the fifth inverter;

The fourth latch includes a seventh inverter and an eighth inverter;

An input terminal of the seventh inverter is electrically connected to the input terminal of the fourth latch, and an output terminal of the seventh inverter is electrically connected to the output terminal of the fourth latch;

An input terminal of the eighth inverter is electrically connected to the output terminal of the seventh inverter, and an output terminal of the eighth inverter is electrically connected to the input terminal of the seventh inverter.

Optionally, the first control switch is a first control transistor, and the second control switch is a second control transistor;

A control electrode of the first control transistor is electrically connected to the output terminal of the first latch, a first electrode of the first control transistor is electrically connected to the input terminal of the third latch, and a second electrode of the first control transistor is electrically connected to the output terminal of the second latch;

A control electrode of the second control transistor is electrically connected to the input terminal of the first latch, a first electrode of the second control transistor is electrically connected to the input terminal of the fourth latch, and a second electrode of the second control transistor is electrically connected to the input terminal of the second latch.

Optionally, the first data writing-in circuit includes a first writing-in transistor, and the second data writing-in circuit includes a second writing-in transistor;

A control electrode of the first writing-in transistor is electrically connected to the first scanning terminal, a first electrode of the first writing-in transistor is electrically connected to the first data voltage terminal, and a second electrode of the first writing-in transistor is electrically connected to the first data access terminal;

A control electrode of the second writing-in transistor is electrically connected to the second scanning terminal, a first electrode of the second writing-in transistor is electrically connected to the second data voltage terminal, and a second electrode of the second writing-in transistor is electrically connected to the second data access terminal.

Figure 5:
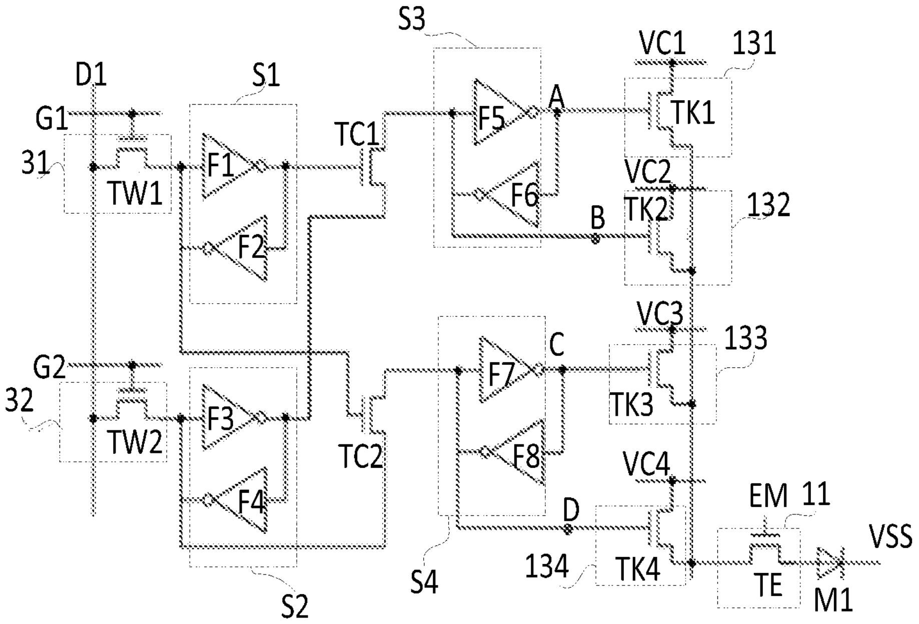
FIG. 5 is a circuit diagram of a pixel circuit according to at least one embodiment of the present disclosure.

As shown in FIG. 5, on the basis of at least one embodiment of the pixel circuit shown in FIG. 4, the light emitting element is a micro light emitting diode M1;

The first latch S1 includes a first inverter F1 and a second inverter F2;

The input terminal of the first inverter F1 is electrically connected to the input terminal of the first latch S1, and the output terminal of the first inverter F1 is electrically connected to the output terminal of the first latch S1;

The input terminal of the second inverter F2 is electrically connected to the output terminal of the first inverter F1, and the output terminal of the second inverter F2 is electrically connected to the input terminal of the first inverter F1;

The second latch S2 includes a third inverter F3 and a fourth inverter F4;

The input terminal of the third inverter F3 is electrically connected to the input terminal of the second latch S2, and the output terminal of the third inverter F3 is electrically connected to the output terminal of the second latch S2;

The input terminal of the fourth inverter F4 is electrically connected to the output terminal of the third inverter F3, and the output terminal of the fourth inverter F4 is electrically connected to the input terminal of the third inverter F3;

The third latch S3 includes a fifth inverter F5 and a sixth inverter F6;

The input terminal of the fifth inverter F5 is electrically connected to the input terminal of the third latch S3, and the output terminal of the fifth inverter F5 is electrically connected to the output terminal of the third latch S3;

The input terminal of the sixth inverter F6 is electrically connected to the output terminal of the fifth inverter F5, and the output terminal of the sixth inverter F6 is electrically connected to the input terminal of the fifth inverter F5;

The fourth latch S4 includes a seventh inverter F7 and an eighth inverter F8;

The input terminal of the seventh inverter F7 is electrically connected to the input terminal of the fourth latch S4, and the output terminal of the seventh inverter F7 is electrically connected to the output terminal of the fourth latch S4;

The input terminal of the eighth inverter F8 is electrically connected to the output terminal of the seventh inverter F7, and the output terminal of the eighth inverter F8 is electrically connected to the input terminal of the seventh inverter F7;

The first control switch is a first control transistor TC1, and the second control switch is a second control transistor TC2;

The gate electrode of the first control transistor TC1 is electrically connected to the output terminal of the first latch S1, the drain electrode of the first control transistor TC1 is electrically connected to the input terminal of the third latch S3, the source electrode of the first control transistor TC1 is electrically connected to the output terminal of the second latch;

The gate electrode of the second control transistor TC2 is electrically connected to the input terminal of the first latch S1, and the drain electrode of the second control transistor TC2 is electrically connected to the input terminal of the fourth latch S4, the source electrode of the second control transistor TC2 is electrically connected to the input terminal of the second latch S2;

The first data writing-in circuit 31 includes a first writing-in transistor TW1, and the second data writing-in circuit 32 includes a second writing-in transistor TW2;

The gate electrode of the first writing-in transistor TW1 is electrically connected to the first scanning terminal G1, the drain electrode of the first writing-in transistor TW1 is electrically connected to the first data voltage terminal D1, and the source electrode of the first writing-in transistor TW1 is electrically connected to the first data access terminal DI1;

The gate electrode of the second writing-in transistor TW2 is electrically connected to the second scanning terminal G2, the drain electrode of the second writing-in transistor TW2 is electrically connected to the first data voltage terminal D1, and the source electrode of the second writing-in transistor TW2 is electrically connected to the second data access terminal DI2;

The first switch control sub-circuit 131 includes a first switch control transistor TK1;

The gate electrode of the first switch control transistor TK1 is electrically connected to the first switch control terminal A, the drain electrode of the first switch control transistor TK1 is electrically connected to the first light emitting control voltage terminal VC1, and the source electrode of the first switch control transistor TK1 is electrically connected to the control voltage input terminal I1;

The second switch control sub-circuit 132 includes a second switch control transistor TK2;

The gate electrode of the second switch control transistor TK2 is electrically connected to the second switch control terminal B, the drain electrode of the second switch control transistor TK2 is electrically connected to the second light emitting control voltage terminal VC2, and the source electrode of the second switch control transistor TK2 is electrically connected to the control voltage input terminal I1;

The third switch control sub-circuit 133 includes a third switch control transistor TK3;

The gate electrode of the third switch control transistor TK3 is electrically connected to the third switch control terminal C, the drain electrode of the third switch control transistor TK3 is electrically connected to the third light emitting control voltage terminal VC2, and the source electrode of the third switch control transistor TK3 is electrically connected to the control voltage input terminal I1;

The fourth switch control sub-circuit 134 includes a fourth switch control transistor TK4;

The gate electrode of the fourth switch control transistor TK4 is electrically connected to the fourth switch control terminal D, the drain electrode of the fourth switch control transistor TK4 is electrically connected to the fourth light emitting control voltage terminal VC4, and the source electrode of the fourth switch control transistor TK4 is electrically connected to the control voltage input terminal I1;

The light emitting control circuit 11 includes a light emitting control transistor TE;

The gate electrode of the light emitting control transistor TE is electrically connected to the light emitting control terminal EM, the drain electrode of the light emitting control transistor TE is electrically connected to the control voltage input terminal I1, and the source electrode of the light emitting control transistor TE is connected to the anode of M1, and the cathode of M1 is electrically connected to the low voltage terminal VSS.

In at least one embodiment shown in FIG. 5, the first data voltage terminal D1 and the second data voltage terminal are the same data voltage terminal.

In at least one embodiment of the pixel circuit shown in FIG. 5, all transistors are n-type transistors, but not limited thereto.

Figure 6:
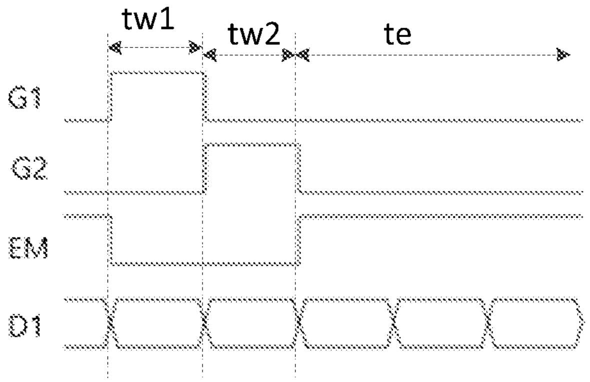
FIG. 6 is a working timing diagram of the pixel circuit shown in FIG. 5.

As shown in FIG. 6, when at least one embodiment of the pixel circuit shown in FIG. 5 of the present disclosure is in operation, the display period includes a first writing-in phase tw1, a second writing-in phase tw2, and a light emitting phase te;

In the first writing-in phase tw1, G1 provides a high voltage signal, D1 provides a first data voltage Vdata1, and TW1 is turned on to write Vdata1 into the input terminal of S1;

In the second writing-in phase tw2, G2 provides a high voltage signal, D1 provides a second data voltage Vdata2, and TW2 is turned on to write Vdata2 into the input terminal of S2;

When Vdata1 is a low voltage signal and Vdata2 is a low voltage signal, S1 outputs a high voltage signal, S2 outputs a high voltage signal, TC1 is turned on, TC2 is turned off, the input terminal of S3 is connected to a high voltage signal, and the first switch control terminal A is connected to a low voltage signal, the second switch control terminal B is connected to a high voltage signal, the potential of the third switch control terminal C and the potential of the fourth switch control terminal D are low voltage, TK1 is turned off, TK2 is turned on, and TK3 and TK4 are turned off, I1 is connected to the second light emitting control voltage; in the light emitting phase te, TE is turned on, and the drain electrode of TE is connected to the second light emitting control voltage to drive M1 to emit light;

When Vdata1 is a low voltage signal and Vdata2 is a high voltage signal, S1 outputs a high voltage signal, S2 outputs a low voltage signal, TC1 is turned on, TC2 is turned off, the input terminal of S3 is connected to a low voltage signal, and the first switch control terminal A is connected to a high voltage signal, the second switch control terminal B is connected to a low voltage signal, the potential of the third switch control terminal C and the potential of the fourth switch control terminal D are low voltage, TK1 is turned on, TK2 is turned off, and TK3 and TK4 are turned off, I1 is connected to the first light emitting control voltage; in the light emitting phase te, TE is turned on, and the drain electrode of TE is connected to the first light emitting control voltage to drive M1 to emit light;

When Vdata1 is a high voltage signal and Vdata2 is a low voltage signal, S1 outputs a low voltage signal, S2 outputs a high voltage signal, TC1 is turned off, TC2 is turned on, the input terminal of S4 is connected to a low voltage signal, and the third switch control terminal C is connected to a high voltage signal, the fourth switch control terminal D is connected with a low voltage signal, the potential of the first switch control terminal A and the potential of the second switch control terminal B are low voltage, TK3 is turned on, TK4 is turned off, and TK1 and TK2 are turned off, I1 is connected to the third light emitting control voltage; in the light emitting phase te, TE is turned on, and the drain electrode of TE is connected to the third light emitting control voltage to drive M1 to emit light;

When Vdata1 is a high voltage signal and Vdata2 is a high voltage signal, S1 outputs a low voltage signal, S2 outputs a low voltage signal, TC1 is turned off, TC2 is turned on, the input terminal of S4 is connected to a high voltage signal, and the third switch control terminal C is connected to a low voltage signal, the fourth switch control terminal D is connected to a high voltage signal, the potential of the first switch control terminal A and the potential of the second switch control terminal B are low voltage, TK4 is turned on, TK3 is turned off, and TK1 and TK2 are turned off, in the light emitting phase te, TE is turned on, and the drain electrode of TE is connected to the fourth light emitting control voltage to drive M1 to emit light.

In at least one embodiment of the present disclosure, the first control circuit includes a first data writing-in circuit, a second data writing-in circuit, a third data writing-in circuit, a fourth data writing-in circuit and a second control sub-circuit;

The first data writing-in circuit is electrically connected to the first scanning terminal, the first data voltage terminal and the first data access terminal respectively, and is configured to write the first data voltage provided by the first data voltage terminal into the first data access terminal;

The second data writing-in circuit is electrically connected to the second scanning terminal, the second data voltage terminal and the second data access terminal respectively, and is configured to write the second data voltage provided by the second data voltage terminal into the second data access terminal;

The third data writing-in circuit is electrically connected to the third scanning terminal, the third data voltage terminal and the third data access terminal respectively, and is configured to write the third data voltage provided by the third data voltage terminal into the third data access terminal;

The fourth data writing-in circuit is electrically connected to the fourth scanning terminal, the fourth data voltage terminal and the fourth data access terminal respectively, and is configured to write the fourth data voltage provided by the fourth data voltage terminal into the fourth data access terminal;

The second control sub-circuit is respectively connected to the first data access terminal, the second data access terminal, the third data access terminal, the fourth data access terminal and the N switch control terminals, is configured to provide corresponding switch control signals to N switch control terminals respectively according the potential of the first data access terminal, the potential of the second data access terminal, the potential of the third data access terminal and the potential of the fourth data access terminal.

Figure 7:
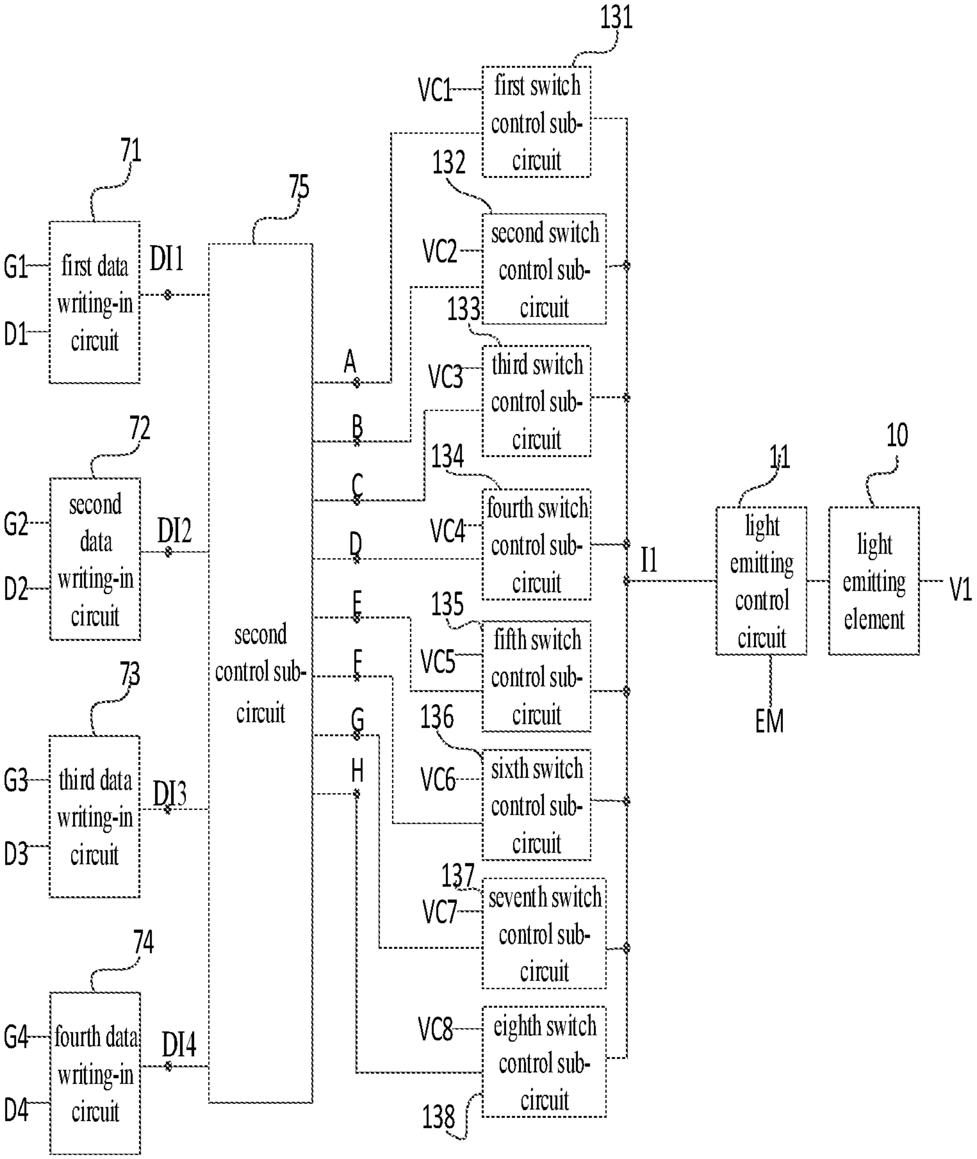
FIG. 7 is a structural diagram of a pixel circuit according to at least one embodiment of the present disclosure.

As shown in FIG. 7, on the basis of at least one embodiment of the pixel circuit shown in FIG. 2, the first control circuit includes a first data writing-in circuit 71, a second data writing-in circuit 72, a third data writing-in circuit input circuit 73, a fourth data writing-in circuit 74 and a second control sub-circuit 75;

The first data writing-in circuit 71 is electrically connected to the first scanning terminal G1, the first data voltage terminal D1 and the first data access terminal DI1 respectively, and is configured to write the first data voltage Vdata1 provided by the first data voltage terminal D1 into the first data access terminal DI1 under the control of the first scanning signal provided by the first scanning terminal G1;

The second data writing-in circuit 72 is electrically connected to the second scanning terminal G2, the second data voltage terminal D2 and the second data access terminal DI2 respectively, and is configured to write the second data voltage Vdata2 provided by the second data voltage terminal D2 into the second data access terminal DI2 under the control of the second scanning signal provided at the second scanning terminal G2;

The third data writing-in circuit 73 is electrically connected to the third scanning terminal G3, the third data voltage terminal D3 and the third data access terminal DI3 respectively, and is used write the third data voltage Vdata3 provided by the third data voltage terminal D3 into the third data access terminal DI3 under the control of the third scanning signal provided at the third scanning terminal G3;

The fourth data write-in circuit 74 is electrically connected to the fourth scanning terminal G4, the fourth data voltage terminal D4 and the fourth data access terminal DI4 respectively, is configured to write the fourth data voltage Vdata4 provided by the fourth data voltage terminal D4 into the fourth data access terminal DI4 under the control of the fourth scanning signal provided at the fourth scanning terminal G4;

The second control sub-circuit 75 is respectively connected to the first data access terminal DI1, the second data access terminal DI2, the third data access terminal DI3, the fourth data access terminal DI4, the first switch control terminal A, the second switch control terminal B, the third switch control terminal C, the fourth switch control terminal D, the fifth switch control terminal E, the sixth switch control terminal F, the seventh switch control terminal G and the eighth switch control terminal H, and is configured to control to provide the first switch control signal to the first switch control terminal A, control to provide the second switch control signal to the second switch control terminal B, and control to provide the third switch control signal to the third switch control terminal C, control to provide the fourth switch control signal to the fourth switch control terminal D, control to provide the fifth switch control signal to the fifth switch control terminal E, and control to provide the sixth switch control signal to the sixth switch control terminal F, control to provide the seventh switch control signal to the seventh switch control terminal G, and control to provide the eighth switch control signal to the eighth switch control terminal H according to the potential of the first data access terminal DI1, the potential of the second data access terminal DI2, the potential of the third data access terminal DI3, and the potential of the four data access terminal DI4.

Optionally, the second control sub-circuit includes a first latch, a second latch, a third latch, a fourth latch, a fifth latch, a sixth latch, a seventh latch, an eighth latch, a ninth latch, a tenth latch, a first control switch, a second control switch, a third control switch, a fourth control switch, a fifth control switch, and a sixth control switch; N is equal to 8;

An input terminal of the first latch is electrically connected to the first data access terminal, an output terminal of the first latch is electrically connected to a control terminal of the first control switch, and the first latch is configured to latch the voltage signal connected to the first data access terminal, and output a first output voltage, and the first output voltage is inverse in phase to the voltage signal connected to the first data access terminal;

An input terminal of the second latch is electrically connected to the second data access terminal, an output terminal of the second latch is electrically connected to the control terminal of the second control switch, and the second latch is configured to latch the voltage signal connected to the second data access terminal, and output a second output voltage, and the second output voltage is inverse in phase to the voltage signal connected to the second data access terminal;

An input terminal of the third latch is electrically connected to the first terminal of the first control switch, an output terminal of the third latch is electrically connected to the control terminal of the third control switch, and the third latch is configured to latch the voltage signal connected to the input terminal thereof, and output a third output voltage, and the third output voltage is inverse in phase to the voltage signal connected to the input terminal of the third latch;

An input terminal of the fourth latch is electrically connected to the first terminal of the second control switch, an output terminal of the fourth latch is electrically connected to the control terminal of the fifth control switch, and the fourth latch is configured to latch the voltage signal connected to its input terminal, and output a fourth output voltage, the fourth output voltage is inverse in phase to the voltage signal connected to the input terminal of the fourth latch;

An input terminal of the fifth latch is electrically connected to the first terminal of the third control switch, an output terminal of the fifth latch is electrically connected to the second switch control terminal, and the fifth latch is configured to latch the voltage signal connected to the input terminal of the fifth latch, and output a fifth output voltage, the fifth output voltage is inverse in phase to the voltage signal connected to the input terminal of the fifth latch;

An input terminal of the sixth latch is electrically connected to the third data access terminal, an output terminal of the sixth latch is electrically connected to the second terminal of the third control switch, and the sixth latch is configured to latch the voltage signal connected to the input terminal thereof, and output a sixth output voltage, the sixth output voltage is inverse in phase to the voltage signal connected to the input terminal of the sixth latch;

An input terminal of the seventh latch is electrically connected to the first terminal of the fourth control switch, an output terminal of the seventh latch is electrically connected to the fourth switch control terminal, and the seventh latch is configured to latch the voltage signal connected to the input terminal thereof, and output a seventh output voltage, the seventh output voltage is inverse in phase to the voltage signal connected to the input terminal of the seventh latch;

An input terminal of the eighth latch is electrically connected to the first terminal of the fifth control switch, an output terminal of the eighth latch is electrically connected to the sixth switch control terminal, and the eighth latch is configured to latch the voltage signal connected to the input terminal of the eighth latch, and output an eighth output voltage, the eighth output voltage is inverse in phase to the voltage signal connected to the input terminal of the eighth latch;

An input terminal of the ninth latch is electrically connected to the fourth data access terminal, an output terminal of the ninth latch is electrically connected to the second terminal of the fifth control switch, and the ninth latch is electrically connected to the second terminal of the fifth control switch. The ninth latch is configured to latch the voltage signal connected to its input terminal, and output a ninth output voltage, the ninth output voltage is inverse in phase to the voltage signal connected to the input terminal of the ninth latch;

An input terminal of the tenth latch is electrically connected to the first terminal of the sixth control switch, an output terminal of the tenth latch is electrically connected to the eighth switch control terminal, and the tenth latch is configured to latch the voltage signal connected to the input terminal thereof, and output a tenth output voltage, the tenth output voltage is inverse in phase to the voltage signal connected to the input terminal of the tenth latch;

A control terminal of the first control switch is electrically connected to the output terminal of the first latch, a second terminal of the first control switch is electrically connected to the output terminal of the second latch, and the first control switch is configured to control to connect or disconnect the first terminal of the first control switch and the second terminal of the first control switch under the control of the potential of the control terminal of the first control switch;

A control terminal of the second control switch is electrically connected to the input terminal of the first latch, a second terminal of the second control switch is electrically connected to the input terminal of the second latch, and the second control switch is configured to control to connect or disconnect the first terminal of the second control switch and the second terminal of the second control switch under the control of the potential of the control terminal of the second control switch;

A control terminal of the third control switch is electrically connected to the output terminal of the third latch, and the third control switch is configured to control to connect or disconnect the input terminal of the fifth latch and the output terminal of the sixth latch under the control of the potential of the control terminal of the third control switch;

A control terminal of the fourth control switch is electrically connected to the input terminal of the third latch, and the fourth control switch is configured to control to connect or disconnect the input terminal of the seventh latch and the input terminal of the sixth latch under the control of the potential of the control terminal of the fourth control switch;

A control terminal of the fifth control switch is electrically connected to the output terminal of the fourth latch, and the fifth control switch is configured to control to connect the input terminal of the eighth latch and the output terminal of the ninth latch under the control of the potential of the control terminal of the fifth control switch;

A control terminal of the sixth control switch is electrically connected to the input terminal of the fourth latch, and the sixth control switch is configured to control to connect the input terminal of the tenth latch and the input terminal of the ninth latch under the control of the potential of the control terminal of the sixth control switch;

The first switch control terminal is electrically connected to the input terminal of the fifth latch, and the seventh switch control terminal is electrically connected to the input terminal of the tenth latch.

Figure 8:
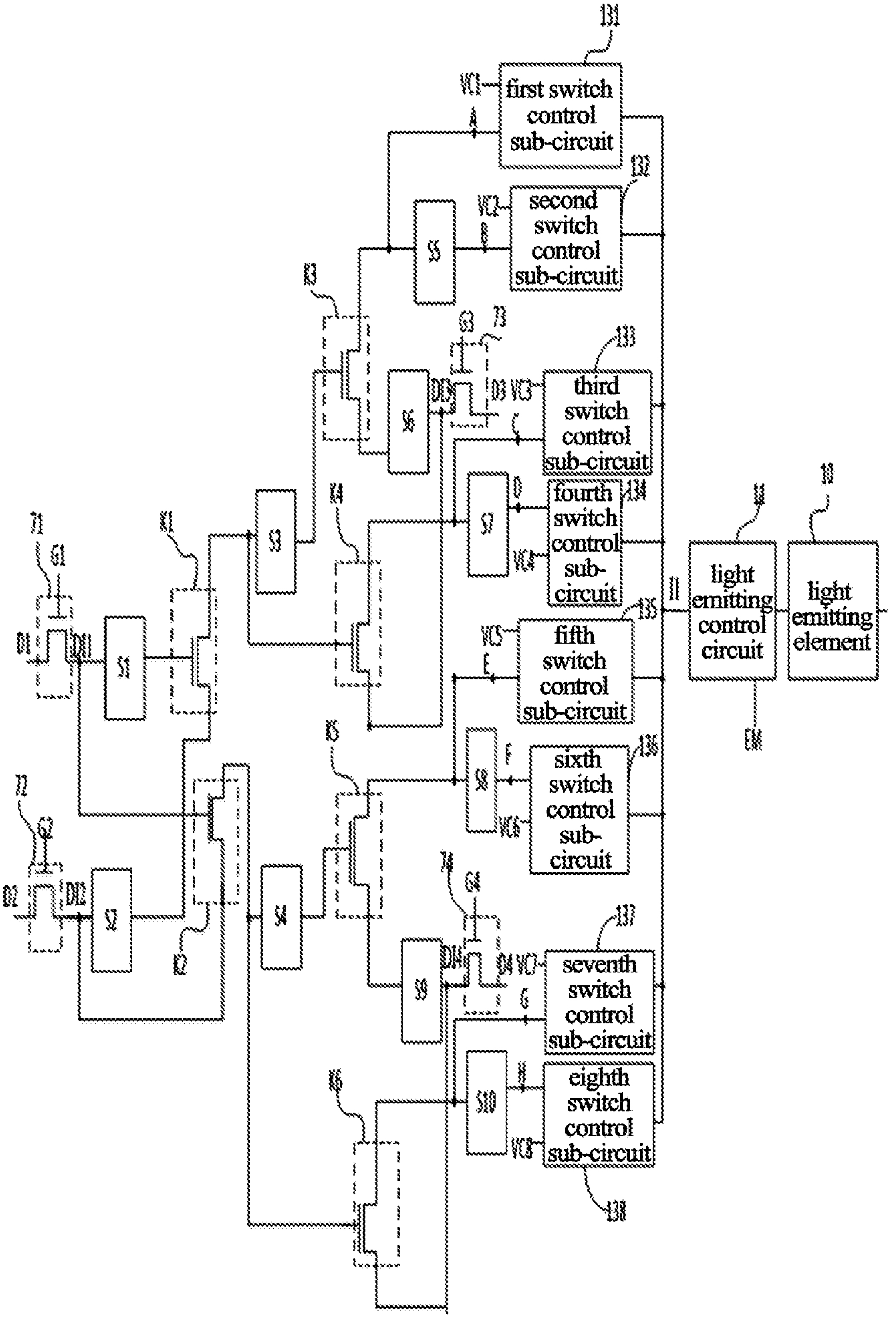
FIG. 8 is a structural diagram of a pixel circuit according to at least one embodiment of the present disclosure.

As shown in FIG. 8, on the basis of at least one embodiment of the pixel circuit shown in FIG. 7, the second control sub-circuit includes a first latch S1, a second latch S2, a third latch S3, a fourth latch S4, a fifth latch S5, a sixth latch S6, a seventh latch S7, an eighth latch S8, a ninth latch S9, a tenth latch S10, the first control switch K1, the second control switch K2, the third control switch K3, the fourth control switch K4, the fifth control switch K5 and the sixth control switch K6; N is equal to 8;

The input terminal of the first latch S1 is electrically connected to the first data access terminal DI1, and the output terminal of the first latch S1 is electrically connected to the control terminal of the first control switch K1, the first latch S1 is configured to latch the voltage signal connected to the first data access terminal DI1, and output the first output voltage Vo1 through the output terminal of the first latch S1, and the first output voltage Vo1 is inverse in phase to the voltage signal connected to the first data access terminal DI1;

The input terminal of the second latch S2 is electrically connected to the second data access terminal DI2, and the output terminal of the second latch S2 is electrically connected to the control terminal of the second control switch K2, the second latch S2 is configured to latch the voltage signal connected to the second data access terminal DI2, and output a second output voltage Vo2 through the output terminal of the second latch S2, and the second output voltage Vo2 is inverse in phase to the voltage signal connected to the second data access terminal DI2;

The input terminal of the third latch S3 is electrically connected to the first terminal of the first control switch K1, and the output terminal of the third latch S3 is electrically connected to the control terminal of the third control switch K3, the third latch S3 is configured to latch the voltage signal connected to its input terminal, and output a third output voltage Vo3 through the output terminal of the third latch S3, and the third output voltage Vo3 is inverse in phase to the voltage signal connected to the input terminal of the third latch S3;

The input terminal of the fourth latch S4 is electrically connected to the first terminal of the second control switch K2, the output terminal of the fourth latch S4 is electrically connected to the control terminal of the fifth control switch K5, the fourth latch S4 is configured to latch the voltage signal connected to its input terminal, and output a fourth output voltage Vo4 through the output terminal of the fourth latch S4, and the fourth output voltage Vo4 is inverse in phase to the voltage signal connected to the input terminal of the fourth latch S4;

The input terminal of the fifth latch S5 is electrically connected to the first terminal of the third control switch K3, the output terminal of the fifth latch S5 is electrically connected to the second switch control terminal B, and the fifth latch S5 is configured to latch the voltage signal connected to its input terminal, and output a fifth output voltage Vo5 through the output terminal of the fifth latch S5, and the fifth output voltage Vo5 is inverse in phase to the voltage signal connected to the input terminal of the latch S5;

The input terminal of the sixth latch S6 is electrically connected to the third data access terminal DI3, the output terminal of the sixth latch S6 is electrically connected to the second terminal of the third control switch K3, the sixth latch S6 is configured to latch the voltage signal connected to its input terminal, and output the sixth output voltage Vo6 through the output terminal of the sixth latch S6, and the sixth output voltage Vo6 is inverse in phase to the voltage signal connected to the input terminal of the sixth latch S6;

The input terminal of the seventh latch S7 is electrically connected to the first terminal of the fourth control switch K4, the output terminal of the seventh latch S7 is electrically connected to the fourth switch control terminal D, and the seven latch S7 is configured to latch the voltage signal connected to its input terminal, and output a seventh output voltage Vo7 through the seventh latch S7, and the seventh output voltage Vo7 is inverse in phase to the voltage signal connected to the input terminal of S7;

The input terminal of the eighth latch S8 is electrically connected to the first terminal of the fifth control switch K5, the output terminal of the eighth latch S8 is electrically connected to the sixth switch control terminal F, and the eighth latch S8 is configured to latch the voltage signal connected to its input terminal, and output the eighth output voltage Vo8 through the output terminal of the eighth latch S8, and the eighth output voltage Vo8 is inverse in phase to the voltage signal connected to the input terminal of the eighth latch S8;

The input terminal of the ninth latch S9 is electrically connected to the fourth data access terminal DI4, the output terminal of the ninth latch S9 is electrically connected to the second terminal of the fifth control switch K5, the ninth latch S9 is configured to latch the voltage signal connected to its input terminal, and output a ninth output voltage Vo9 through the ninth latch S9, and the ninth output voltage Vo9 is inverse in phase to the voltage signal connected to the input terminal of the ninth latch S9;

The input terminal of the tenth latch S10 is electrically connected to the first terminal of the sixth control switch K6, the output terminal of the tenth latch S10 is electrically connected to the eighth switch control terminal H, and the tenth latch S10 is configured to latch the voltage signal connected to its input terminal, and output the tenth output voltage Vo10 through the output terminal of the tenth latch S10, and the tenth output voltage V10 is inverse in phase to the voltage signal connected to the input terminal of the tenth latch S10;

The control terminal of the first control switch K1 is electrically connected to the output terminal of the first latch S1, and the second terminal of the first control switch K1 is electrically connected to the output terminal of the second latch S2, the first control switch K1 is configured to control to connect or disconnect the first terminal of the first control switch K1 and the second terminal of the first control switch K1 under the control of the potential of its control terminal;

The control terminal of the second control switch K2 is electrically connected to the input terminal of the first latch S1, and the second terminal of the second control switch K2 is electrically connected to the input terminal of the second latch S2, the second control switch K2 is configured to control to connect or disconnect the first terminal of the second control switch K2 and the second terminal of the second control switch K2 under the control of the potential of the control terminal thereof;

The control terminal of the third control switch K3 is electrically connected to the output terminal of the third latch S3, and the third control switch K3 is configured to control to connect or disconnect the input terminal of the fifth latch S5 and the output terminal of the sixth latch S6 under the control of the potential of the control terminal thereof;

The control terminal of the fourth control switch K4 is electrically connected to the input terminal of the third latch S3, and the fourth control switch K4 is configured to control to connect or disconnect the input terminal of the seventh latch S7 and the input terminal of the sixth latch S6 under the control of the potential of the control terminal thereof;

The control terminal of the fifth control switch K5 is electrically connected to the output terminal of the fourth latch S4, and the fifth control switch K5 is configured to control to connect the input terminal of the eighth latch S8 and the output terminal of the ninth latch S9 under the control of the potential of the control terminal thereof;

The control terminal of the sixth control switch K6 is electrically connected to the input terminal of the fourth latch S4, and the sixth control switch K6 is configured to control to connect the input terminal of the tenth latch S10 and the input terminal of the ninth latch S9;

The first switch control terminal A is electrically connected to the input terminal of the fifth latch S5, and the seventh switch control terminal G is electrically connected to the input terminal of the tenth latch S10;

The third switch control terminal C is electrically connected to the input terminal of the seventh latch S7, and the fifth switch control terminal E is electrically connected to the input terminal of the eighth latch S8.

When at least one embodiment of the pixel circuit shown in FIG. 8 of the present disclosure is working, When Vdata1 is a low voltage signal, Vdata2 is a low voltage signal, Vdata3 is a low voltage signal, and Vdata4 is a low voltage signal, the gate electrode of K1 is connected to a high voltage signal, the gate electrode of K2 is connected to a low voltage signal, and K1 is turned on. K2 is turned off, the input terminal of S3 is connected to a high voltage signal, S3 outputs a low voltage signal, K3 is turned off, K4 is turned on, the input terminal of S7 is connected to a low voltage signal, and S7 outputs a high voltage signal to the fourth switch control terminal D;

When Vdata1 is a high voltage signal, Vdata2 is a low voltage signal, Vata3 is a low voltage signal, and Vdata4 is a low voltage signal, S1 outputs a low voltage signal, K1 is turned off, S2 outputs a high voltage signal, K2 is turned on, and the input terminal of S4 is connected to the low voltage signal, the control terminal of K5 is connected to the high voltage signal, K5 is turned on, K6 is turned off, the input terminal of S9 is connected to the low voltage signal, S9 outputs the high voltage signal, and the high voltage signal is provided to the fifth switch control terminal E through K5;

When Vdata1 is a low voltage signal, Vdata2 is a high voltage signal, Vdata3 is a low voltage signal, and Vdata4 is a low voltage signal, S1 outputs a high voltage signal, K1 is turned on, K2 is turned off, S2 outputs a low voltage signal, and the input terminal of S3 is connected to the low voltage signal, S3 outputs a high voltage signal, K3 is turned on, K4 is turned off, S6 outputs a high voltage signal, and S6 provides the high voltage signal to the first switch control terminal A through K3 that is turned on;

When Vdata1 is a low voltage signal, Vdata2 is a low voltage signal, Vdata3 is a high voltage signal, and Vdata4 is a low voltage signal, S1 outputs a high voltage signal, S2 provides a high voltage signal, K1 is turned on, K2 is turned off, and the input terminal of S3 is connected to the high voltage signal, S3 outputs a low voltage signal, K3 is turned off, K4 is turned on, the input terminal of S7 is connected to a high voltage signal, and the high voltage signal is written into the third switch control terminal C;

When Vdata1 is a low voltage signal, Vdata2 is a low voltage signal, Vdata3 is a low voltage signal, and Vdata4 is a high voltage signal, S1 outputs a high voltage signal, S2 outputs a high voltage signal, K1 is turned on, K2 is turned off, and the input terminal of S3 is connected to the high voltage signal, S3 outputs a low voltage signal, K3 is turned off, K4 is turned on, the input terminal of S6 is connected to a low voltage signal, the input terminal of S7 is connected to a low voltage signal, and S7 outputs a high voltage signal to the fourth switch control terminal D;

When Vdata1 is a high voltage signal, Vdata2 is a high voltage signal, Vdata3 is a low voltage signal, and Vdata4 is a low voltage signal, S1 outputs a low voltage signal, S2 outputs a low voltage signal, K1 is turned off, K2 is turned on, and the input terminal of S4 is connected to the high voltage signal, S4 outputs the low voltage signal, K7 is turned off, K8 is turned on, the input terminal of S9 is connected to the low voltage signal, the input terminal of S10 is connected to the low voltage signal, S10 outputs the high voltage signal to the eighth switch control terminal H;

When Vdata1 is a high voltage signal, Vdata2 is a high voltage signal, Vdata3 is a low voltage signal, and Vdata4 is a high voltage signal, S1 outputs a low voltage signal, S2 outputs a low voltage signal, K1 is turned off, K2 is turned on, and the input terminal of S4 is connected to the high voltage signal, S4 outputs a low voltage signal, K7 is turned off, K8 is turned on, the input terminal of S9 is connected to a high voltage signal, the input terminal of S10 is connected to a high voltage signal, and S10 outputs a low voltage signal to write the high voltage signal into the seventh switch control terminal G;

When Vdata1 is a high voltage signal, Vdata2 is a high voltage signal, Vdata3 is a outputs a low voltage signal, K1 is turned off, and K2 is turned on; the input terminal of S4 is connected to the high voltage signal, S4 outputs the low voltage signal, K7 is turned off, K8 is turned on, the input terminal of S9 is connected to the low voltage signal, S9 outputs the high voltage signal, the input terminal of S10 is connected to the low voltage signal, S10 outputs the high voltage signal to the eighth switch control terminal H;

When Vdata1 is a high voltage signal, Vdata2 is a high voltage signal, Vdata3 is a high voltage signal, and Vdata4 is a high voltage signal, S1 outputs a low voltage signal, S2 outputs a low voltage signal, K1 is turned off, K2 is turned on, and the input terminal of S4 is connected to the high voltage signal, S4 outputs the low voltage signal, K7 is turned off, K8 is turned on, the input terminal of S9 is connected to the high voltage signal, S9 outputs the low voltage signal, the input terminal of S10 is connected to the high voltage signal, and S10 outputs the low voltage signal to provide a high voltage signal to the seventh switch control terminal G;

When Vdata1 is a high voltage signal, Vdata2 is a low voltage signal, Vdata3 is a high voltage signal, and Vdata4 is a high voltage signal, S1 outputs a low voltage signal, S2 outputs a high voltage signal, K1 is turned off, K2 is turned on, and the input terminal of S4 is connected to the low voltage signal, S4 outputs a high voltage signal, K7 is turned on, K8 is turned off, the input terminal of S9 is connected to a high voltage signal, S9 outputs a low voltage signal to the input terminal of S8, and S8 outputs a high voltage signal to the sixth switch control terminal F;

When Vdata1 is a high voltage signal, Vdata2 is a low voltage signal, Vdata3 is a low voltage signal, and Vdata4 is a high voltage signal, S1 outputs a low voltage signal, S2 provides a high voltage signal, K1 is turned off, K2 is turned on, and the input terminal of S4 is connected to the low voltage signal, S4 outputs a high voltage signal, K7 is turned on, K8 is turned off, the input terminal of S9 is connected to a high voltage signal, S9 outputs a low voltage signal to the input terminal of S8, and S8 outputs a high voltage signal to the sixth switch control terminal F;

When Vdata1 is a high voltage signal, Vdata2 is a low voltage signal, Vdata3 is a provides a high voltage signal, K1 is turned off, K2 is turned on, and the input terminal of S4 is connected to the low voltage signal, S4 outputs the high voltage signal, K7 is turned on, K8 is turned off, the input terminal of S9 is connected with the low voltage signal, S9 outputs the high voltage signal to the input terminal of S8, S8 outputs the low voltage signal, and S9 outputs high voltage signal to the fifth switch control terminal E;

When Vdata1 is a low voltage signal, Vdata2 is a high voltage signal, Vdata3 is a high voltage signal, and Vdata4 is a high voltage signal, S1 outputs a high voltage signal, S2 outputs a low voltage signal, K1 is turned on, K2 is turned off, and the input terminal of S3 is connected to the low voltage signal, S3 outputs the high voltage signal, K3 is turned on, K4 is turned off, the input terminal of S6 is connected to the high voltage signal, S6 outputs the low voltage signal, the input terminal of S5 is connected to the low voltage signal, S5 outputs the high voltage signal to the second switch control terminal B;

When Vdata1 is a low voltage signal, Vdata2 is a high voltage signal, Vdata3 is a low voltage signal, and Vdata4 is a high voltage signal, S1 outputs a high voltage signal, S2 outputs a low voltage signal, K1 is turned on, K2 is turned off, and the input terminal of S3 is connected to the low voltage signal, S3 outputs a high voltage signal, K3 is turned on, K4 is turned off, the input terminal of S6 is connected to a low voltage signal, and S6 outputs a high voltage signal to the first switch control terminal A;

When Vdata1 is a low voltage signal, Vdata2 is a high voltage signal, Vdata3 is a high voltage signal, and Vdata4 is a low voltage signal, S1 outputs a high voltage signal, S2 outputs a low voltage signal, K1 is turned on, K2 is turned off, and the input terminal of S3 is connected to the low voltage signal, S3 outputs a high voltage signal, K3 is turned on, K4 is turned off, the input terminal of S6 is connected to a high voltage signal, S6 outputs a low voltage signal to the input terminal of S5, and S5 outputs a high voltage signal to the second switch control terminal B;

When Vdata1 is a low voltage signal, Vdata2 is a low voltage signal, Vdata3 is a high voltage signal, and Vdata4 is a high voltage signal, S1 outputs a high voltage signal, S2 outputs a high voltage signal, K1 is turned on, K2 is turned off, and the input terminal of S3 is connected to the high voltage signal, S3 outputs a low voltage signal, K3 is turned off, K4 is turned on, the input terminal of S6 is connected to a high voltage signal, the input terminal of S7 is connected to a high voltage signal, S7 outputs a low voltage signal, and provides the high voltage signal to the third switch control terminal C.

In at least one embodiment of the present disclosure, the first latch includes a first inverter and a second inverter;

An input terminal of the first inverter is electrically connected to the input terminal of the first latch, and an output terminal of the first inverter is electrically connected to the output terminal of the first latch;

An input terminal of the second inverter is electrically connected to the output terminal of the first inverter, and an output terminal of the second inverter is electrically connected to the input terminal of the first inverter;

The second latch includes a third inverter and a fourth inverter;

An input terminal of the third inverter is electrically connected to the input terminal of the second latch, and an output terminal of the third inverter is electrically connected to the output terminal of the second latch;

An input terminal of the fourth inverter is electrically connected to the output terminal of the third inverter, and an output terminal of the fourth inverter is electrically connected to the input terminal of the third inverter;

The third latch includes a fifth inverter and a sixth inverter;

An input terminal of the fifth inverter is electrically connected to the input terminal of the third latch, and an output terminal of the fifth inverter is electrically connected to the output terminal of the third latch;

An input terminal of the sixth inverter is electrically connected to the output terminal of the fifth inverter, and an output terminal of the sixth inverter is electrically connected to the input terminal of the fifth inverter;

The fourth latch includes a seventh inverter and an eighth inverter;

An input terminal of the seventh inverter is electrically connected to the input terminal of the fourth latch, and an output terminal of the seventh inverter is electrically connected to the output terminal of the fourth latch;

An input terminal of the eighth inverter is electrically connected to the output terminal of the seventh inverter, and an output terminal of the eighth inverter is electrically connected to the input terminal of the seventh inverter;

The fifth latch includes a ninth inverter and a tenth inverter;

An input terminal of the ninth inverter is electrically connected to the input terminal of the fifth latch, and an output terminal of the ninth inverter is electrically connected to the output terminal of the fifth latch;

An input terminal of the tenth inverter is electrically connected to the output terminal of the ninth inverter, and an output terminal of the tenth inverter is electrically connected to the input terminal of the ninth inverter;

The sixth latch includes an eleventh inverter and a twelfth inverter;

An input terminal of the eleventh inverter is electrically connected to the input terminal of the sixth latch, and an output terminal of the eleventh inverter is electrically connected to the output terminal of the sixth latch;

An input terminal of the twelfth inverter is electrically connected to the output terminal of the eleventh inverter, and an output terminal of the twelfth inverter is electrically connected to the input terminal of the eleventh inverter;

The seventh latch includes a thirteenth inverter and a fourteenth inverter;

An input terminal of the thirteenth inverter is electrically connected to the input terminal of the seventh latch, and an output terminal of the thirteenth inverter is electrically connected to the output terminal of the seventh latch;

An input terminal of the fourteenth inverter is electrically connected to the output terminal of the thirteenth inverter, and an output terminal of the fourteenth inverter is electrically connected to the input terminal of the thirteenth inverter;

The eighth latch includes a fifteenth inverter and a sixteenth inverter;

An input terminal of the fifteenth inverter is electrically connected to the input terminal of the eighth latch, and an output terminal of the fifteenth inverter is electrically connected to the output terminal of the eighth latch;

An input terminal of the sixteenth inverter is electrically connected to the output terminal of the fifteenth inverter, and an output terminal of the sixteenth inverter is electrically connected to the input terminal of the fifteenth inverter;

The ninth latch includes a seventeenth inverter and an eighteenth inverter;

An input terminal of the seventeenth inverter is electrically connected to the input terminal of the ninth latch, and an output terminal of the seventeenth inverter is electrically connected to the output terminal of the ninth latch;

An input terminal of the eighteenth inverter is electrically connected to the output terminal of the seventeenth inverter, and an output terminal of the eighteenth inverter is electrically connected to the input terminal of the seventeenth inverter;

The tenth latch includes a nineteenth inverter and a twentieth inverter;

An input terminal of the nineteenth inverter is electrically connected to the input terminal of the tenth latch, and an output terminal of the nineteenth inverter is electrically connected to the output terminal of the tenth latch;

An input terminal of the twentieth inverter is electrically connected to the output terminal of the nineteenth inverter, and an output terminal of the twentieth inverter is electrically connected to the input terminal of the nineteenth inverter.

Optionally, the first control switch is a first control transistor, the second control switch is a second control transistor; the third control switch is a third control transistor, and the fourth control switch is a fourth control transistor; the fifth control switch is a fifth control transistor, and the sixth control switch is a sixth control transistor;

A control electrode of the first control transistor is electrically connected to the output terminal of the first latch, a first electrode of the first control transistor is electrically connected to the input terminal of the third latch, and a second electrode of the first control transistor is electrically connected to the output terminal of the second latch;

A control electrode of the second control transistor is electrically connected to the input terminal of the first latch, a first electrode of the second control transistor is electrically connected to the input terminal of the fourth latch, and a second electrode of the second control transistor is electrically connected to the input terminal of the second latch;

A control electrode of the third control transistor is electrically connected to the output terminal of the third latch, a first electrode of the third control transistor is electrically connected to the input terminal of the fifth latch, and a second electrode of the third control transistor is electrically connected to the output terminal of the sixth latch;

A control electrode of the fourth control transistor is electrically connected to the input terminal of the third latch, a first electrode of the fourth control transistor is electrically connected to the input terminal of the seventh latch, and the second electrode of the fourth transistor is electrically connected to the input terminal of the sixth latch;

A control electrode of the fifth control transistor is electrically connected to the output terminal of the fourth latch, a first electrode of the fifth control transistor is electrically connected to the input terminal of the eighth latch, and a second electrode of the fifth control transistor is electrically connected to the output terminal of the ninth latch;

A control electrode of the sixth control transistor is electrically connected to the input terminal of the fourth latch, a first electrode of the sixth control transistor is electrically connected to the input terminal of the tenth latch, and a second electrode of the sixth control transistor is electrically connected to the input terminal of the ninth latch.

Optionally, the first data writing-in circuit includes a first writing-in transistor, the second data writing-in circuit includes a second writing-in transistor, and the third data writing-in circuit includes a third writing-in transistor, the fourth data writing-in circuit includes a fourth writing-in transistor;

A control electrode of the first writing-in transistor is electrically connected to the first scanning terminal, a first electrode of the first writing-in transistor is electrically connected to the first data voltage terminal, and a second electrode of the first writing-in transistor is electrically connected to the first data access terminal;

A control electrode of the second writing-in transistor is electrically connected to the second scanning terminal, a first electrode of the second writing-in transistor is electrically connected to the second data voltage terminal, and a second electrode of the second writing-in transistor is electrically connected to the second data access terminal;

A control electrode of the third writing-in transistor is electrically connected to the third scanning terminal, a first electrode of the third writing-in transistor is electrically connected to the third data voltage terminal, and a second electrode of the third writing-in transistor is electrically connected to the third data access terminal;

A control electrode of the fourth writing-in transistor is electrically connected to the fourth scanning terminal, a first electrode of the fourth writing-in transistor is electrically connected to the fourth data voltage terminal, and a second electrode of the fourth writing-in transistor is electrically connected to the fourth data access terminal.

Figure 9:
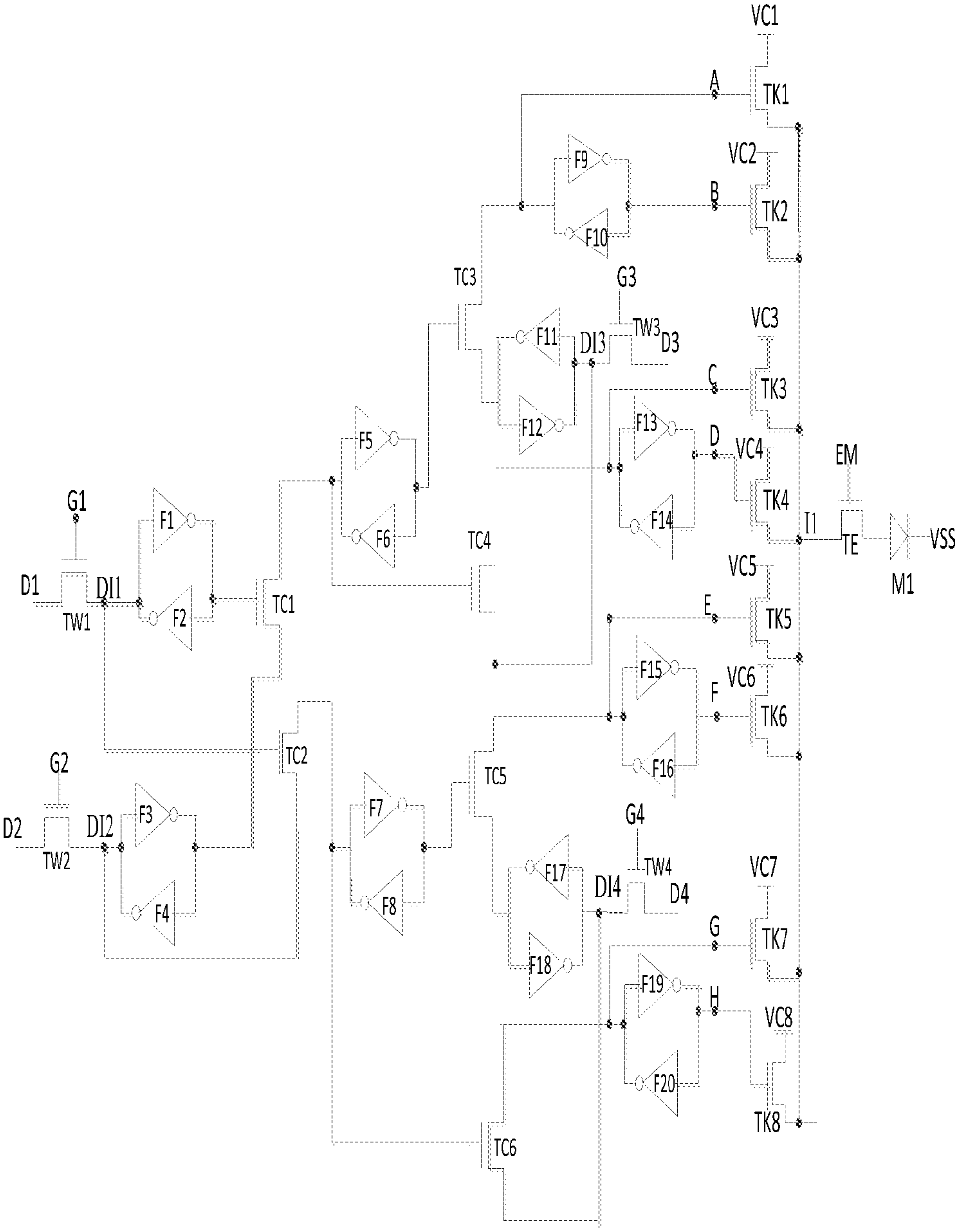
FIG. 9 is a circuit diagram of a pixel circuit according to at least one embodiment of the present disclosure.

As shown in FIG. 9, on the basis of at least one embodiment of the pixel circuit shown in FIG. 8, the first latch includes a first inverter F1 and a second inverter F2;

The input terminal of the first inverter F1 is electrically connected to the input terminal of the first latch, and the output terminal of the first inverter F1 is electrically connected to the output terminal of the first latch;

The input terminal of the second inverter F2 is electrically connected to the output terminal of the first inverter F1, and the output terminal of the second inverter F2 is electrically connected to the input terminal of the first inverter F1;

The second latch includes a third inverter F3 and a fourth inverter F4;

The input terminal of the third inverter F3 is electrically connected to the input terminal of the second latch, and the output terminal of the third inverter F3 is electrically connected to the output terminal of the second latch;

The input terminal of the fourth inverter F4 is electrically connected to the output terminal of the third inverter F3, and the output terminal of the fourth inverter F4 is electrically connected to the input terminal of the third inverter F3;

The third latch includes a fifth inverter F5 and a sixth inverter F6;

The input terminal of the fifth inverter F5 is electrically connected to the input terminal of the third latch, and the output terminal of the fifth inverter F5 is electrically connected to the output terminal of the third latch;

The input terminal of the sixth inverter F6 is electrically connected to the output terminal of the fifth inverter F5, and the output terminal of the sixth inverter F6 is electrically connected to the input terminal of the fifth inverter F5;

The fourth latch includes a seventh inverter F7 and an eighth inverter F8;

The input terminal of the seventh inverter F7 is electrically connected to the input terminal of the fourth latch, and the output terminal of the seventh inverter F7 is electrically connected to the output terminal of the fourth latch;

The input terminal of the eighth inverter F8 is electrically connected to the output terminal of the seventh inverter F7, and the output terminal of the eighth inverter F8 is electrically connected to the input terminal of the seventh inverter F7;

The fifth latch includes a ninth inverter F9 and a tenth inverter F10;

The input terminal of the ninth inverter F9 is electrically connected to the input terminal of the fifth latch, and the output terminal of the ninth inverter F9 is electrically connected to the output terminal of the fifth latch;

The input terminal of the tenth inverter F10 is electrically connected to the output terminal of the ninth inverter F9, and the output terminal of the tenth inverter F10 is electrically connected to the input terminal of the fifth inverter F5;

The sixth latch includes an eleventh inverter F11 and a twelfth inverter F12;

The input terminal of the eleventh inverter F11 is electrically connected to the input terminal of the sixth latch, and the output terminal of the eleventh inverter F11 is electrically connected to the output terminal of the sixth latch;

The input terminal of the twelfth inverter F12 is electrically connected to the output terminal of the eleventh inverter F11, and the output terminal of the twelfth inverter F12 is electrically connected to the input terminal of the eleventh inverter F11;

The seventh latch includes a thirteenth inverter F13 and a fourteenth inverter F14;

The input terminal of the thirteenth inverter F13 is electrically connected to the input terminal of the seventh latch, and the output terminal of the thirteenth inverter F13 is electrically connected to the output terminal of the seventh latch;

The input terminal of the fourteenth inverter F14 is electrically connected to the output terminal of the thirteenth inverter F13, and the output terminal of the fourteenth inverter F14 is electrically connected to the input terminal of the thirteenth inverter F13;

The eighth latch includes a fifteenth inverter F15 and a sixteenth inverter F16;

The input terminal of the fifteenth inverter F15 is electrically connected to the input terminal of the eighth latch, and the output terminal of the fifteenth inverter F15 is electrically connected to the output terminal of the eighth latch;

The input terminal of the sixteenth inverter F16 is electrically connected to the output terminal of the fifteenth inverter F15, and the output terminal of the sixteenth inverter F16 is electrically connected to the input terminal of the fifteenth inverter F15;

The ninth latch includes a seventeenth inverter F17 and an eighteenth inverter F18;

The input terminal of the seventeenth inverter F17 is electrically connected to the input terminal of the ninth latch, and the output terminal of the seventeenth inverter F17 is electrically connected to the output terminal of the ninth latch;

The input terminal of the eighteenth inverter F18 is electrically connected to the output terminal of the seventeenth inverter F17, and the output terminal of the eighteenth inverter F18 is electrically connected to the input terminal of the seventeenth inverter F17; The tenth latch includes a nineteenth inverter F19 and a twentieth inverter F20;

The input terminal of the nineteenth inverter F19 is electrically connected to the input terminal of the tenth latch, and the output terminal of the nineteenth inverter S19 is electrically connected to the output terminal of the tenth latch;

The input terminal of the twentieth inverter F20 is electrically connected to the output terminal of the nineteenth inverter F19, and the output terminal of the twentieth inverter F20 is electrically connected to the input terminal of the nineteenth inverter F19;

The first control switch is a first control transistor TC1, the second control switch is a second control transistor TC2; the third control switch is a third control transistor TC3, and the fourth control switch is a fourth control transistor TC4; the fifth control switch is a fifth control transistor TC5, and the sixth control switch is a sixth control transistor TC6;

The gate electrode of the first control transistor TC1 is electrically connected to the output terminal of the first latch S1, the drain electrode of the first control transistor TC1 is electrically connected to the input terminal of the third latch S3, the source electrode of the first control transistor TC1 is electrically connected to the output terminal of the second latch S2;

The gate electrode of the second control transistor TC2 is electrically connected to the input terminal of the first latch S1, and the drain electrode of the second control transistor TC2 is electrically connected to the input terminal of the fourth latch S4, the source electrode of the second control transistor TC2 is electrically connected to the input terminal of the second latch S2;

The gate electrode of the third control transistor TC3 is electrically connected to the output terminal of the third latch S3, and the drain electrode of the third control transistor TC3 is electrically connected to the input terminal of the fifth latch S5, the source electrode of the third control transistor TC3 is electrically connected to the output terminal of the sixth latch S6;

The gate electrode of the fourth control transistor TC4 is electrically connected to the input terminal of the third latch S3, the drain electrode of the fourth control transistor TC4 is electrically connected to the input terminal of the seventh latch S7, and the source electrode of the fourth control transistor TC4 is electrically connected to the input terminal of the sixth latch S6;

The gate electrode of the fifth control transistor TC5 is electrically connected to the output terminal of the fourth latch S4, the drain electrode of the fifth control transistor TC5 is electrically connected to the input terminal of the eighth latch S8, the source electrode of the fifth control transistor TC5 is electrically connected to the output terminal of the ninth latch S9;

The gate electrode of the sixth control transistor TC6 is electrically connected to the input terminal of the fourth latch S4, and the drain electrode of the sixth control transistor TC6 is electrically connected to the input terminal of the tenth latch S10, the source electrode of the sixth control transistor TC6 is electrically connected to the input terminal of the ninth latch S9;

The first data writing-in circuit includes a first writing-in transistor TW1, the second data writing-in circuit includes a second writing-in transistor TW2, and the third data writing-in circuit includes a third writing-in transistor TW3, the fourth data writing-in circuit includes a fourth writing-in transistor TW4;

The gate electrode of the first writing-in transistor TW1 is electrically connected to the first scanning terminal G1, the drain electrode of the first writing-in transistor TW1 is electrically connected to the first data voltage terminal D1, and the source electrode of the first writing-in transistor TW1 is electrically connected to the first data access terminal DI1;

The gate electrode of the second writing-in transistor TW2 is electrically connected to the second scanning terminal G2, the drain electrode of the second writing-in transistor TW2 is electrically connected to the second data voltage terminal D2, and the source electrode of the second writing-in transistor TW2 is electrically connected to the second data access terminal DI2;

The gate electrode of the third writing-in transistor TW3 is electrically connected to the third scanning terminal G3, the drain electrode of the third writing-in transistor TW3 is electrically connected to the third data voltage terminal D3, and the source electrode of the third writing-in transistor TW3 is electrically connected to the third data access terminal DI3;

The gate electrode of the fourth writing-in transistor TW4 is electrically connected to the fourth scanning terminal G4, the drain electrode of the fourth writing-in transistor TW4 is electrically connected to the fourth data voltage terminal D4, and the source electrode of the fourth writing-in transistor TW4 is electrically connected to the fourth data access terminal DI4;

The first switch control sub-circuit includes a first switch control transistor TK1;

The gate electrode of the first switch control transistor TK1 is electrically connected to the first switch control terminal A, the drain electrode of the first switch control transistor TK1 is electrically connected to the first light emitting control voltage terminal VC1, and the source electrode of the first switch control transistor TK1 is electrically connected to the control voltage input terminal I1;

The second switch control sub-circuit includes a second switch control transistor TK2;

The gate electrode of the second switch control transistor TK2 is electrically connected to the second switch control terminal B, the drain electrode of the second switch control transistor TK2 is electrically connected to the second light emitting control voltage terminal VC2, and the source electrode of the second switch control transistor TK2 is electrically connected to the control voltage input terminal I1;

The third switch control sub-circuit includes a third switch control transistor TK3;

The gate electrode of the third switch control transistor TK3 is electrically connected to the third switch control terminal C, the drain electrode of the third switch control transistor TK3 is electrically connected to the third light emitting control voltage terminal VC2, and the source electrode of the third switch control transistor TK3 is electrically connected to the control voltage input terminal I1;

The fourth switch control sub-circuit includes a fourth switch control transistor TK4;

The gate electrode of the fourth switch control transistor TK4 is electrically connected to the fourth switch control terminal D, the drain electrode of the fourth switch control transistor TK4 is electrically connected to the fourth light emitting control voltage terminal VC4, and the source electrode of the fourth switch control transistor TK4 is electrically connected to the control voltage input terminal I1;

The fifth switch control sub-circuit includes a fifth switch control transistor TK5;

The gate electrode of the fifth switch control transistor TK5 is electrically connected to the fifth switch control terminal E, the drain electrode of the fifth switch control transistor TK5 is electrically connected to the fifth light emitting control voltage terminal VC5, and the source electrode of the fifth switch control transistor TK5 is electrically connected to the control voltage input terminal I1;

The sixth switch control sub-circuit includes a sixth switch control transistor TK6;

The gate electrode of the sixth switch control transistor TK6 is electrically connected to the sixth switch control terminal F, the drain electrode of the sixth switch control transistor TK6 is electrically connected to the sixth light emitting control voltage terminal VC6, and the source electrode of the sixth switch control transistor TK6 is electrically connected to the control voltage input terminal I1;

The seventh switch control sub-circuit includes a seventh switch control transistor TK7;

The gate electrode of the seventh switch control transistor TK7 is electrically connected to the seventh switch control terminal G, the drain electrode of the seventh switch control transistor TK7 is electrically connected to the seventh light emitting control voltage terminal VC7, and the source electrode of the seventh switch control transistor TK7 is electrically connected to the control voltage input terminal I1;

The eighth switch control sub-circuit includes an eighth switch control transistor TK8;

The gate electrode of the eighth switch control transistor TK8 is electrically connected to the eighth switch control terminal H, the drain electrode of the eighth switch control transistor TK8 is electrically connected to the eighth light emitting control voltage terminal VC8, and the source electrode of the eighth switch control transistor TK8 is electrically connected to the control voltage input terminal I1;

The light emitting control circuit includes a light emitting control transistor TE;

The gate electrode of the light emitting control transistor TE is electrically connected to the light emitting control terminal EM, the drain electrode of the light emitting control transistor TE is electrically connected to the control voltage input terminal I1, and the source electrode of the light emitting control transistor TE is connected to the anode of M1, and the cathode of M1 is electrically connected to the low voltage terminal VSS.

In at least one embodiment of the pixel circuit shown in FIG. 9, all transistors are n-type transistors, but not limited thereto.

Figure 10:
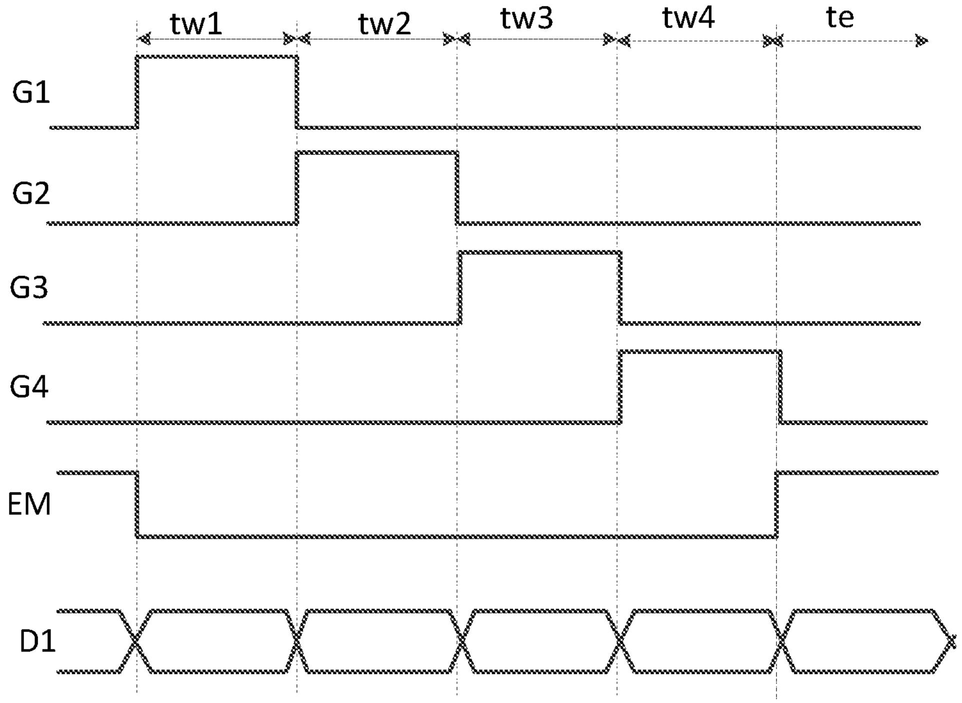
FIG. 10 is a working timing diagram of the pixel circuit shown in FIG. 9.

When at least one embodiment of the pixel circuit shown in FIG. 9 of the present disclosure is in operation, as shown in FIG. 10, the display period includes a first writing-in phase tw1, a second writing-in phase tw2, a third writing-in phase tw3, a fourth writing-in phase tw4 and a light emitting phase the that are set sequentially;

In the first writing-in phase tw1, G1 provides a high voltage signal, G2, G3 and G4 all provide a low voltage signal, and D1 provides the first data voltage Vdata to the first data access terminal DI1;

In the second writing-in phase tw2, G2 provides a high voltage signal, G1, G3 and G4 all provide low voltage signals, and D2 provides the second data voltage Vdata2 to the second data access terminal DI2;

In the third writing-in phase tw3, G3 provides a high voltage signal, G1, G2 and G4 all provide a low voltage signal, and D3 provides a third data voltage Vdata3 to the third data access terminal DI3;

In the fourth writing-in phase tw4, G4 provides a high voltage signal, G1, G2 and G3 all provide a low voltage signal, and D4 provides a fourth data voltage Vdata4 to the fourth data access terminal DI4;

When Vdata1 is a low voltage signal, Vdata2 is a low voltage signal, Vdata3 is a low voltage signal, and Vdata4 is a low voltage signal, the gate electrode of K1 is connected to a high voltage signal, the gate electrode of K2 is connected to a low voltage signal, and K1 is turned on. K2 is turned off, the input terminal of S3 is connected to a high voltage signal, S3 outputs a low voltage signal, K3 is turned off, K4 is turned on, the input terminal of S7 is connected to a low voltage signal, and S7 outputs a high voltage signal to the fourth switch control terminal D; in the light emitting phase te, TK4 is turned on, TE is turned on, the drain electrode of TE is connected to the fourth light emitting control voltage, and M1 emits light;

When Vdata1 is a high voltage signal, Vdata2 is a low voltage signal, Vata3 is a low voltage signal, and Vdata4 is a low voltage signal, S1 outputs a low voltage signal, K1 is turned off, S2 outputs a high voltage signal, K2 is turned on, and the input terminal of S4 is connected to the low voltage signal, the control terminal of K5 is connected to the high voltage signal, K5 is turned on, K6 is turned off, the input terminal of S9 is connected to the low voltage signal, S9 outputs the high voltage signal, and the high voltage signal is provided to the fifth switch control terminal E through K5; in the light emitting phase te, TK5 is turned on, TE is turned on, the drain electrode of TE is connected to the fifth light emitting control voltage, and M1 emits light;

When Vdata1 is a low voltage signal, Vdata2 is a high voltage signal, Vdata3 is a low voltage signal, and Vdata4 is a low voltage signal, S1 outputs a high voltage signal, K1 is turned on, K2 is turned off, S2 outputs a low voltage signal, and the input terminal of S3 is connected to the low voltage signal, S3 outputs a high voltage signal, K3 is turned on, K4 is turned off, S6 outputs a high voltage signal, and S6 provides a high voltage signal to the first switch control terminal A through K3 that is turned on; in the light emitting stage te, TK1 is turned on, TE is turned on, the drain electrode of TE is connected to the first light emitting control voltage, and M1 emits light;

When Vdata1 is a low voltage signal, Vdata2 is a low voltage signal, Vdata3 is a high voltage signal, and Vdata4 is a low voltage signal, S1 outputs a high voltage signal, S2 provides a high voltage signal, K1 is turned on, K2 is turned off, and the input terminal of S3 is connected to a high voltage signal, S3 outputs a low voltage signal, K3 is turned off, K4 is turned on, the input terminal of S7 is connected to a high voltage signal, and the high voltage signal is written into the third switch control terminal C; in the light emitting phase te, TK3 is turned on, TE is turned on, the drain electrode of TE is connected to the third light emitting control voltage, and M1 emits light;

When Vdata1 is a low voltage signal, Vdata2 is a low voltage signal, Vdata3 is a low voltage signal, and Vdata4 is a high voltage signal, S1 outputs a high voltage signal, S2 outputs a high voltage signal, K1 is turned on, K2 is turned off, and the input terminal of S3 is connected to the high voltage signal, S3 outputs a low voltage signal, K3 is turned off, K4 is turned on, the input terminal of S6 is connected to a low voltage signal, the input terminal of S7 is connected to a low voltage signal, and S7 outputs a high voltage signal to the fourth switch control terminal D; in the light emitting phase te, TK4 is turned on, TE is turned on, the drain electrode of TE is connected to the fourth light emitting control voltage, and M1 emits light;

When Vdata1 is a high voltage signal, Vdata2 is a high voltage signal, Vdata3 is a low voltage signal, and Vdata4 is a low voltage signal, S1 outputs a low voltage signal, S2 outputs a low voltage signal, K1 is turned off, K2 is turned on, and the input terminal of S4 is connected to the high voltage signal, S4 outputs the low voltage signal, K7 is turned off, K8 is turned on, the input terminal of S9 is connected the low voltage signal, the input terminal of S10 is connected to the low voltage signal, S10 outputs the high voltage signal to the eighth switch control terminal H; in the light emitting phase te, TK8 is turned on, TE is turned on, the drain electrode of TE is connected to the eighth light emitting control voltage, and M1 emits light;

When Vdata1 is a high voltage signal, Vdata2 is a high voltage signal, Vdata3 is a low voltage signal, and Vdata4 is a high voltage signal, S1 outputs a low voltage signal, S2 outputs a low voltage signal, K1 is turned off, K2 is turned on, and the input terminal of S4 is connected to the high voltage signal, S4 outputs a low voltage signal, K7 is turned off, K8 is turned on, the input terminal of S9 is connected to a high voltage signal, the input terminal of S10 is connected to a high voltage signal, and S10 outputs a low voltage signal to write the high voltage signal into the seventh switch control terminal G; in the light emitting phase te, TK7 is turned on, TE is turned on, the drain electrode of TE is connected to the seventh light emitting control voltage, and M1 emits light;

When Vdata1 is a high voltage signal, Vdata2 is a high voltage signal, Vdata3 is a outputs a low voltage signal, K1 is turned off, and K2 is turned on; the input terminal of S4 is connected to the high voltage signal, S4 outputs the low voltage signal, K7 is turned off, K8 is turned on, the input terminal of S9 is connected to the low voltage signal, S9 outputs the high voltage signal, the input terminal of S10 is connected to the low voltage signal, S10 outputs high voltage signal to the eighth switch control terminal H; in the light emitting phase te, TK8 is turned on, TE is turned on, the drain electrode of TE is connected to the eighth light emitting control voltage, and M1 emits light;

When Vdata1 is a high voltage signal, Vdata2 is a high voltage signal, Vdata3 is a high voltage signal, and Vdata4 is a high voltage signal, S1 outputs a low voltage signal, S2 outputs a low voltage signal, K1 is turned off, K2 is turned on, and the input terminal of S4 is connected to the high voltage signal, S4 outputs the low voltage signal, K7 is turned off, K8 is turned on, the input terminal of S9 is connected to the high voltage signal, S9 outputs the low voltage signal, the input terminal of S10 is connected to the high voltage signal, and S10 outputs the low voltage signal to provide a high voltage signal to the seventh switch control terminal G; in the light emitting phase te, TK7 is turned on, TE is turned on, the drain electrode of TE is connected to the seventh light emitting control voltage, and M1 emits light;

When Vdata1 is a high voltage signal, Vdata2 is a low voltage signal, Vdata3 is a high voltage signal, and Vdata4 is a high voltage signal, S1 outputs a low voltage signal, S2 outputs a high voltage signal, K1 is turned off, K2 is turned on, and the input terminal of S4 is connected to the low voltage signal, S4 outputs a high voltage signal, K7 is turned on, K8 is turned off, and the input terminal of S9 is connected to a high voltage signal, S9 outputs the low voltage signal to the input terminal of S8, S8 outputs the high voltage signal to the sixth switch control terminal F; in the light emitting phase te, TK6 is turned on, TE is turned on, the drain electrode of TE is connected to the sixth light emitting control voltage, M1 emits light;

When Vdata1 is a high voltage signal, Vdata2 is a low voltage signal, Vdata3 is a low voltage signal, and Vdata4 is a high voltage signal, S1 outputs a low voltage signal, S2 provides a high voltage signal, K1 is turned off, K2 is turned on, and the input terminal of S4 is connected to the low voltage signal, S4 outputs a high voltage signal, K7 is turned on, K8 is turned off, the input terminal of S9 is connected to a high voltage signal, S9 outputs a low voltage signal to the input terminal of S8, and S8 outputs a high voltage signal to the sixth switch control terminal F; in the light emitting phase te, TK6 is turned on, TE is turned on, the drain electrode of TE is connected to the sixth light emitting control voltage, and M1 emits light;

When Vdata1 is a high voltage signal, Vdata2 is a low voltage signal, Vdata3 is a high voltage signal, and Vdata4 is a low voltage signal, S1 outputs a low voltage signal, S2 provides a high voltage signal, K1 is turned off, K2 is turned on, and the input terminal of S4 is connected to the low voltage signal, S4 outputs the high voltage signal, K7 is turned on, K8 is turned off, the input terminal of S9 is connected with low voltage signal, S9 outputs high voltage signal to the input terminal of S8, S8 outputs the low voltage signal, and S9 outputs the high voltage signal to the fifth switch control terminal E; in the light emitting phase te, TK5 is turned on, TE is turned on, the drain electrode of TE is connected to the fifth light emitting control voltage, and M1 emits light;

When Vdata1 is a low voltage signal, Vdata2 is a high voltage signal, Vdata3 is a high voltage signal, and Vdata4 is a high voltage signal, S1 outputs a high voltage signal, S2 outputs a low voltage signal, K1 is turned on, K2 is turned off, and the input terminal of S3 is connected to the low voltage signal, S3 outputs the high voltage signal, K3 is turned on, K4 is turned off, the input terminal of S6 is connected to the high voltage signal, S6 outputs the low voltage signal, the input terminal of S5 is connected to the low voltage signal, S5 outputs the high voltage signal to the second switch control terminal B; in the light emitting phase te, TK2 is turned on, TE is turned on, the drain electrode of TE is connected to the second light emitting control voltage, and M1 emits light;

When Vdata1 is a low voltage signal, Vdata2 is a high voltage signal, Vdata3 is a low voltage signal, and Vdata4 is a high voltage signal, S1 outputs a high voltage signal, S2 outputs a low voltage signal, K1 is turned on, K2 is turned off, and the input terminal of S3 is connected to a low voltage signal, S3 outputs a high voltage signal, K3 is turned on, K4 is turned off, the input terminal of S6 is connected to a low voltage signal, and S6 outputs a high voltage signal to the first switch control terminal A; in the light emitting phase te, TK1 is turned on, TE is turned on, the drain electrode of TE is connected to the first light emitting control voltage, and M1 emits light;

When Vdata1 is a low voltage signal, Vdata2 is a high voltage signal, Vdata3 is a high voltage signal, and Vdata4 is a low voltage signal, S1 outputs a high voltage signal, S2 outputs a low voltage signal, K1 is turned on, K2 is turned off, and the input terminal of S3 is connected to the low voltage signal, S3 outputs a high voltage signal, K3 is turned on, K4 is turned off, the input terminal of S6 is connected to a high voltage signal, S6 outputs a low voltage signal to the input terminal of S5, and S5 outputs a high voltage signal to the second switch control terminal B; in the light emitting phase te, TK2 is turned on, TE is turned on, the drain electrode of TE is connected to the second light emitting control voltage, and M1 emits light;

When Vdata1 is a low voltage signal, Vdata2 is a low voltage signal, Vdata3 is a high voltage signal, and Vdata4 is a high voltage signal, S1 outputs a high voltage signal, S2 outputs a high voltage signal, K1 is turned on, K2 is turned off, and the input terminal of S3 is connected to the high voltage signal, S3 outputs a low voltage signal, K3 is turned off, K4 is turned on, the input terminal of S6 is connected to a high voltage signal, the input terminal of S7 is connected to a high voltage signal, S7 outputs a low voltage signal, and the high voltage signal is provided to the third switch control terminal C; in the light emitting phase te, TK3 is turned on, TE is turned on, the drain electrode of TE is connected to the third light emitting control voltage, and M1 emits light.

In at least one embodiment of the present disclosure, the light emitting circuit may include an amplitude control sub-circuit, a driving sub-circuit, a first on-off control sub-circuit and a light emitting element; the first terminal of the driving sub-circuit is electrically connected to the second voltage terminal;

The amplitude control sub-circuit is configured to control the driving current generated by the driving sub-circuit according to the display data voltage;

The light emitting control circuit is configured to control to connect the control voltage input terminal and the control terminal of the first on-off control sub-circuit under the control of the light emitting control signal;

The control terminal of the first on-off control sub-circuit is electrically connected to the light emitting control circuit, the first terminal of the first on-off control sub-circuit is electrically connected to the second terminal of the driving sub-circuit, and the second terminal of the first on-off control sub-circuit is electrically connected to the light emitting element; the first on-off control sub-circuit is configured to control to connect the driving sub-circuit and the light emitting element under the control of the potential of its control terminal.

In at least one embodiment of the present disclosure, the second voltage terminal may be a high voltage terminal, but not limited thereto.

Optionally, the amplitude control sub-circuit includes a data writing-in sub-circuit, an energy storage sub-circuit and a reset sub-circuit;

The data writing-in sub-circuit is electrically connected to the first scanning line, the data line and the control terminal of the driving sub-circuit respectively, and is configured to write the data voltage provided by the data line into the control terminal of the driving sub-circuit;

The reset sub-circuit is electrically connected to the first scanning line, the reset voltage terminal and the second terminal of the driving sub-circuit respectively, and is configured to control to write the reset voltage provided by the reset voltage terminal into the second terminal of the driving sub-circuit under the control of the first scanning signal;

The energy storage sub-circuit is electrically connected to the control terminal of the driving sub-circuit and the second terminal of the driving sub-circuit respectively, and is used for storing electric energy;

The driving sub-circuit is configured to generate driving current under the control of the potential of its control terminal.

Optionally, the amplitude control sub-circuit includes a data writing-in sub-circuit and an energy storage sub-circuit;

The data writing-in sub-circuit is electrically connected to the scanning line, the data line and the control terminal of the driving sub-circuit respectively, and the data writing-in sub-circuit is configured to write the data voltage provided by the data line into the control terminal of the driving sub-circuit;

The energy storage sub-circuit is electrically connected to the control terminal the driving sub-circuit and the first common electrode terminal, respectively, is used for storing electric energy;

The driving sub-circuit is configured to generate driving current under the control of the potential of its control terminal.

Figure 11:
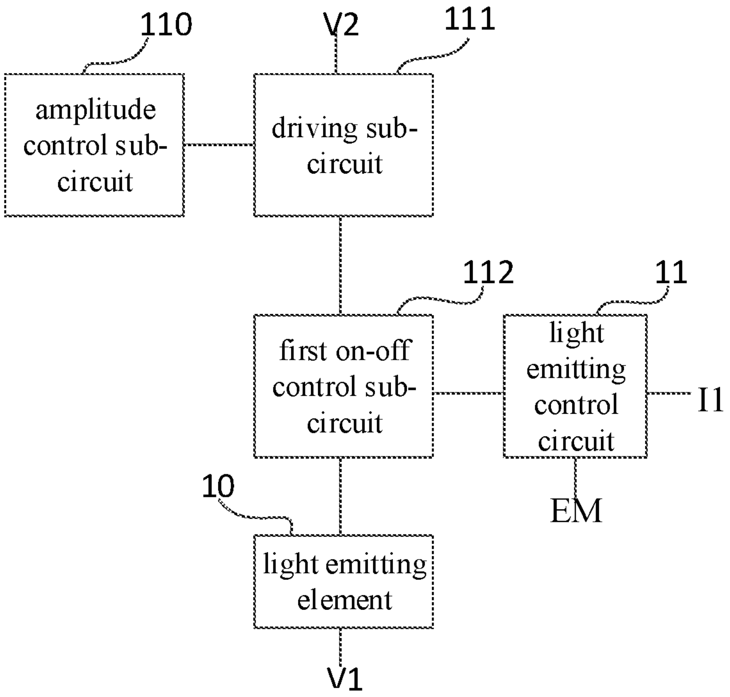
FIG. 11 is a structural diagram of a light emitting circuit according to at least one embodiment.

As shown in FIG. 11, at least one embodiment of the light emitting circuit may include an amplitude control sub-circuit 110, a driving sub-circuit 111, a first on-off control sub-circuit 112 and a light emitting element 10; the first terminal of the driving sub-circuit 111 is electrically connected to the second voltage terminal V2;

The amplitude control sub-circuit 110 is electrically connected to the driving sub-circuit 111, and is configured to control the driving current generated by the driving sub-circuit 111 according to the display data voltage;

The light emitting control circuit 11 is configured to control to connect the control voltage input terminal I1 and the control terminal of the first on-off control sub-circuit 112 under the control of the light emitting control signal;

The control terminal of the first on-off control sub-circuit 112 is electrically connected to the light emitting control circuit 11, and the first terminal of the first on-off control sub-circuit 112 is electrically connected to the second terminal of the driving sub-circuit 111, the second terminal of the first on-off control sub-circuit 112 is electrically connected to the first electrode of the light emitting element 10; the first on-off control sub-circuit 112 is configured to control to connect the driving sub-circuit 111 and the light emitting element 10 under the control of the potential of the control terminal thereof;

The second electrode of the light emitting element 10 is electrically connected to the first voltage terminal V1.

Optionally, the first voltage terminal V1 may be a low voltage terminal.

Figure 12:
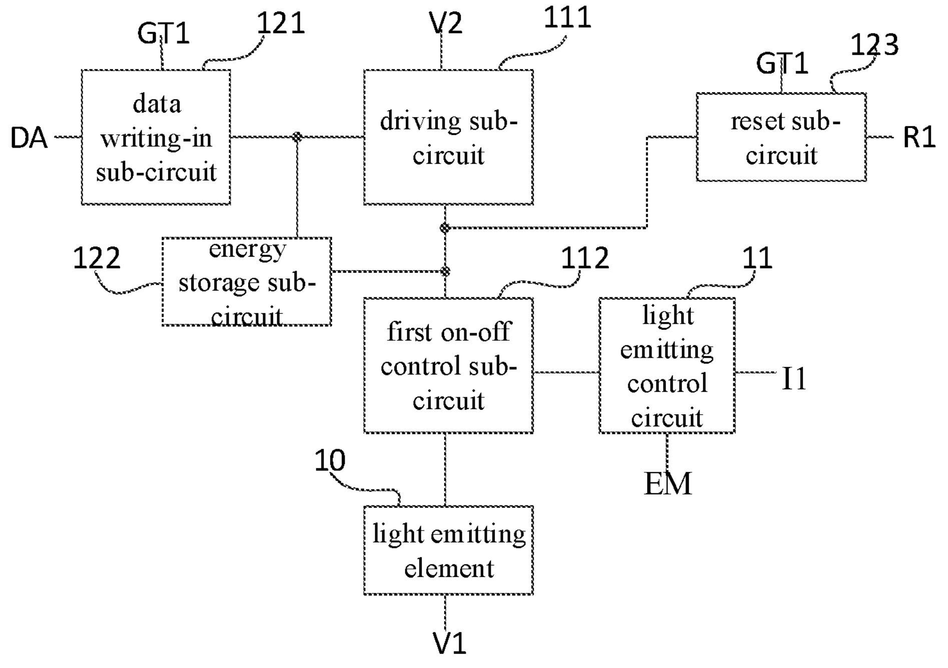
FIG. 12 is a structural diagram of the light emitting circuit according to at least one embodiment.

As shown in FIG. 12, on the basis of at least one embodiment of the light emitting circuit shown in FIG. 11, the amplitude control sub-circuit may include a data writing-in sub-circuit 121, an energy storage sub-circuit 122 and a reset sub-circuit 123;

The data writing-in sub-circuit 121 is electrically connected to the first scanning line GT1, the data line DA and the control terminal of the driving sub-circuit 111, and is configured to write the data voltage provided by the data line DA into the control terminal of the driving sub-circuit 111 under the control of the first scanning signal provided on the first scanning line GT1; the data line DA is configured to provide display data voltage;

The reset sub-circuit 123 is electrically connected to the first scanning line GT1, the reset voltage terminal R1 and the second terminal of the driving sub-circuit 111, and is configured to control to write the reset voltage provided by the voltage terminal R1 into the second terminal of the driving sub-circuit 111 under the control of the first scanning signal;

The energy storage sub-circuit 122 is electrically connected to the control terminal of the driving sub-circuit 111 and the second terminal of the driving sub-circuit 111, respectively, is used for storing electric energy;

The driving sub-circuit 111 is configured to generate a driving current under the control of the potential of its control terminal.

Figure 13:
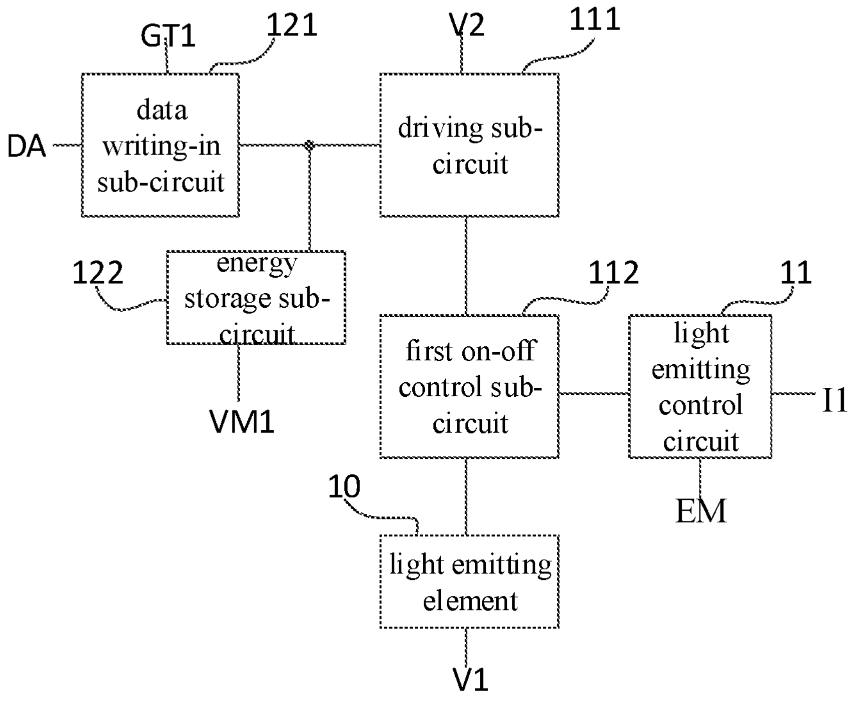
FIG. 13 is a structural diagram of the light emitting circuit according to at least one embodiment.

As shown in FIG. 13, on the basis of at least one embodiment shown in FIG. 11, the amplitude control sub-circuit may include a data writing-in sub-circuit 121 and an energy storage sub-circuit 122;

The data writing-in sub-circuit 121 is electrically connected to the scanning line GT, the data line DA and the control terminal of the driving sub-circuit 111 respectively, and the data writing-in sub-circuit 121 is configured to write the data voltage provided by the data line DA into the control terminal of the driving sub-circuit 111 under the control of the scanning line GT;

The energy storage sub-circuit 122 is electrically connected to the control terminal of the driving sub-circuit 111 and the first common electrode terminal VM1, respectively, is used for storing electric energy;

The driving sub-circuit 111 is configured to generate a driving current under the control of the potential of its control terminal.

Figure 14:
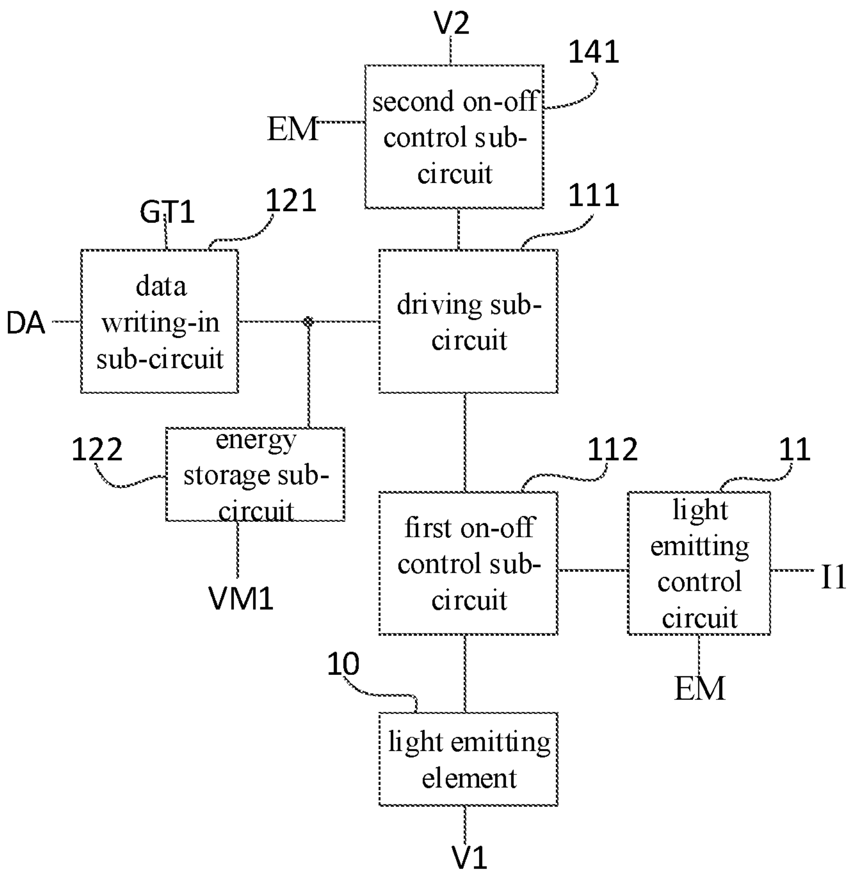
FIG. 14 is a structural diagram of the light emitting circuit according to at least one embodiment.

As shown in FIG. 14, on the basis of at least one embodiment shown in FIG. 13, the amplitude control sub-circuit may further include a second on-off control sub-circuit 141;

The second on-off control sub-circuit is electrically connected to the light emitting control terminal EM, the second voltage terminal V2 and the first terminal of the driving sub-circuit 111 respectively, and is configured to connect the second voltage terminal V2 and the first terminal of the driving sub-circuit 111 under the control of the light emitting control signal provided at the light emitting control terminal EM.

Figure 15:
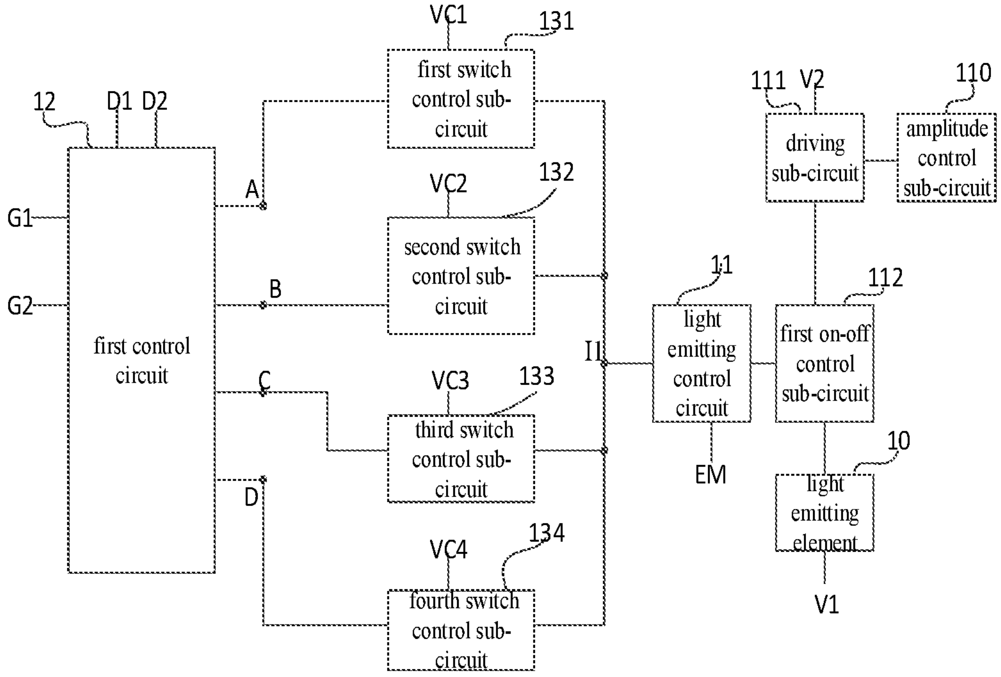
FIG. 15 is a circuit diagram of a pixel circuit according to at least one embodiment of the present disclosure.

As shown in FIG. 15, on the basis of at least one embodiment shown in FIG. 1, the light emitting element 10 is replaced with at least one embodiment of the light emitting circuit shown in FIG. 11;

The light emitting control circuit 11 is electrically connected to the control terminal of the first on-off control sub-circuit 112.

Figure 16:
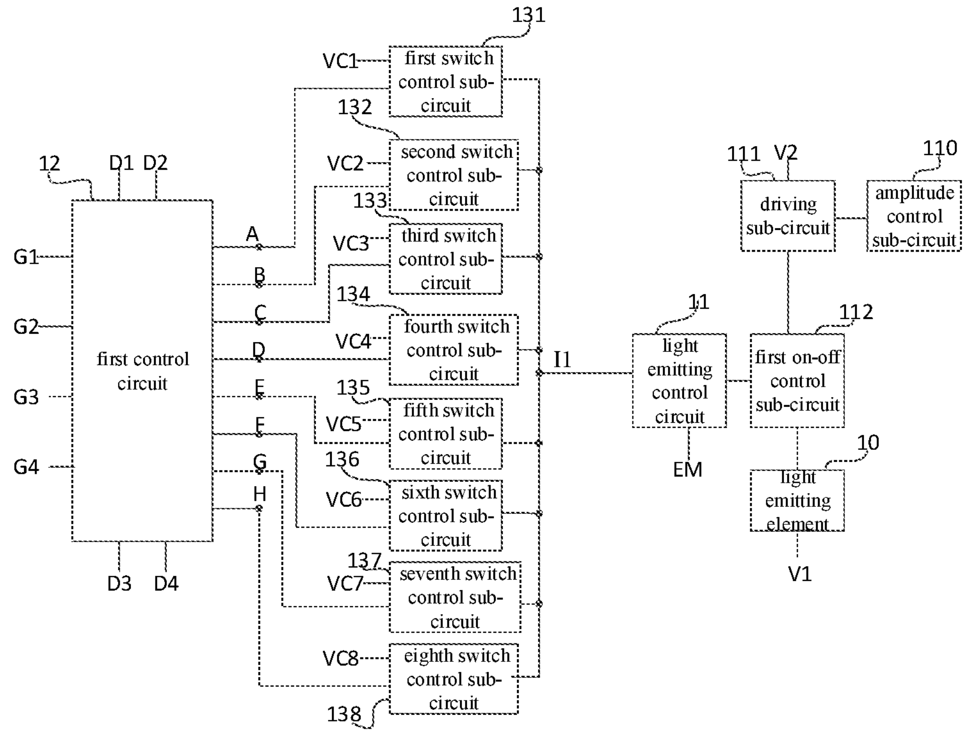
FIG. 16 is a circuit diagram of a pixel circuit according to at least one embodiment of the present disclosure.

As shown in FIG. 16, on the basis of at least one embodiment shown in FIG. 2, the light emitting element 10 is replaced with at least one embodiment of the light emitting circuit shown in FIG. 11;

The light emitting control circuit 11 is electrically connected to the control terminal of the first on-off control sub-circuit 112.

Figure 17:
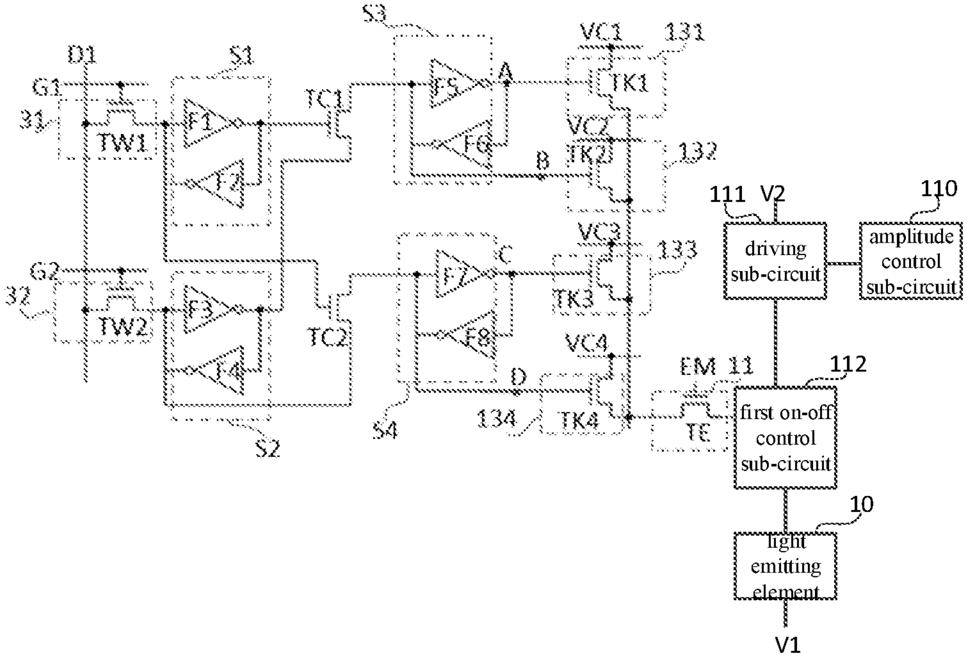
FIG. 17 is a circuit diagram of a pixel circuit according to at least one embodiment of the present disclosure.

As shown in FIG. 17, on the basis of at least one embodiment shown in FIG. 5, the miniature light emitting diode M1 is replaced with light emitting circuit;

The source electrode of the light emitting control transistor TE is electrically connected to the control terminal of the first on-off control sub-circuit 112.

When at least one embodiment of the pixel circuit shown in FIG. 17 of the present disclosure is in operation, the display period includes a first writing-in phase, a second writing-in phase, and a light emitting phase that are set successively;

In the first writing-in phase, G1 provides a high voltage signal, D1 provides the first data voltage Vdata1, and TW1 is turned on to write Vdata1 into the input terminal of S1;

In the second write phase, G2 provides a high voltage signal, D1 provides a second data voltage Vdata2, and TW2 is turned on to write Vdata2 into the input terminal of S2;

When Vdata1 is a low voltage signal and Vdata2 is a low voltage signal, S1 outputs a high voltage signal, S2 outputs a high voltage signal, TC1 is turned on, TC2 is turned off, the input terminal of S3 is connected to a high voltage signal, and the first switch control terminal A is connected to the low voltage signal, the second switch control terminal B is connected to a high voltage signal, the potential of the third switch control terminal C and the potential of the fourth switch control terminal D are low voltage, TK1 is turned off, TK2 is turned on, and TK3 and TK4 are turned off, I1 is connected to the second light emitting control voltage; in the light emitting stage, TE is turned on, and the drain electrode of TE is connected to the second light emitting control voltage;

When Vdata1 is a low voltage signal and Vdata2 is a high voltage signal, S1 outputs a high voltage signal, S2 outputs a low voltage signal, TC1 is turned on, TC2 is turned off, the input terminal of S3 is connected to a low voltage signal, and the first switch control terminal A is connected to the high voltage signal, the second switch control terminal B is connected to a low voltage signal, the potential of the third switch control terminal C and the potential of the fourth switch control terminal D are low voltage, TK1 is turned on, TK2 is turned off, and TK3 and TK4 are turned off, I1 is connected to the first light emitting control voltage; in the light emitting phase, TE is turned on, and the drain electrode of TE is connected to the first light emitting control voltage;

When Vdata1 is a high voltage signal and Vdata2 is a low voltage signal, S1 outputs a low voltage signal, S2 outputs a high voltage signal, TC1 is turned off, TC2 is turned on, the input terminal of S4 is connected to a low voltage signal, and the third switch control terminal C is connected to the high voltage signal, the fourth switch control terminal D is connected with a low voltage signal, the potential of the first switch control terminal A and the potential of the second switch control terminal B are low voltage, TK3 is turned on, TK4 is turned off, and TK1 and TK2 are turned off, I1 is connected to the third light emitting control voltage; in the light emitting phase, TE is turned on, and the drain electrode of TE is connected to the third light emitting control voltage;

When Vdata1 is a high voltage signal and Vdata2 is a high voltage signal, S1 outputs a low voltage signal, S2 outputs a low voltage signal, TC1 is turned off, TC2 is turned on, the input terminal of S4 is connected to a high voltage signal, and the third switch control terminal C is connected to the low voltage signal, the fourth switch control terminal D is connected to a high voltage signal, the potential of the first switch control terminal A and the potential of the second switch control terminal B are low voltage, TK4 is turned on, TK3 is turned off, and TK1 and TK2 are turned off, I1 is connected to the fourth light emitting control voltage; in the light emitting phase, TE is turned on, and the drain electrode of TE is connected to the fourth light emitting control voltage.

Figure 18:
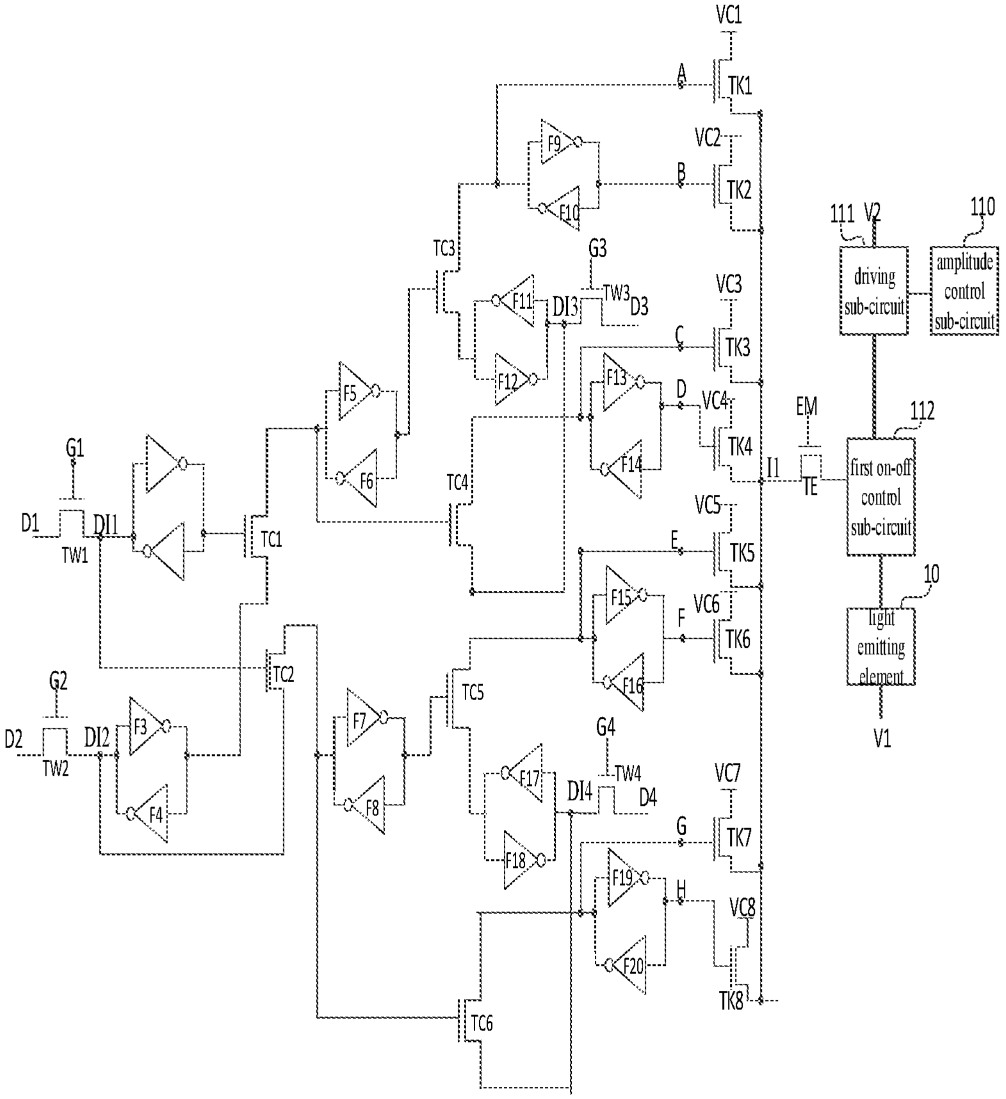
FIG. 18 is a circuit diagram of a pixel circuit according to at least one embodiment of the present disclosure.

When at least one embodiment of the pixel circuit shown in FIG. 17 of the present disclosure is working, the first light emitting control voltage, the second light emitting control voltage, the third light emitting control voltage and the fourth light emitting control voltage may all be square wave voltage signals, the duty ratio of the first light emitting control voltage, the duty ratio of the second light emitting control voltage, the duty ratio of the third light emitting control voltage and the duty ratio of the fourth light emitting control voltage are different, so that the ON duration of the first on-off control sub-circuit are different conduction times, the light emitting elements have different light emitting durations, thereby realizing low gray-scale displays with different gray-scale values, and improving the uniformity of low gray-scale displays. As shown in FIG. 18, on the basis of at least one embodiment shown in FIG. 9, the light emitting circuit shown in FIG. 11 is replaced with the micro light emitting diode M1;

The source electrode of the light emitting control transistor TE is electrically connected to the control terminal of the first on-off control sub-circuit 112.

During operation of at least one embodiment of the pixel circuit shown in FIG. 18; the display period includes the first writing-in phase, the second writing-in phase, the third writing-in phase, a fourth writing-in phase and the light emitting phase;

In the first writing-in phase, G1 provides a high voltage signal, G2, G3 and G4 all provide low voltage signals, and D1 provides the first data voltage Vdata1 to the first data access terminal DI1;

In the second writing-in phase, G2 provides a high voltage signal, G1, G3 and G4 all provide low voltage signals, and D2 provides the second data voltage Vdata2 to the second data access terminal DI2;

In the third writing-in phase, G3 provides a high voltage signal, G1, G2 and G4 all provide low voltage signals, and D3 provides the third data voltage Vdata3 to the third data access terminal DI3;

In the fourth writing-in phase, G4 provides a high voltage signal, G1, G2 and G3 all provide low voltage signals, and D4 provides the fourth data voltage Vdata4 to the fourth data access terminal DI4;

When Vdata1 is a low voltage signal, Vdata2 is a low voltage signal, Vdata3 is a low voltage signal, and Vdata4 is a low voltage signal, the gate electrode of K1 is connected to a high voltage signal, the gate electrode of K2 is connected to a low voltage signal, and K1 is turned on, K2 is turned off, the input terminal of S3 is connected to a high voltage signal, S3 outputs a low voltage signal, K3 is turned off, K4 is turned on, the input terminal of S7 is connected to a low voltage signal, and S7 outputs a high voltage signal to the fourth switch control terminal D; in the light emitting phase, TK4 is turned on, TE is turned on, and the drain electrode of TE is connected to the fourth light emitting control voltage;

When Vdata1 is a high voltage signal, Vdata2 is a low voltage signal, Vata3 is a low voltage signal, and Vdata4 is a low voltage signal, S1 outputs a low voltage signal, K1 is turned off, S2 outputs a high voltage signal, K2 is turned on, and the input terminal of S4 is connected to the low voltage signal, the control terminal of K5 is connected to the high voltage signal, K5 is turned on, K6 is turned off, the input terminal of S9 is connected to the low voltage signal, S9 outputs the high voltage signal, and the high voltage signal is provided to the second terminal E through K5; in the light emitting phase, TK5 is turned on, TE is turned on, and the drain electrode of TE is connected to the fifth light emitting control voltage;

When Vdata1 is a low voltage signal, Vdata2 is a high voltage signal, Vdata3 is a low voltage signal, and Vdata4 is a low voltage signal, S1 outputs a high voltage signal, K1 is turned on, K2 is turned off, S2 outputs a low voltage signal, and the input terminal of S3 is connected to a low voltage signal, S3 outputs a high voltage signal, K3 is turned on, K4 is turned off, S6 outputs a high voltage signal, and S6 provides a high voltage signal to the first switch control terminal A through K3 that is turned on; in the light emitting phase, TK1 is turned on, the TE is turned on, and the drain electrode of the TE is connected to the first light emitting control voltage;

When Vdata1 is a low voltage signal, Vdata2 is a low voltage signal, Vdata3 is a high voltage signal, and Vdata4 is a low voltage signal, S1 outputs a high voltage signal, S2 provides a high voltage signal, K1 is turned on, K2 is turned off, and the input terminal of S3 is connected to the high voltage signal, S3 outputs a low voltage signal, K3 is turned off, K4 is turned on, the input terminal of S7 is connected to a high voltage signal, and the high voltage signal is written into the third switch control terminal C; in the light emitting phase, TK3 is turned on, the TE is turned on, and the drain electrode of the TE is connected to the third light emitting control voltage;

When Vdata1 is a low voltage signal, Vdata2 is a low voltage signal, Vdata3 is a low voltage signal, and Vdata4 is a high voltage signal, S1 outputs a high voltage signal, S2 outputs a high voltage signal, K1 is turned on, K2 is turned off, and the input terminal of S3 is connected to the high voltage signal, S3 outputs a low voltage signal, K3 is turned off, K4 is turned on, the input terminal of S6 is connected to a low voltage signal, the input terminal of S7 is connected to a low voltage signal, and S7 outputs a high voltage signal to the fourth switch control terminal D; in the light emitting phase, TK4 is turned on, TE is turned on, and the drain electrode of TE is connected to the fourth light emitting control voltage;

When Vdata1 is a high voltage signal, Vdata2 is a high voltage signal, Vdata3 is a low voltage signal, and Vdata4 is a low voltage signal, S1 outputs a low voltage signal, S2 outputs a low voltage signal, K1 is turned off, K2 is turned on, and the input terminal of S4 is connected to the high voltage signal, S4 outputs the low voltage signal, K7 is turned off, K8 is turned on, the input terminal of S9 connects the low voltage signal, the input terminal of S10 connects the low voltage signal, S10 outputs the high voltage signal to the eighth switch control terminal H; in the light emitting phase, TK8 is turned on, TE is turned on, and the drain electrode of TE is connected to the eighth light emitting control voltage;

When Vdata1 is a high voltage signal, Vdata2 is a high voltage signal, Vdata3 is a low voltage signal, and Vdata4 is a high voltage signal, S1 outputs a low voltage signal, S2 outputs a low voltage signal, K1 is turned off, K2 is turned on, and the input terminal of S4 is connected to the high voltage signal, S4 outputs a low voltage signal, K7 is turned off, K8 is turned on, the input terminal of S9 is connected to a high voltage signal, the input terminal of S10 is connected to a high voltage signal, and S10 outputs a low voltage signal to write the high voltage signal into the seventh switch control terminal G; in the light emitting phase, TK7 is turned on, TE is turned on, and the drain electrode of TE is connected to the seventh light emitting control voltage;

When Vdata1 is a high voltage signal, Vdata2 is a high voltage signal, Vdata3 is a high voltage signal, and Vdata4 is a low voltage signal, S1 outputs a low voltage signal, S2 outputs a low voltage signal, K1 is turned off, and K2 is turned on; the input terminal of S4 is connected to the high voltage signal, S4 outputs the low voltage signal, K7 is turned off, K8 is turned on, the input end of S9 is connected to the low voltage signal, S9 outputs the high voltage signal, the input end of S10 is connected to the low voltage signal, S10 outputs high voltage signal to the eighth switch control terminal H; in the light emitting phase, TK8 is turned on, TE is turned on, and the drain electrode of TE is connected to the eighth light emitting control voltage;

When Vdata1 is a high voltage signal, Vdata2 is a high voltage signal, Vdata3 is a high voltage signal, and Vdata4 is a high voltage signal, S1 outputs a low voltage signal, S2 outputs a low voltage signal, K1 is turned off, K2 is turned on, and the input terminal of S4 is connected to high voltage signal, S4 outputs the low voltage signal, K7 is turned off, K8 is turned on, the input terminal of S9 is connected to the high voltage signal, S9 outputs the low voltage signal, the input terminal of S10 is connected to the high voltage signal, and S10 outputs the low voltage signal to provide a high voltage signal to the seventh switch control terminal G; in the light emitting phase, TK7 is turned on, TE is turned on, and the drain electrode of TE is connected to the seventh light emitting control voltage;

When Vdata1 is a high voltage signal, Vdata2 is a low voltage signal, Vdata3 is a high voltage signal, and Vdata4 is a high voltage signal, S1 outputs a low voltage signal, S2 outputs a high voltage signal, K1 is turned off, K2 is turned on, and the input terminal of S4 is connected to the low voltage signal, S4 outputs a high voltage signal, K7 is turned on, K8 is turned off, the input terminal of S9 is connected to a high voltage signal, S9 outputs a low voltage signal to the input terminal of S8, and S8 outputs a high voltage signal to the sixth switch control terminal F; in the light emitting phase, TK6 is turned on, TE is turned on, and the drain electrode of TE is connected to the sixth light emitting control voltage;

When Vdata1 is a high voltage signal, Vdata2 is a low voltage signal, Vdata3 is a low voltage signal, and Vdata4 is a high voltage signal, S1 outputs a low voltage signal, S2 provides a high voltage signal, K1 is turned off, K2 is turned on, and the input terminal of S4 is connected to the low voltage signal, S4 outputs a high voltage signal, K7 is turned on, K8 is turned off, the input terminal of S9 is connected to a high voltage signal, S9 outputs a low voltage signal to the input terminal of S8, and S8 outputs a high voltage signal to the sixth switch control terminal F; in the light emitting phase, TK6 is turned on, TE is turned on, and the drain electrode of TE is connected to the sixth light emitting control voltage;

When Vdata1 is a high voltage signal, Vdata2 is a low voltage signal, Vdata3 is a provides a high voltage signal, K1 is turned off, K2 is turned on, and the input terminal of S4 is connected to the low voltage signal, S4 outputs the high voltage signal, K7 is turned on, K8 is turned off, the input terminal of S9 is connected to the low voltage signal, S9 outputs the high voltage signal to the input terminal of S8, S8 outputs the low voltage signal, and S9 outputs the high voltage signal to the fifth switch control terminal E; in the light emitting phase, TK5 is turned on, TE is turned on, and the drain electrode of TE is connected to the fifth light emitting control voltage;

When Vdata1 is a low voltage signal, Vdata2 is a high voltage signal, Vdata3 is a high voltage signal, and Vdata4 is a high voltage signal, S1 outputs a high voltage signal, S2 outputs a low voltage signal, K1 is turned on, K2 is turned off, and the input terminal of S3 is connected to the low voltage signal, S3 outputs the high voltage signal, K3 is turned on, K4 is turned off, the input terminal of S6 is connected to the high voltage signal, S6 outputs the low voltage signal, the input terminal of S5 is connected to the low voltage signal, S5 outputs the high voltage signal to the second switch control terminal B; in the light emitting phase, TK2 is turned on, TE is turned on, and the drain electrode of TE is connected to the second light emitting control voltage;

When Vdata1 is a low voltage signal, Vdata2 is a high voltage signal, Vdata3 is a low voltage signal, and Vdata4 is a high voltage signal, S1 outputs a high voltage signal, S2 outputs a low voltage signal, K1 is turned on, K2 is turned off, and the input terminal of S3 is connected to the low voltage signal, S3 outputs a high voltage signal, K3 is turned on, K4 is turned off, the input terminal of S6 is connected to a low voltage signal, and S6 outputs a high voltage signal to the first switch control terminal A; in the light emitting phase, TK1 is turned on, the TE is turned on, and the drain electrode of the TE is connected to the first light emitting control voltage;

When Vdata1 is a low voltage signal, Vdata2 is a high voltage signal, Vdata3 is a high voltage signal, and Vdata4 is a low voltage signal, S1 outputs a high voltage signal, S2 outputs a low voltage signal, K1 is turned on, K2 is turned off, and the input terminal of S3 is connected to the low voltage signal, S3 outputs a high voltage signal, K3 is turned on, K4 is turned off, the input terminal of S6 is connected to a high voltage signal, S6 outputs a low voltage signal to the input terminal of S5, and S5 outputs a high voltage signal to the second switch control terminal B; in the light emitting phase, TK2 is turned on, TE is turned on, and the drain electrode of TE is connected to the second light emitting control voltage;

When Vdata1 is a low voltage signal, Vdata2 is a low voltage signal, Vdata3 is a high voltage signal, and Vdata4 is a high voltage signal, S1 outputs a high voltage signal, S2 outputs a high voltage signal, K1 is turned on, K2 is turned off, and the input terminal of S3 is connected to the high voltage signal is connected, S3 outputs a low voltage signal, K3 is turned off, K4 is turned on, the input terminal of S6 is connected to a high voltage signal, the input terminal of S7 is connected to a high voltage signal, S7 outputs a low voltage signal, and the high voltage signal is provided to the third switch control terminal C; in the light emitting phase, TK3 is turned on, TE is turned on, and the drain electrode of TE is connected to the third light emitting control voltage.

During operation of at least one embodiment of the pixel circuit shown in FIG. 18, the first light emitting control voltage, the second light emitting control voltage, the third light emitting control voltage, the fourth light emitting control voltage, the fifth light emitting control voltage, the sixth light emitting control voltage, the seventh light emitting control voltage and the eighth light emitting control voltage may all be square wave voltage signals, the duty ratio of the first light emitting control voltage, the duty ratio of the second light emitting control voltage, the duty ratio of the third light emitting control voltage, the duty ratio of the fourth light emitting control voltage, the duty ratio of the fifth light emitting control voltage, the duty ratio of the sixth light emitting control voltage, the duty ratio of the seventh light emitting control voltage, and the duty ratio of the eighth light emitting control voltage are different, so that the on time of the first on-off control sub-circuit can be controlled to be different, so that low gray-scale display with different gray-scale values can be realized, and the uniformity of low-gray-scale display can be improved.

Figure 19:
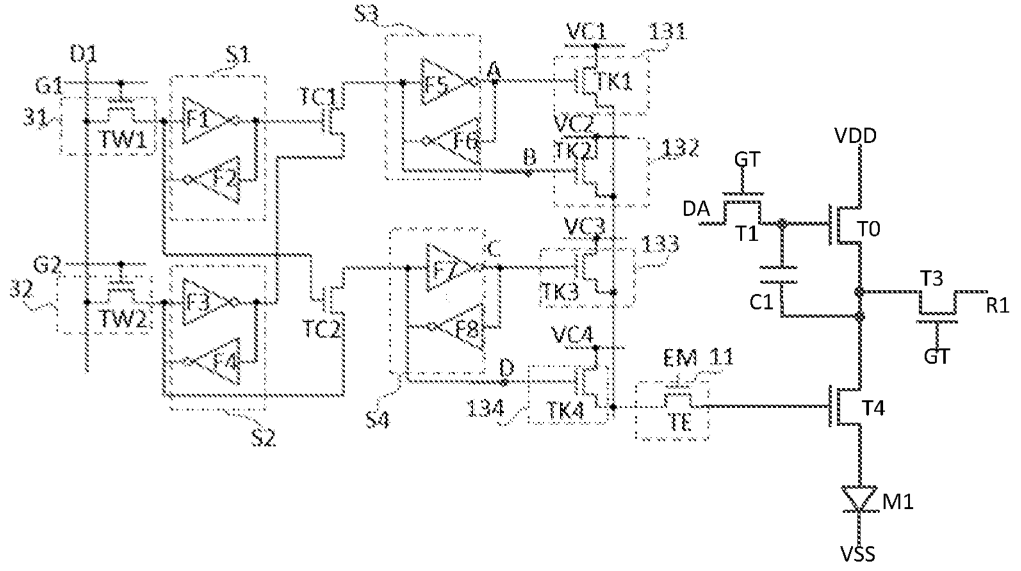
FIG. 19 is a circuit diagram of a pixel circuit according to at least one embodiment of the present disclosure.

As shown in FIG. 19, on the basis of at least one embodiment of the pixel circuit shown in FIG. 17, the amplitude control sub-circuit may include a data writing-in sub-circuit, an energy storage sub-circuit and a reset sub-circuit;

The data writing-in sub-circuit includes a first data writing-in transistor T1; the energy storage sub-circuit includes a storage capacitor C1, and the reset sub-circuit includes a reset transistor T3; the driving sub-circuit includes a driving transistor T0; the first on-off control circuit includes a first on-off control transistor T4; the light emitting element is a miniature light emitting diode M1;

The source electrode of TE is electrically connected to the gate electrode of T4;

The gate electrode of T1 is electrically connected to the scanning line GT, the drain electrode of T1 is electrically connected to the data line DA, and the source electrode of T1 is electrically connected to the gate electrode of T0;

The drain electrode of T0 is electrically connected to the high voltage terminal VDD, the source electrode of T0 is electrically connected to the drain electrode of T4, the source electrode of T4 is electrically connected to the anode of M1, and the cathode of M1 is electrically connected to the low voltage terminal VSS;

The first terminal of C1 is electrically connected to the gate electrode of T0, and the second terminal of C1 is electrically connected to the source electrode of T0.

In at least one embodiment in FIG. 19, each transistor is an n-type transistor, but not limited thereto.

Figure 20:
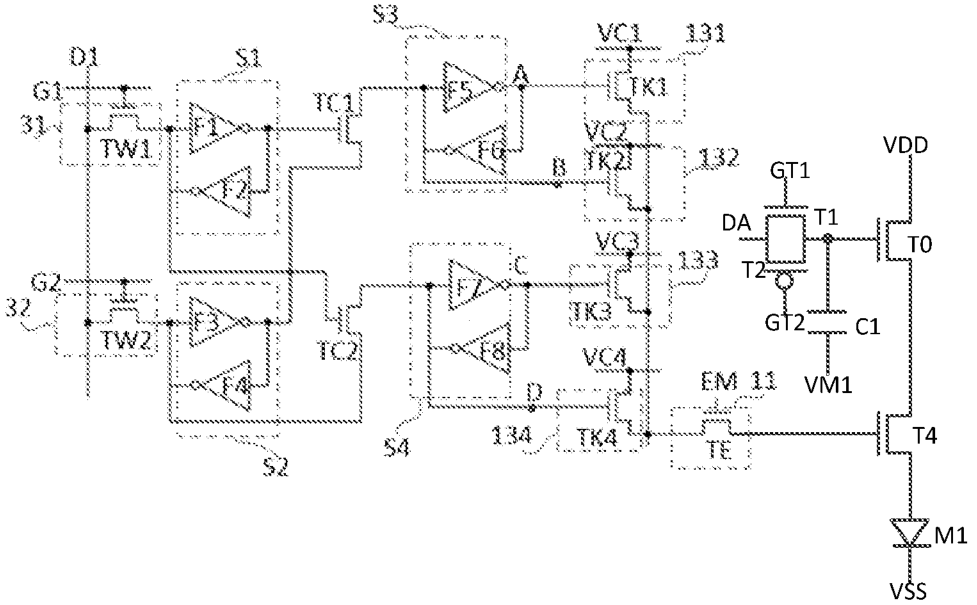
FIG. 20 is a circuit diagram of a pixel circuit according to at least one embodiment of the present disclosure.

When at least one embodiment of the pixel circuit shown in FIG. 19 of the present disclosure works, GT firstly provides the high voltage signal, T1 and T3 are turned on to write the display data voltage provided by DA into the gate electrode of T0, and write the reset voltage provided by R1 into the source electrode of T0; after that, EM provides a high voltage signal, TE is turned on, the first light emitting control voltage, a second light emitting control voltage, a third light emitting control voltage or a fourth light emitting control voltage is connected to the gate electrode of T4 to control T4 to be turned on or off. When T4 is turned on, T0 drives M1 to emit light. As shown in FIG. 20, on the basis of at least one embodiment of the pixel circuit shown in FIG. 17, the amplitude control sub-circuit may include a data writing-in sub-circuit and an energy storage sub-circuit;

The data writing-in sub-circuit includes a first data writing-in transistor T1 and a second data writing-in transistor T2; the energy storage sub-circuit includes a storage capacitor C1; the driving sub-circuit includes a driving transistor T0; the on-off control circuit includes a first on-off control transistor T4; the light emitting element is a miniature light emitting diode M1;

The source electrode of TE is electrically connected to the gate electrode of T4;

The first terminal of C1 is electrically connected to the gate electrode of T0, and the second terminal of C2 is electrically connected to the first common electrode terminal VM1;

The gate electrode of T1 is electrically connected to the first scanning line GT1, the drain electrode of T1 is electrically connected to the data line DA, the source electrode of T1 is electrically connected to the gate electrode of T0; the drain electrode of T0 is electrically connected to the high voltage terminal VDD;

The gate electrode of T2 is electrically connected to the second scanning line GT2, the source electrode of T2 is electrically connected to the data line DA, and the drain electrode of T2 is electrically connected to the gate electrode of T0;

The source electrode of T0 is electrically connected to the drain electrode of T4, the source electrode of T4 is electrically connected to the anode of M1, and the cathode of M1 is electrically connected to the low voltage terminal VSS.

In at least one embodiment shown in FIG. 20, T1 is an n-type transistor, and T2 is a p-type transistor, so as to extend the voltage range of the display data voltage provided by the data line DA that can be written into the gate electrode of T0.

In at least one embodiment shown in FIGS. 20, T0 and T4 are n-type transistors.

When at least one embodiment of the pixel circuit shown in FIG. 20 of the present disclosure works, GT1 provides a high voltage signal or GT2 provides a low voltage signal, and T1 or T2 is turned on to write the display data voltage provided by DA into the gate electrode of T0. Afterwards, EM provides a high voltage signal, TE is turned on, and the first light emitting control voltage, the second light emitting control voltage, the third light emitting control voltage or the fourth light emitting control voltage is connected to the gate electrode of T4 to control T4 to be turned on or off, when T4 is turned on, T0 drives M1 to emit light.

Figure 21:
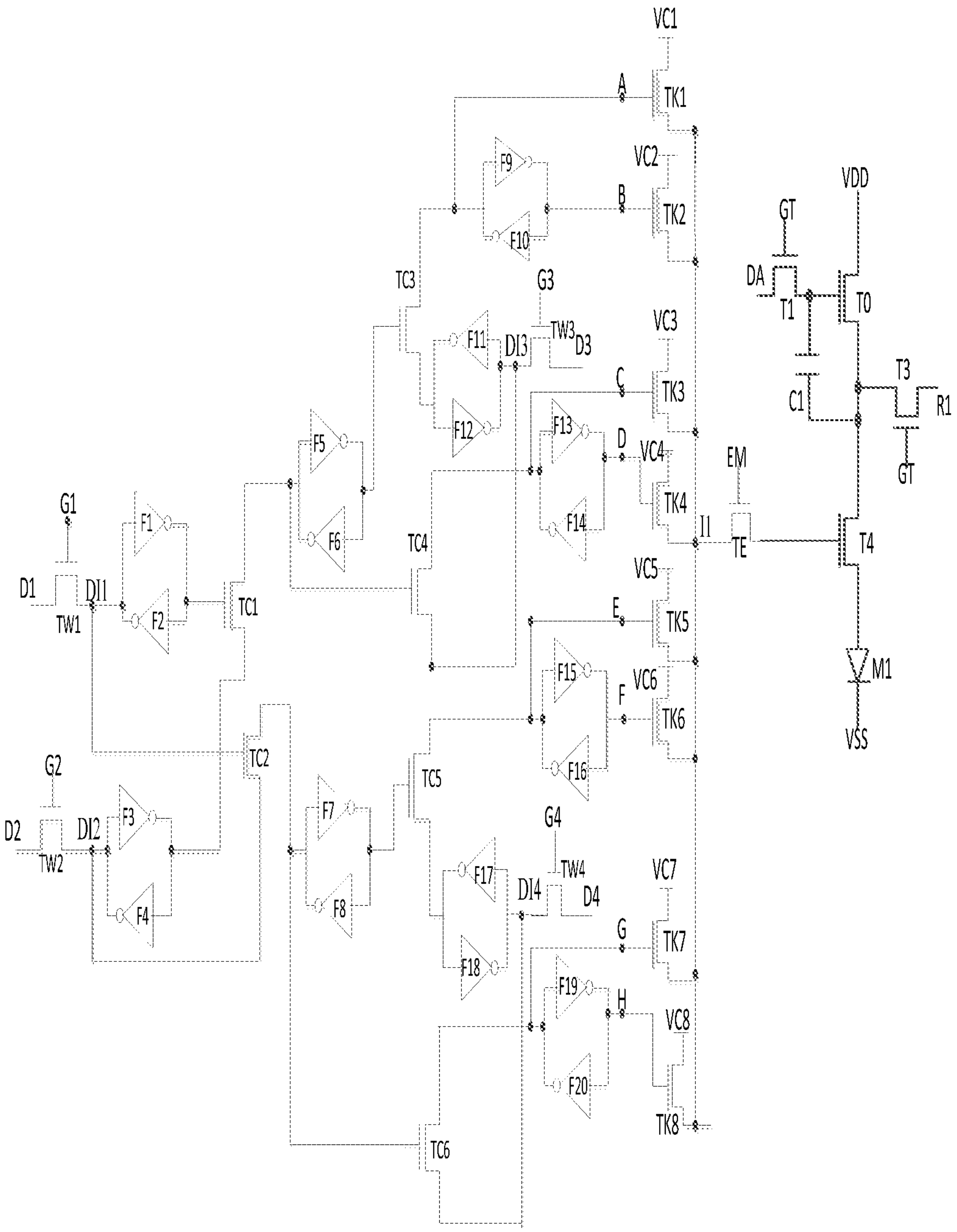
FIG. 21 is a circuit diagram of a pixel circuit according to at least one embodiment of the present disclosure.

As shown in FIG. 21, on the basis of at least one embodiment of the pixel circuit shown in FIG. 18, the amplitude control sub-circuit may include a data writing-in sub-circuit, an energy storage sub-circuit and a reset sub-circuit;

The data writing-in sub-circuit includes a first data writing-in transistor T1; the energy storage sub-circuit includes a storage capacitor C1, and the reset sub-circuit includes a reset transistor T3; the driving sub-circuit includes a driving transistor T0; the first on-off control circuit includes a first on-off control transistor T4; the light emitting element is a miniature light emitting diode M1;

The source electrode of TE is electrically connected to the gate electrode of T4;

The gate electrode of T1 is electrically connected to the scanning line GT, the drain electrode of T1 is electrically connected to the data line DA, and the source electrode of T1 is electrically connected to the gate electrode of T0;

The drain electrode of T0 is electrically connected to the high voltage terminal VDD, the source electrode of T0 is electrically connected to the drain electrode of T4, the source electrode of T4 is electrically connected to the anode of M1, and the cathode of M1 is electrically connected to the low voltage terminal VSS;

The first terminal of C1 is electrically connected to the gate electrode of T0, and the second terminal of C1 is electrically connected to the source electrode of T0.

In at least one embodiment in FIG. 21, each transistor is an n-type transistor, but not limited thereto.

When at least one embodiment of the pixel circuit shown in FIG. 21 of the present disclosure works, GT firstly provides the high voltage signal, T1 and T3 are turned on to write the display data voltage provided by DA into the gate electrode of T0, and write the reset voltage provided by R1 into the source electrode of T0; after that, EM provides a high voltage signal, TE is turned on, the first light emitting control voltage, a second light emitting control voltage, a third light emitting control voltage, a fourth light emitting control voltage, a fifth light emitting control voltage, a sixth light emitting control voltage, a seventh light emitting control voltage or an eighth light emitting control voltage is connected to the gate electrode of T4 to control T4 to turn on or off. When T4 is turned on, T0 drives M1 to emit light.

Figure 22:
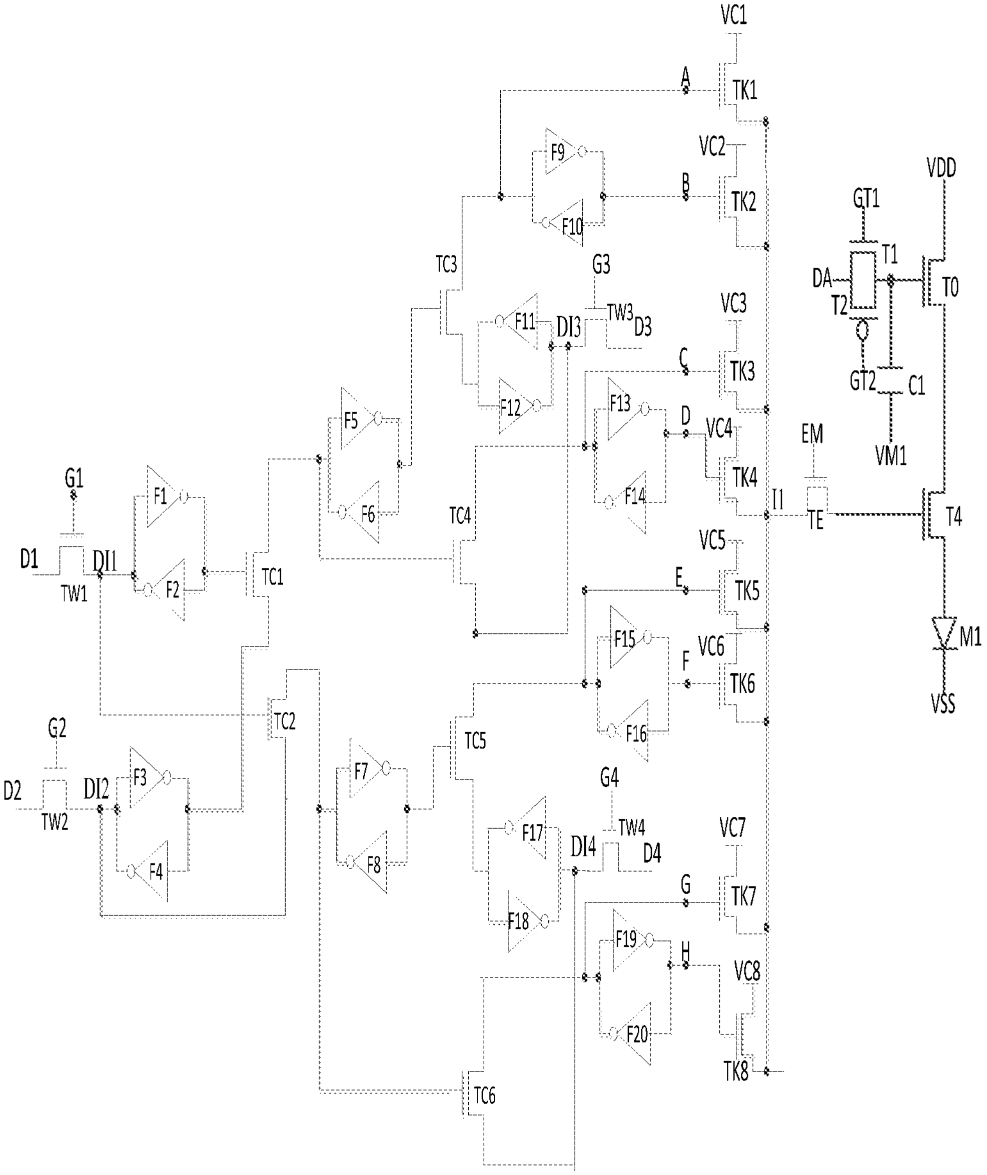
FIG. 22 is a circuit diagram of a pixel circuit according to at least one embodiment of the present disclosure.

As shown in FIG. 22, on the basis of at least one embodiment of the pixel circuit shown in FIG. 18, the amplitude control sub-circuit may include a data writing-in sub-circuit and an energy storage sub-circuit;

The data writing-in sub-circuit includes a first data writing-in transistor T1 and a second data writing-in transistor T2; the energy storage sub-circuit includes a storage capacitor C1; the driving sub-circuit includes a driving transistor T0; the first on-off control circuit includes a first on-off control transistor T4; the light emitting element is a miniature light emitting diode M1;

The source electrode of TE is electrically connected to the gate electrode of T4;

The first terminal of C1 is electrically connected to the gate electrode of T0, and the second terminal of C2 is electrically connected to the first common electrode terminal VM1;

The gate electrode of T1 is electrically connected to the first scanning line GT1, the drain electrode of T1 is electrically connected to the data line DA, the source electrode of T1 is electrically connected to the gate electrode of T0; the drain electrode of T0 is electrically connected to the high voltage terminal VDD;

The gate electrode of T2 is electrically connected to the second scanning line GT2, the source electrode of T2 is electrically connected to the data line DA, and the drain electrode of T2 is electrically connected to the gate electrode of T0;

The source electrode of T0 is electrically connected to the drain electrode of T4, the source electrode of T4 is electrically connected to the anode of M1, and the cathode of M1 is electrically connected to the low voltage terminal VSS.

In at least one embodiment shown in FIG. 22, T1 is an n-type transistor, and T2 is a p-type transistor, so as to extend the voltage range of the display data voltage provided by the data line DA that can be written into the gate electrode of T0.

In at least one embodiment shown in FIGS. 22, T0 and T4 are n-type transistors.

At least one embodiment of the pixel circuit shown in FIG. 22 of the present disclosure is working. GT1 provides a high voltage signal or GT2 provides a low voltage signal. T1 or T2 is turned on to write the display data voltage provided by DA into the gate electrode of T0. Afterwards, EM provides a high voltage signal, TE is turned on, the first light emitting control voltage, the second light emitting control voltage, the third light emitting control voltage, the fourth light emitting control voltage, the fifth light emitting control voltage, the sixth light emitting control voltage, the seventh light emitting control voltage or the eighth light emitting control voltage is connected to the gate electrode of T4 to control T4 to be turned on or off. When T4 is turned on, T0 drives M1 to emit light.

The display device described in the embodiments of the present disclosure includes a display panel; a display area of the display panel has a plurality of sub-pixels, and each sub-pixel is provided with the above-mentioned pixel circuit.

Optionally, the display panel includes a silicon substrate; the pixel circuit is disposed on the silicon substrate. At this time, the transistors included in the pixel circuit may be Complementary Metal Oxide Semiconductor (CMOS) transistors.

In at least one embodiment of the present disclosure, the substrate included in the display panel may be a semiconductor substrate, such as a single crystal semiconductor substrate or a polycrystalline semiconductor substrate made of silicon or silicon carbide, or a substrate of compound semiconductor such as silicon germanium, Silicon On Insulator (SOI) substrates, etc. The substrate may also include an organic resin material such as epoxy, triazine, silicone, or polyimide. In some example embodiments, the substrate may be an FR4 type printed circuit board (PCB), or may be a flexible PCB that is easily deformed. In some example embodiments, the substrate may comprise any one of a ceramic material such as silicon nitride, aluminum nitride (AlN) or aluminum oxide (Al2O3), or a metal or metal compound, or a metal core printed circuit board (MCPCB) or the Metal Copper Clad Laminates (MCCL).

In at least one embodiment of the present disclosure, the display device may be a silicon-based display device, the display panel in the display device includes a silicon substrate, the pixel circuit in the display panel may be a silicon-based field effect transistor, the silicon substrate may include silicon element such as polycrystalline silicon or single crystal silicon.

In some embodiments, the silicon-based field effect transistor can also be referred to as a silicon-based transistor, and the silicon-based field effect transistor includes a silicon substrate, a thin film micro-bridge, and at least one thin film transistor; wherein, the silicon substrate includes at least one micro-cavity, each micro-cavity makes the thin-film micro-bridge on the micro-cavity suspended; the thin-film micro-bridge is arranged above the silicon substrate, and the thin-film transistor is arranged above the central area of each thin-film micro-bridge. Silicon-based transistors have the following advantages over glass-based thin film transistors:

1. The size of silicon-based transistors is tens of nanometers to hundreds of nanometers, the size of glass-based thin film transistors is several microns to tens of microns, and the size of silicon-based transistors is small.

2. The turn-on time of silicon-based transistors is tens of picoseconds, the turn-on time of glass-based thin film transistors is between tens to hundreds of nanoseconds, and the turn-on time of silicon-based transistors is relatively fast.

3. The stability of the silicon-based transistor is higher than that of the transistor prepared on the glass substrate, and the pixel driving circuit composed of the glass-based transistor does not need to compensate the threshold voltage.

The display device provided by the embodiments of the present disclosure may be any product or component with a display function, such as a watch, a mobile phone, a tablet computer, a television, a monitor, a notebook computer, a digital photo frame, a navigator, and the like.

The above descriptions are preferred implementations of the present disclosure. It should be pointed out that those skilled in the art can make some improvements and modifications without departing from the principle of the present disclosure. These improvements and modifications also fall within the protection scope of the present disclosure.

What is claimed is:

1. A pixel circuit, comprising a light emitting circuit, a light emitting control circuit, a first control circuit and a switch control circuit; wherein the light emitting control circuit is electrically connected to a light emitting control terminal, a control voltage input terminal and the light emitting circuit respectively, and is configured to control to connect the control voltage input terminal and the light emitting circuit under the control of a light emitting control signal provided by the light emitting control terminal;

the light emitting circuit is configured to emit light according to a control voltage provided by the control voltage input terminal;

the first control circuit is electrically connected to at least two data voltage terminals, at least two scanning terminals, and N switch control terminals, and is configured to control a switch control signal provided to the switch control terminal under the control of a scanning signal provided by the scanning terminal according to a data voltage provided by the data voltage terminal; N is an integer greater than 1;

the switch control circuit includes N switch control terminals, N light emitting control voltage terminals and N switch control sub-circuits; n is a positive integer less than or equal to N;

an nth switch control sub-circuit is electrically connected to an nth switch control terminal, an nth light emitting control voltage terminal and the control voltage input terminal respectively, and is configured to control to connect the nth light emitting control voltage terminal and the control voltage input terminal under the control of an nth switch control signal provided by the nth switch control terminal.

2. The pixel circuit according to claim 1, wherein a light emitting control voltage provided by the light emitting control voltage terminal is a direct current voltage, and the light emitting control voltages provided by the N light emitting control voltage terminals are different from each other.

3. The pixel circuit according to claim 1, wherein a light emitting control voltage provided by the light emitting control voltage terminal is a square wave voltage signal, and duty ratios of light emitting control voltages provided by the N light emitting control voltage terminals are different from each other.

4. The pixel circuit according to claim 1, wherein N is equal to $2^a$, and a is a positive integer.

5. The pixel circuit according to claim 1, wherein the first control circuit includes a first data writing-in circuit, a second data writing-in circuit and a first control sub-circuit;

the first data writing-in circuit is electrically connected to a first scanning terminal, a first data voltage terminal and a first data access terminal respectively, and is configured to write a first data voltage provided by the first data voltage terminal into the first data access terminal under the control of a first scanning signal provided by the first scanning terminal;

the second data writing-in circuit is electrically connected to a second scanning terminal, a second data voltage terminal and a second data access terminal respectively, and is configured to write a second data voltage provided by the second data voltage terminal into a second data access terminal under the control of a second scanning signal provided by the second scanning terminal;

the first control sub-circuit is electrically connected to the first data access terminal, the second data access terminal and the N switch control terminals respectively, and is configured to control to provide corresponding switch control signals to the N switch control terminals respectively according to a potential of the first data access terminal and a potential of the second data access terminal.

6. The pixel circuit according to claim 5, wherein the first control sub-circuit includes a first latch, a second latch, a third latch, a fourth latch, a first control switch, and a second control switch; N is equal to 4;

an input terminal of the first latch is electrically connected to the first data access terminal, an output terminal of the first latch is electrically connected to a control terminal of the first control switch, and the first latch is configured to latch a voltage signal connected to the first data access terminal, and output a first output voltage, and the first output voltage is inverse in phase to the voltage signal connected to the first data access terminal;

an input terminal of the second latch is electrically connected to the second data access terminal, an output terminal of the second latch is electrically connected to a control terminal of the second control switch, and the second latch is configured to latch a voltage signal connected to the second data access terminal, and output a second output voltage, and the second output voltage is inverse in phase to the voltage signal connected to the second data access terminal;

an input terminal of the third latch is electrically connected to a first terminal of the first control switch, an output terminal of the third latch is electrically connected to the first switch control terminal, and the third latch is configured to latch a voltage signal connected to the input terminal of the third latch, and output a third output voltage, the third output voltage is inverse in phase the voltage signal connected to the input terminal of the third latch;

an input terminal of the fourth latch is electrically connected to a first terminal of the second control switch, an output terminal of the fourth latch is electrically connected to a third switch control terminal, and the fourth latch is configured to latch a voltage signal connected to an input terminal of the fourth latch, and output a fourth output voltage, the fourth output voltage is inverse in phase to the voltage signal connected to the input terminal of the fourth latch;

a control terminal of the first control switch is electrically connected to the output terminal of the first latch, a second terminal of the first control switch is electrically connected to the output terminal of the second latch, and the first control switch is configured to control to connect or disconnect the first terminal of the first control switch and the second terminal of the first control switch under the control of a potential of the control terminal of the first control switch;

a control terminal of the second control switch is electrically connected to the input terminal of the first latch, a second terminal of the second control switch is electrically connected to the input terminal of the second latch, and the second control switch is configured to control to connect or disconnect the first terminal of the second control switch and the second terminal of the second control switch under the control of a potential of the control terminal of the second control switch;

the first switch control terminal is electrically connected to the output terminal of the third latch, and the second switch control terminal is electrically connected to the input terminal of the third latch;

the third switch control terminal is electrically connected to the output terminal of the fourth latch, and the fourth switch control terminal is electrically connected to the input terminal of the fourth latch.

7. The pixel circuit according to claim 6, wherein the first latch includes a first inverter and a second inverter;

an input terminal of the first inverter is electrically connected to the input terminal of the first latch, and an output terminal of the first inverter is electrically connected to the output terminal of the first latch;

an input terminal of the second inverter is electrically connected to the output terminal of the first inverter, and an output terminal of the second inverter is electrically connected to the input terminal of the first inverter;

the second latch includes a third inverter and a fourth inverter;

an input terminal of the third inverter is electrically connected to the input terminal of the second latch, and an output terminal of the third inverter is electrically connected to the output terminal of the second latch;

an input terminal of the fourth inverter is electrically connected to the output terminal of the third inverter, and an output terminal of the fourth inverter is electrically connected to the input terminal of the third inverter;

the third latch includes a fifth inverter and a sixth inverter;

an input terminal of the fifth inverter is electrically connected to the input terminal of the third latch, and an output terminal of the fifth inverter is electrically connected to the output terminal of the third latch;

an input terminal of the sixth inverter is electrically connected to the output terminal of the fifth inverter, and an output terminal of the sixth inverter is electrically connected to the input terminal of the fifth inverter;

the fourth latch includes a seventh inverter and an eighth inverter;

an input terminal of the seventh inverter is electrically connected to the input terminal of the fourth latch, and an output terminal of the seventh inverter is electrically connected to the output terminal of the fourth latch;

an input terminal of the eighth inverter is electrically connected to the output terminal of the seventh inverter, and an output terminal of the eighth inverter is electrically connected to the input terminal of the seventh inverter.

8. The pixel circuit according to claim 6, wherein the first control switch is a first control transistor, and the second control switch is a second control transistor;

a control electrode of the first control transistor is electrically connected to the output terminal of the first latch, a first electrode of the first control transistor is electrically connected to the input terminal of the third latch, and a second electrode of the first control transistor is electrically connected to the output terminal of the second latch;

a control electrode of the second control transistor is electrically connected to the input terminal of the first latch, a first electrode of the second control transistor is electrically connected to the input terminal of the fourth latch, and a second electrode of the second control transistor is electrically connected to the input terminal of the second latch.

9. The pixel circuit according to claim 5, wherein the first data writing-in circuit includes a first writing-in transistor, and the second data writing-in circuit includes a second writing-in transistor;

a control electrode of the first writing-in transistor is electrically connected to the first scanning terminal, a first electrode of the first writing-in transistor is electrically connected to the first data voltage terminal, and a second electrode of the first writing-in transistor is electrically connected to the first data access terminal;

a control electrode of the second writing-in transistor is electrically connected to the second scanning terminal, a first electrode of the second writing-in transistor is electrically connected to the second data voltage terminal, and a second electrode of the second writing-in transistor is electrically connected to the second data access terminal.

10. The pixel circuit according to claim 1, wherein the first control circuit includes a first data writing-in circuit, a second data writing-in circuit, a third data writing-in circuit, a fourth data writing-in circuit and a second control sub-circuit;

the first data writing-in circuit is electrically connected to the first scanning terminal, the first data voltage terminal and the first data access terminal respectively, and is configured to write a first data voltage provided by the first data voltage terminal into the first data access terminal under the control of the first scanning signal provided by the first scanning terminal;

the second data writing-in circuit is electrically connected to the second scanning terminal, the second data voltage terminal and the second data access terminal respectively, and is configured to write a second data voltage provided by the second data voltage terminal into the second data access terminal under the control of the second scanning signal provided by the first second terminal;

the third data writing-in circuit is electrically connected to the third scanning terminal, the third data voltage terminal and the third data access terminal respectively, and is configured to write a third data voltage provided by the third data voltage terminal into the third data access terminal under the control of the third scanning signal provided by the third second terminal;

the fourth data writing-in circuit is electrically connected to the fourth scanning terminal, the fourth data voltage terminal and the fourth data access terminal respectively, and is configured to write a fourth data voltage provided by the fourth data voltage terminal into the fourth data access terminal under the control of the fourth scanning signal provided by the first fourth terminal;

the second control sub-circuit is respectively connected to the first data access terminal, the second data access terminal, the third data access terminal, the fourth data access terminal and the N switch control terminals, is configured to provide corresponding switch control signals to the N switch control terminals respectively according a potential of the first data access terminal, a potential of the second data access terminal, a potential of the third data access terminal and a potential of the fourth data access terminal.

11. The pixel circuit according to claim 10, wherein the second control sub-circuit includes a first latch, a second latch, a third latch, a fourth latch, a fifth latch, a sixth latch, a seventh latch, an eighth latch, a ninth latch, a tenth latch, a first control switch, a second control switch, a third control switch, a fourth control switch, a fifth control switch, and a sixth control switch; N is equal to 8;

an input terminal of the first latch is electrically connected to the first data access terminal, an output terminal of the first latch is electrically connected to a control terminal of the first control switch, and the first latch is configured to latch the voltage signal connected to the first data access terminal, and output a first output voltage, and the first output voltage is inverse in phase to the voltage signal connected to the first data access terminal;

an input terminal of the second latch is electrically connected to the second data access terminal, an output terminal of the second latch is electrically connected to a control terminal of the second control switch, and the second latch is configured to latch a voltage signal connected to the second data access terminal, and output a second output voltage, and the second output voltage is inverse in phase to the voltage signal connected to the second data access terminal;

an input terminal of the third latch is electrically connected to the first terminal of the first control switch, an output terminal of the third latch is electrically connected to a control terminal of the third control switch, and the third latch is configured to latch the voltage signal connected to the input terminal of the third latch, and output a third output voltage, and the third output voltage is inverse in phase to the voltage signal connected to the input terminal of the third latch;

an input terminal of the fourth latch is electrically connected to the first terminal of the second control switch, an output terminal of the fourth latch is electrically connected to the control terminal of the fifth control switch, and the fourth latch is configured to latch a voltage signal connected to the input terminal of the fourth latch, and output a fourth output voltage, the fourth output voltage is inverse in phase to the voltage signal connected to the input terminal of the fourth latch;

an input terminal of the fifth latch is electrically connected to the first terminal of the third control switch, an output terminal of the fifth latch is electrically connected to the second switch control terminal, and the fifth latch is configured to latch a voltage signal connected to the input terminal of the fifth latch, and output a fifth output voltage, the fifth output voltage is inverse in phase to the voltage signal connected to the input terminal of the fifth latch;

an input terminal of the sixth latch is electrically connected to the third data access terminal, an output terminal of the sixth latch is electrically connected to the second terminal of the third control switch, and the sixth latch is configured to latch a voltage signal connected to the input terminal of the sixth latch, and output a sixth output voltage, the sixth output voltage is inverse in phase to the voltage signal connected to the input terminal of the sixth latch;

an input terminal of the seventh latch is electrically connected to the first terminal of the fourth control switch, an output terminal of the seventh latch is electrically connected to the fourth switch control terminal, and the seventh latch is configured to latch a voltage signal connected to the input terminal of the seventh latch, and output a seventh output voltage, the seventh output voltage is inverse in phase to the voltage signal connected to the input terminal of the seventh latch;

an input terminal of the eighth latch is electrically connected to the first terminal of the fifth control switch, an output terminal of the eighth latch is electrically connected to the sixth switch control terminal, and the eighth latch is configured to latch a voltage signal connected to the input terminal of the eighth latch, and output an eighth output voltage, the eighth output voltage is inverse in phase to the voltage signal connected to the input terminal of the eighth latch;

an input terminal of the ninth latch is electrically connected to the fourth data access terminal, an output terminal of the ninth latch is electrically connected to the second terminal of the fifth control switch, and the ninth latch is electrically connected to the second terminal of the fifth control switch, the ninth latch is configured to latch the voltage signal connected to the input terminal of the ninth latch, and output a ninth output voltage, the ninth output voltage is inverse in phase to the voltage signal connected to the input terminal of the ninth latch;

an input terminal of the tenth latch is electrically connected to the first terminal of the sixth control switch, an output terminal of the tenth latch is electrically connected to the eighth switch control terminal, and the tenth latch is configured to latch a voltage signal connected to the input terminal of the tenth latch, and output a tenth output voltage, the tenth output voltage is inverse in phase to the voltage signal connected to the input terminal of the tenth latch;

a control terminal of the first control switch is electrically connected to the output terminal of the first latch, a second terminal of the first control switch is electrically connected to the output terminal of the second latch, and the first control switch is configured to control to connect or disconnect a first terminal of the first control switch and the second terminal of the first control switch under the control of a potential of the control terminal of the first control switch;

a control terminal of the second control switch is electrically connected to the input terminal of the first latch, a second terminal of the second control switch is electrically connected to the input terminal of the second latch, and the second control switch is configured to control to connect or disconnect a first terminal of the second control switch and the second terminal of the second control switch under the control of a potential of the control terminal of the second control switch;

a control terminal of the third control switch is electrically connected to the output terminal of the third latch, and the third control switch is configured to control to connect or disconnect the input terminal of the fifth latch and the output terminal of the sixth latch under the control of a potential of the control terminal of the third control switch;

a control terminal of the fourth control switch is electrically connected to the input terminal of the third latch, and the fourth control switch is configured to control to connect or disconnect the input terminal of the seventh latch and the input terminal of the sixth latch under the control of a potential of the control terminal of the fourth control switch;

a control terminal of the fifth control switch is electrically connected to the output terminal of the fourth latch, and the fifth control switch is configured to control to connect the input terminal of the eighth latch and the output terminal of the ninth latch under the control of a potential of the control terminal of the fifth control switch;

a control terminal of the sixth control switch is electrically connected to the input terminal of the fourth latch, and the sixth control switch is configured to control to connect the input terminal of the tenth latch and the input terminal of the ninth latch under the control of a potential of the control terminal of the sixth control switch;

the first switch control terminal is electrically connected to the input terminal of the fifth latch, and the seventh switch control terminal is electrically connected to the input terminal of the tenth latch.

12. The pixel circuit according to claim 11, wherein the first latch includes a first inverter and a second inverter;

an input terminal of the first inverter is electrically connected to the input terminal of the first latch, and an output terminal of the first inverter is electrically connected to the output terminal of the first latch;

an input terminal of the second inverter is electrically connected to the output terminal of the first inverter, and an output terminal of the second inverter is electrically connected to the input terminal of the first inverter;

the second latch includes a third inverter and a fourth inverter;

an input terminal of the third inverter is electrically connected to the input terminal of the second latch, and an output terminal of the third inverter is electrically connected to the output terminal of the second latch;

an input terminal of the fourth inverter is electrically connected to the output terminal of the third inverter, and an output terminal of the fourth inverter is electrically connected to the input terminal of the third inverter;

the third latch includes a fifth inverter and a sixth inverter;

an input terminal of the fifth inverter is electrically connected to the input terminal of the third latch, and an output terminal of the fifth inverter is electrically connected to the output terminal of the third latch;

an input terminal of the sixth inverter is electrically connected to the output terminal of the fifth inverter, and an output terminal of the sixth inverter is electrically connected to the input terminal of the fifth inverter;

the fourth latch includes a seventh inverter and an eighth inverter;

an input terminal of the seventh inverter is electrically connected to the input terminal of the fourth latch, and an output terminal of the seventh inverter is electrically connected to the output terminal of the fourth latch;

an input terminal of the eighth inverter is electrically connected to the output terminal of the seventh inverter, and an output terminal of the eighth inverter is electrically connected to the input terminal of the seventh inverter;

the fifth latch includes a ninth inverter and a tenth inverter;

an input terminal of the ninth inverter is electrically connected to the input terminal of the fifth latch, and an output terminal of the ninth inverter is electrically connected to the output terminal of the fifth latch;

an input terminal of the tenth inverter is electrically connected to the output terminal of the ninth inverter, and an output terminal of the tenth inverter is electrically connected to the input terminal of the ninth inverter;

the sixth latch includes an eleventh inverter and a twelfth inverter;

an input terminal of the eleventh inverter is electrically connected to the input terminal of the sixth latch, and an output terminal of the eleventh inverter is electrically connected to the output terminal of the sixth latch;

an input terminal of the twelfth inverter is electrically connected to the output terminal of the eleventh inverter, and an output terminal of the twelfth inverter is electrically connected to the input terminal of the eleventh inverter;

the seventh latch includes a thirteenth inverter and a fourteenth inverter;

an input terminal of the thirteenth inverter is electrically connected to the input terminal of the seventh latch, and an output terminal of the thirteenth inverter is electrically connected to the output terminal of the seventh latch;

an input terminal of the fourteenth inverter is electrically connected to the output terminal of the thirteenth inverter, and an output terminal of the fourteenth inverter is electrically connected to the input terminal of the thirteenth inverter;

the eighth latch includes a fifteenth inverter and a sixteenth inverter;

an input terminal of the fifteenth inverter is electrically connected to the input terminal of the eighth latch, and an output terminal of the fifteenth inverter is electrically connected to the output terminal of the eighth latch;

an input terminal of the sixteenth inverter is electrically connected to the output terminal of the fifteenth inverter, and an output terminal of the sixteenth inverter is electrically connected to the input terminal of the fifteenth inverter;

the ninth latch includes a seventeenth inverter and an eighteenth inverter;

an input terminal of the seventeenth inverter is electrically connected to the input terminal of the ninth latch, and an output terminal of the seventeenth inverter is electrically connected to the output terminal of the ninth latch;

an input terminal of the eighteenth inverter is electrically connected to the output terminal of the seventeenth inverter, and an output terminal of the eighteenth inverter is electrically connected to the input terminal of the seventeenth inverter;

the tenth latch includes a nineteenth inverter and a twentieth inverter;

an input terminal of the nineteenth inverter is electrically connected to the input terminal of the tenth latch, and an output terminal of the nineteenth inverter is electrically connected to the output terminal of the tenth latch;

an input terminal of the twentieth inverter is electrically connected to the output terminal of the nineteenth inverter, and an output terminal of the twentieth inverter is electrically connected to the input terminal of the nineteenth inverter.

13. The pixel circuit according to claim 11, wherein the first control switch is a first control transistor, the second control switch is a second control transistor; the third control switch is a third control transistor, and the fourth control switch is a fourth control transistor; the fifth control switch is a fifth control transistor, and the sixth control switch is a sixth control transistor;

a control electrode of the first control transistor is electrically connected to the output terminal of the first latch, a first electrode of the first control transistor is electrically connected to the input terminal of the third latch, and a second electrode of the first control transistor is electrically connected to the output terminal of the second latch;

a control electrode of the second control transistor is electrically connected to the input terminal of the first latch, a first electrode of the second control transistor is electrically connected to the input terminal of the fourth latch, and a second electrode of the second control transistor is electrically connected to the input terminal of the second latch;

a control electrode of the third control transistor is electrically connected to the output terminal of the third latch, a first electrode of the third control transistor is electrically connected to the input terminal of the fifth latch, and a second electrode of the third control transistor is electrically connected to the output terminal of the sixth latch;

a control electrode of the fourth control transistor is electrically connected to the input terminal of the third latch, a first electrode of the fourth control transistor is electrically connected to the input terminal of the seventh latch, and a second electrode of the fourth transistor is electrically connected to the input terminal of the sixth latch;

a control electrode of the fifth control transistor is electrically connected to the output terminal of the fourth latch, a first electrode of the fifth control transistor is electrically connected to the input terminal of the eighth latch, and a second electrode of the fifth control transistor is electrically connected to the output terminal of the ninth latch;

a control electrode of the sixth control transistor is electrically connected to the input terminal of the fourth latch, a first electrode of the sixth control transistor is electrically connected to the input terminal of the tenth latch, and a second electrode of the sixth control transistor is electrically connected to the input terminal of the ninth latch.

14. The pixel circuit according to claim 10, wherein the first data writing-in circuit includes a first writing-in transistor, the second data writing-in circuit includes a second writing-in transistor, and the third data writing-in circuit includes a third writing-in transistor, the fourth data writing-in circuit includes a fourth writing-in transistor;

a control electrode of the first writing-in transistor is electrically connected to the first scanning terminal, a first electrode of the first writing-in transistor is electrically connected to the first data voltage terminal, and a second electrode of the first writing-in transistor is electrically connected to the first data access terminal;

a control electrode of the second writing-in transistor is electrically connected to the second scanning terminal, a first electrode of the second writing-in transistor is electrically connected to the second data voltage terminal, and a second electrode of the second writing-in transistor is electrically connected to the second data access terminal;

a control electrode of the third writing-in transistor is electrically connected to the third scanning terminal, a first electrode of the third writing-in transistor is electrically connected to the third data voltage terminal, and a second electrode of the third writing-in transistor is electrically connected to the third data access terminal;

a control electrode of the fourth writing-in transistor is electrically connected to the fourth scanning terminal, a first electrode of the fourth writing-in transistor is electrically connected to the fourth data voltage terminal, and a second electrode of the fourth writing-in transistor is electrically connected to the fourth data access terminal.

15. The pixel circuit according to claim 1, wherein the light emitting circuit comprises a light emitting element;

the light emitting control circuit is electrically connected to a first electrode of the light emitting element, and is configured to control to connect the control voltage input terminal and the first electrode of the light emitting element under the control of the light emitting control signal;

a second electrode of the light emitting element is electrically connected to the first voltage terminal.

16. The pixel circuit according to claim 1, wherein the light emitting circuit includes an amplitude control sub-circuit, a driving sub-circuit, a first on-off control sub-circuit and a light emitting element; a first terminal of the driving sub-circuit is electrically connected to the second voltage terminal;

the amplitude control sub-circuit is configured to control a driving current generated by the driving sub-circuit according to a display data voltage;

the light emitting control circuit is configured to control to connect the control voltage input terminal and a control terminal of the first on-off control sub-circuit under the control of the light emitting control signal;

the control terminal of the first on-off control sub-circuit is electrically connected to the light emitting control circuit, a first terminal of the first on-off control sub-circuit is electrically connected to the second terminal of the driving sub-circuit, and a second terminal of the first on-off control sub-circuit is electrically connected to the light emitting element; the first on-off control sub-circuit is configured to control to connect the driving sub-circuit and the light emitting element under the control of a potential of the control terminal of the first on-off control sub-circuit.

17. The pixel circuit according to claim 16, wherein the amplitude control sub-circuit includes a data writing-in sub-circuit, an energy storage sub-circuit and a reset sub-circuit;

the data writing-in sub-circuit is electrically connected to the first scanning line, the data line and the control terminal of the driving sub-circuit respectively, and is configured to write the data voltage provided by the data line into the control terminal of the driving sub-circuit under the control of the first scanning signal provided by the first scanning line;

the reset sub-circuit is electrically connected to the first scanning line, the reset voltage terminal and the second terminal of the driving sub-circuit respectively, and is configured to control to write the reset voltage provided by the reset voltage terminal into the second terminal of the driving sub-circuit under the control of the first scanning signal;

the energy storage sub-circuit is electrically connected to the control terminal of the driving sub-circuit and the second terminal of the driving sub-circuit respectively, and is configured to store electric energy;

the driving sub-circuit is configured to generate driving current under the control of a potential of the control terminal of the driving sub-circuit;

or wherein the amplitude control sub-circuit includes a data writing-in sub-circuit and an energy storage sub-circuit;

the data writing-in sub-circuit is electrically connected to the scanning line, the data line and the control terminal of the driving sub-circuit respectively, and the data writing-in sub-circuit is configured to write the data voltage provided by the data line into the control terminal of the driving sub-circuit under the control of a scanning signal provided by the scanning line;

the energy storage sub-circuit is electrically connected to the control terminal the driving sub-circuit and a first common electrode terminal, respectively, is configured to store electric energy;

the driving sub-circuit is configured to generate driving current under the control of a potential of the control terminal of the driving sub-circuit, wherein the scanning lines include a second scanning line and a third scanning line;

the data writing-in sub-circuit includes a first data writing-in transistor and a second data writing-in transistor;

a control electrode of the first data writing-in transistor is electrically connected to the second scanning line, a first electrode of the first data writing-in transistor is electrically connected to the data line, and a second electrode of the first data writing-in transistor is electrically connected to the control terminal of the driving sub-circuit;

a control electrode of the second data writing-in transistor is electrically connected to the third scanning line, a first electrode of the second data writing-in transistor is electrically connected to the data line, and a second electrode of the second data writing-in transistor is electrically connected to the control terminal of the driving sub-circuit;

the first data writing-in transistor is an n-type transistor, and the second data writing-in transistor is a p-type transistor.

18. The pixel circuit according to claim 1, wherein the nth switch control sub-circuit comprises an nth switch control transistor;

a control electrode of the nth switch control transistor is electrically connected to the nth switch control terminal, a first electrode of the nth switch control transistor is electrically connected to the nth light emitting control voltage terminal, and a second electrode of the nth switch control transistor is electrically connected to the control voltage input terminal;

or wherein the light emitting control circuit comprises a light emitting control transistor;

a control electrode of the light emitting control transistor is electrically connected to the light emitting control terminal, a first electrode of the light emitting control transistor is electrically connected to the control voltage input terminal, and a second electrode of the light emitting control transistor is connected to the light emitting circuit;

or wherein the light emitting element included in the light emitting circuit is a micro light emitting diode or a submillimeter light emitting diode; a first electrode of the light emitting element is an anode, a second electrode of the light emitting element is a cathode.

19. A display device, comprising a display panel;

wherein a display area of the display panel has a plurality of sub-pixels, and the pixel circuit according to claim 1 is arranged in each sub-pixel.

20. The display device according to claim 19, wherein the display panel comprises a silicon substrate;

the pixel circuit is arranged on the silicon substrate.

* * * * *